United States Patent
Wang et al.

(10) Patent No.: US 11,790,930 B2
(45) Date of Patent: Oct. 17, 2023

(54) METHOD AND SYSTEM FOR DEREVERBERATION OF SPEECH SIGNALS

(71) Applicant: Mitsubishi Electric Research Laboratories, Inc., Cambridge, MA (US)

(72) Inventors: Zhong-Qiu Wang, Cambridge, MA (US); Gordon Wichern, Cambridge, MA (US); Jonathan Le Roux, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 43 days.

(21) Appl. No.: 17/654,302

(22) Filed: Mar. 10, 2022

(65) Prior Publication Data
US 2023/0042468 A1    Feb. 9, 2023

Related U.S. Application Data

(60) Provisional application No. 63/227,126, filed on Jul. 29, 2021.

(51) Int. Cl.
*G10L 19/06* (2013.01)
*G10L 25/18* (2013.01)
(Continued)

(52) U.S. Cl.
CPC .......... *G10L 21/0224* (2013.01); *G06N 3/045* (2023.01); *G10L 21/0232* (2013.01);
(Continued)

(58) Field of Classification Search
CPC ......... G10L 19/06; G10L 25/18; G10L 25/30; G10L 25/12
See application file for complete search history.

(56) References Cited

U.S. PATENT DOCUMENTS 10,971,130 B1 *   4/2021   Amengual Gari ..... H04R 3/005

FOREIGN PATENT DOCUMENTS

CN        113496699 A    * 10/2021
JP       2021515277 A    *  3/2019
(Continued)

*Primary Examiner* — Shreyans A Patel
(74) *Attorney, Agent, or Firm* — Gennadiy Vinokur; Hironori Tsukamoto

(57) ABSTRACT

A system and method for reverberation reduction is disclosed. A first Deep Neural Network (DNN) produces a first estimate of a target direct-path signal from a mixture of acoustic signals that include the target direct-path signal and a reverberation of the target direct-path signal. A filter modeling a room impulse response (RIR) for the first estimate is estimated. The filter when applied to the first estimate of the target direct-path signal generates a result closest to a residual between the mixture of the acoustic signals and the first estimate of the target direct-path signal according to a distance function. A mixture with reduced reverberation of the target direct-path signal is obtained by removing the result of applying the filter to the first estimate of the target direct-path signal from the received mixture. A second DNN produces a second estimate of the target direct-path signal from the mixture with reduced reverberation.

20 Claims, 25 Drawing Sheets

(51) Int. Cl.
*G10L 25/30* (2013.01)
*G10L 25/12* (2013.01)
*G10L 21/0224* (2013.01)
*G06N 3/045* (2023.01)
*G10L 21/0232* (2013.01)
*G10L 21/0264* (2013.01)
*G10L 21/0216* (2013.01)

(52) U.S. Cl.
CPC .......... *G10L 21/0264* (2013.01); *G10L 25/30* (2013.01); *G10L 2021/02166* (2013.01)

(56) References Cited

FOREIGN PATENT DOCUMENTS

| | | | | |
|---|---|---|---|---|
| JP | 2023517720 | A | * | 3/2021 |
| KR | 20220022286 | A | * | 8/2020 |

* cited by examiner

| Approaches | DNN$_1$/DNN$_2$ predicts? | DNN$_2$ loss | $K/\Delta/\epsilon$ | SI-SDR | PESQ | WER on val. set | | | WER on test set | | |
|---|---|---|---|---|---|---|---|---|---|---|---|
| | | | | | | Near | Far | Avg. | Near | Far | Avg. |
| Unprocessed | - | - | - | -3.6 | 1.64 | 15.25 | 16.88 | 16.11 | 17.08 | 17.29 | 17.19 |
| WPE | - | - | 37/30/0.001 | -1.4 | 1.74 | 16.46 | 17.57 | 17.02 | 16.02 | 16.88 | 15.45 |
| DNN$_1$ | d+e | - | - | -1.0 | 2.33 | 15.41 | 18.20 | 16.80 | 17.37 | 16.31 | 16.84 |
| DNN$_1$+DNN$_2$ | d+e+d | RI | - | 8.8 | 2.77 | 12.48 | 14.29 | 13.38 | 11.31 | 11.61 | 11.46 |
| DNN$_1$+WPE | d+e | - | 37/30/0.001 | -1.5 | 1.75 | 15.78 | 17.70 | 16.74 | 14.31 | 16.04 | 15.18 |
| DNN$_1$+WPE+DNN$_2$ | d+e+d | RI | 37/30/0.001 | 9.6 | 2.95 | 11.67 | 12.78 | 12.22 | 10.19 | 9.26 | 9.07 |
| DNN$_2$ | d+e+v | - | - | -1.8 | 1.96 | 14.78 | 17.16 | 15.97 | 18.27 | 17.15 | 17.71 |
| DNN$_1$+DNN$_2$ | d+e+v+d | RI | - | 8.2 | 2.69 | 12.91 | 13.53 | 13.22 | 11.54 | 11.99 | 11.75 |
| DNN$_1$+WPE | d+e+v | - | 37/30/0.001 | -1.5 | 1.75 | 15.53 | 17.98 | 16.75 | 13.82 | 16.04 | 14.92 |
| DNN$_1$+WPE+DNN$_2$ | d+e+v+d | RI | 37/30/0.001 | 9.3 | 2.93 | 11.07 | 12.44 | 13.05 | 9.13 | 10.03 | 9.58 |
| DNN$_2$ | d | - | - | 8.2 | 2.65 | 12.48 | 14.56 | 13.52 | 11.09 | 11.77 | 11.43 |
| DNN$_1$+DNN$_2$ | d | RI | - | 9.1 | 2.82 | 11.85 | 12.56 | 12.21 | 10.80 | 10.84 | 10.82 |
| DNN$_1$+WPE | d | - | 37/30/0.001 | -1.0 | 1.74 | 15.41 | 17.91 | 16.66 | 14.91 | 15.93 | 15.02 |
| DNN$_1$+WPE+DNN$_2$ | d | RI | 37/30/0.001 | 11.2 | 3.12 | 12.23 | 12.56 | 12.40 | 9.02 | 9.32 | 9.17 |
| DNN$_1$+(WPE+DNN$_2$)×2 | d | RI | 37/30/0.001 | 11.3 | 3.15 | 11.17 | 12.44 | 11.80 | 9.35 | 9.39 | 9.37 |
| DNN$_2$+ICP | d | - | 40/0/1.0 | 3.2 | 1.78 | 20.02 | 22.36 | 21.19 | 16.44 | 20.46 | 18.55 |
| DNN$_1$+ICP+DNN$_2$ | d | RI | 40/0/1.0 | 11.3 | 3.10 | 10.85 | 13.19 | 12.02 | 8.58 | 9.38 | 9.00 |
| DNN$_1$+(ICP+DNN$_2$)×2 | d | RI | 40/0/1.0 | 11.3 | 3.11 | 10.92 | 13.56 | 12.24 | 9.38 | 10.03 | 9.70 |
| DNN$_2$+ICP | d | - | 40/0/1.0 | 10.7 | 1.77 | 17.53 | 20.71 | 19.12 | 15.01 | 18.00 | 16.80 |
| DNN$_1$+ICP+DNN$_2$ | d | RI | 40/0/1.0 | 10.7 | 3.03 | 11.17 | 11.85 | 11.50 | 8.46 | 10.40 | 9.03 |
| DNN$_2$+ICP | d | - | 40/0/1.0 | 3.0 | 1.82 | 18.22 | 21.19 | 19.70 | 15.14 | 16.96 | 17.55 |
| DNN$_1$+ICP+DNN$_2$ | d | RI | 40/0/1.0 | 11.9 | 3.15 | 9.80 | 12.77 | 11.29 | 8.91 | 9.62 | 9.27 |
| DNN$_2$+ICP | d | - | 40/0/1.0 | 3.0 | 1.82 | 17.24 | 20.33 | 18.79 | 16.74 | 16.61 | 16.67 |
| DNN$_1$+ICP+DNN$_2$ | d | RI | 40/0/1.0 | 12.5 | 3.18 | 9.73 | 11.82 | 10.76 | 8.40 | 8.56 | 8.48 |
| DNN$_1$+(ICP+DNN$_2$)×2 | d | RI | 40/0/1.0 | 12.8 | 3.24 | 9.11 | 12.03 | 10.57 | 8.21 | 8.74 | 8.48 |
| DNN$_1$+ICP+DNN$_2$ | d | RI+Mag | 40/0/1.0 | 11.8 | 3.39 | 8.67 | 9.77 | 9.22 | 7.82 | 8.00 | 7.91 |
| DNN$_1$+(ICP+DNN$_2$)×2 | d | RI+Mag | 40/0/1.0 | 12.2 | 3.42 | 8.36 | 10.39 | 9.38 | 7.63 | 8.17 | 7.90 |

SI-SDR (dB) AND PESQ RESULTS ON SIMULATED TEST SET FOR DEREVERBERATION, AND WER (%) ON REVERB.

FIG. 10

| Approaches | $DNN_1$ loss | $DNN_2$ loss | $DNN_2$ type | SI-SDR | PESQ | eSTOI | WER |
|---|---|---|---|---|---|---|---|
| Unprocessed | | | | -5.5 | 1.50 | 44.1 | 78.42 |
| $DNN_1$ | PIT | | | 5.6 | 2.06 | 72.1 | 42.64 |
| $DNN_2$ | | | | 6.1 | 2.17 | 73.6 | 38.42 |
| $DNN_1+DNN_2$ | PIT+sumPIT | | | 8.0 | 2.25 | 77.3 | 36.67 |
| $DNN_1+$sfWPE+$DNN_2$ | PIT+sumPIT | RI | allSpks | 8.7 | 2.38 | 80.1 | 31.38 |
| $DNN_1+$sfWPE+$DNN_2$ | PIT+sumPIT | RI | perSpk | 11.2 | 2.85 | 86.4 | 18.50 |
| $DNN_1+$(sfWPE+$DNN_2)\times 2$ | PIT+sumPIT | RI | perSpk | 11.3 | 2.89 | 87.3 | 17.67 |
| $DNN_1+$mfWPE+$DNN_2$ | PIT+sumPIT | RI | allSpks | 8.5 | 2.38 | 79.1 | 32.40 |
| $DNN_1+$mfWPE+$DNN_2$ | PIT+sumPIT | RI | perSpk | 11.0 | 2.81 | 86.0 | 18.82 |
| $DNN_1+$(mfWPE+$DNN_2)\times 1$ | PIT+sumPIT | RI | perSpk | 11.2 | 2.85 | 86.0 | 18.25 |
| $DNN_1+$FCP+$DNN_2$ | PIT+sumPIT | RI | allSpks | 8.2 | 2.30 | 78.0 | 34.40 |
| $DNN_1+$FCP+$DNN_2$ | PIT+sumPIT | RI | perSpk | 10.7 | 2.77 | 85.5 | 20.15 |
| $DNN_1+$FCP+$DNN_2$ | PIT+sumPIT | RI | allSpks | 9.8 | 2.53 | 81.8 | 27.79 |
| $DNN_1+$FCP+$DNN_2$ | PIT+sumPIT | RI | perSpk | 12.0 | 2.89 | 87.2 | 18.26 |
| $DNN_1+$(FCP+$DNN_2)\times 2$ | PIT+sumPIT | RI | perSpk | 12.5 | 2.95 | 88.3 | 16.33 |
| $DNN_1+$FCP+$DNN_2$ | PIT+sumPIT | RI+Mag | perSpk | 11.8 | 3.22 | 88.1 | 13.53 |
| $DNN_1+$(FCP+$DNN_2)\times 1$ | PIT+sumPIT | RI+Mag | perSpk | 12.2 | 3.24 | 89.0 | 12.77 |
| $SISO_1$ [11] | | | | 5.1 | 2.41 | 74.6 | 28.28 |
| DPRNN-TasNet [14] | | | | 6.5 | 2.28 | 73.1 | 38.12 |
| 6-microphone $SISO_1$-BF-$SISO_2$ [11] | | | | 11.2 | 3.34 | 89.6 | 10.00 |
| Oracle direct sound + early reflections | | | | | | | 7.04 |
| Oracle spectral magnitude mask | | | | 1.8 | 3.37 | 80.1 | 6.74 |
| Oracle phase-sensitive mask | | | | 6.0 | 3.65 | 88.2 | 6.51 |
| Oracle direct sound | | | | | | | 6.40 |

SI-SDR (dB), PESQ, eSTOI (%) AND WER (%) RESULTS ON SMS-WSJ TEST SET.

FIG. 11

| Approaches | DNN$_1$ loss | DNN$_2$ type | SI-SDR |
|---|---|---|---|
| Unprocessed | - | - | -0.1 |
| DNN$_1$ | PIT | - | 2.9 |
| DNN$_1$ | PIT+sumPIT | - | 4.2 |
| DNN$_1$+DNN$_2$ | PIT+sumPIT | allSpks | 5.6 |
| DNN$_1$+sfWPE+DNN$_2$ | PIT+sumPIT | allSpks | 5.8 |
| DNN$_1$+sfWPE+DNN$_2$ | PIT+sumPIT | perSpk | 6.7 |
| DNN$_1$+(sfWPE+DNN$_2$)×2 | PIT+sumPIT | perSpk | 6.6 |
| DNN$_1$+mfWPE+DNN$_2$ | PIT+sumPIT | allSpks | 5.8 |
| DNN$_1$+mfWPE+DNN$_2$ | PIT+sumPIT | perSpk | 6.5 |
| DNN$_1$+(mfWPE+DNN$_2$)×2 | PIT+sumPIT | perSpk | 6.7 |
| DNN$_1$+fCP+DNN$_2$ | PIT+sumPIT | allSpks | 5.8 |
| DNN$_1$+fCP+DNN$_2$ | PIT+sumPIT | perSpk | 6.7 |
| DNN$_1$+FCP+DNN$_2$ | PIT+sumPIT | allSpks | 6.4 |
| DNN$_1$+FCP+DNN$_2$ | PIT+sumPIT | perSpk | 7.1 |
| DNN$_1$+(FCP+DNN$_2$)×2 | PIT+sumPIT | perSpk | 7.5 |
| Conv-TasNet [13], [23] | - | - | 2.2 |
| 3-Stage BLSTM-TasNet [23] | - | - | 4.8 |
| Wavesplit [51] | - | - | 5.9 |

SI-SDR (dB) RESULTS ON WHAMR! TEST SET

FIG. 12

METHOD AND SYSTEM FOR DEREVERBERATION OF SPEECH SIGNALS

TECHNICAL FIELD

The present disclosure generally relates to audio signal processing and more particularly to method and system for dereverberation of speech signals.

BACKGROUND

Typically, in an enclosed room, reverberation of an audio signal (e.g., speech) occurs in modern hands-free speech communication, such as teleconferencing and interaction with smart devices, such as microphones in smart speakers. In such enclosed room, the speech signal propagates in air and may be reflected by a wall, a floor, a ceiling, and any other objects in the room before being captured by a microphone. The reverberation is a multi-path propagation of a speech signal from a source or a speaker to a receiving end, such as a microphone. Such speech reverberation occurs when sound reflects off surfaces in an environment. Some of the sound may be absorbed by the surfaces due to which multiple attenuation of the speech signal occurs. The reflection and the absorption of the sound by the surfaces may generate multiple attenuated copies and delayed copies of the speech signal. The multiple attenuated copies and the delayed copies degrade quality of the speech, which may hinder performance of an automatic speech recognition (ASR) system or any speech/audio processing system. For instance, the ASR may generate inaccurate output due to an audio input with the degraded quality of the speech.

The speech reverberation may be mitigated by removal of effects of reverberation from the sound. Such removal of the effects of reverberation is known as dereverberation. The dereverberation may include identifying and differentiating a direct-path signal from the attenuated and delayed copies. The direct-path signal corresponds to signal that sound travels when the source and microphone are in a line-of-sight. However, identifying and differentiating the direct-path signal from the copies may be difficult, especially when the reverberation is high, and noises of non-stationary sources are present. For example, an environment, such as an enclosed room with the non-stationary sources, such as air-conditioning system may have high room reverberation. It may be challenging to reduce reverberation due to noise from the air-conditioning system or any multi-source environmental noise. The multi-source environmental noise may also correspond to a scenario when multiple people are speaking at the environment.

Accordingly, there is a need to overcome the above-mentioned problem. More specifically, there is need to develop a method and system for dereverberation of speech signals, while overcoming reverberation condition and non-stationary noises in a reverberated environment.

SUMMARY

It is an object of some embodiments to develop a method and system for dereverberation of speech signals. It is another object of some embodiments to perform the dereverberation of speech signals using deep learning techniques. The dereverberation for speech signals may be extended for tasks, such as reduction of reverberation, speech enhancement, speaker separation, or the like.

Some embodiments are based on an understanding that clean speech exhibits spectral-temporal patterns. Such spectral-temporal patterns are unique patterns that are exhibited in time-frequency domain and may provide an informative cue for reducing reverberation. While some of the patterns stein from the structure of the speech signal itself, some patterns may also correspond to a linear filter structure of reverberation (i.e., reflection of soundwaves) that is characteristic of the physical space in which the recording is made, including all objects, structures, or entities present in that space, and the positions of the source speech signal and a receiver such as a microphone recording the signal. The signal resulting at a microphone location from the source signal and its reflections on walls and surfaces of objects or people in the space can be described using this linear filter structure, expressing the effect of reverberation on an input signal as a linear convolution of the input signal and a room impulse response (RIR). The input signal is an original source signal also known as dry source signal. The room impulse response is a representation of the effect of the space and everything inside it on the input signal. An estimate of the RIR between a source location and a receiver location can be recorded in a physical space, such as a room, for example by playing an impulsive sound which is a short-duration time-domain signal (e.g., a blank pistol or a balloon exploding) in the room at the source location and recording the subsequent signal at the receiver location. The impulse excites the room and creates a reverberated impulse signal that can be used to estimate the RIR. The reverberation of a dry source sound signal that would be played at the same source location and recorded at the same receiver location can then be modeled by convolving the dry source signal and the estimated RIR. To that end, it is also an object of some embodiments to estimate an underlying filter for approximating or modeling the RIR. In some example embodiments, the RIR may be estimated based on a linear regression problem that is solved per frequency in the time-frequency domain. The filter estimate modeling the RIR may be used to identify delayed and decayed copies of the input signal for the dereverberation of speech signals.

Further, such linear filter may be leveraged as regularization for improving the dereverberation process. For instance, the linear filter as the regularization prevents overfitting of a model for the dereverberation process to a training data. Some embodiments are based on the realization that the linear filter structure may be exploited for a combination of linear prediction and deep learning for single as well as multi-channel reverberant speaker separation and dereverberation tasks. To that end, the deep learning techniques supported with a convolutive prediction may be used for the dereverberation in an environment with noise signals, reverberations of audio signals, or the like. The convolutive prediction is a linear prediction method for speech dereverberation in reverberant conditions, which relies on source estimates obtained by deep neural networks (DNNs) and exploits a linear filter structure between the source estimate and the reverberant version of the source signal within the observed input signal.

To obtain source estimates, the DNNs are trained in the time-frequency or time domain to predict target speech from reverberant speech. The target speech corresponds to a target direct-path signal between a source and a receiver, such as a microphone. This approach may leverage prior knowledge of speech patterns.

Prior works also attempt to leverage some form of linear filter structure in order to perform dereverberation. For instance, weighted prediction error (WPE) may be used for the dereverberation of speech signals. The WPE method computes an inverse linear filter based on variance-normalized delayed linear prediction. The computed linear filter is applied to past observations of the reverberant and potentially noisy mixture input signal to estimate late reverberation of a target source signal within the mixture input signal from the past observations of reverberation for the dereverberation. The estimated late reverberation is subtracted from a mixture of acoustic signals that is received from different sources, to estimate a target speech signal in the mixture of acoustic signals. In some embodiments, the filter may also be estimated with a time-varying power spectral density (PSD) of the target speech signal. The PSD is a distribution of power of a signal over frequency ranges of the signal. Such linear filter may be iteratively estimated using WPE in an unsupervised manner. However, WPE's iterative procedure for the filter estimation may lead to suboptimal results and be computationally expensive.

In order to overcome the aforementioned deficiencies of the WPE, the iterative procedure for the filter estimation may be replaced as in the DNN based WPE (DNN-WPE) approach. The DNN-WPE uses DNN-estimated magnitudes as PSD of the target speech signal for the filter estimation. However, DNN-WPE may not reduce early reflections, because it requires a strict non-zero frame delay to avoid trivial solutions and may not have a mechanism to utilize DNN estimated phase for the filter estimation. DNN-WPE may also lack robustness to interference due to noise signals. For instance, DNN-WPE may estimate a filter that relates past noisy observations to a current noisy observation, thereby limiting the filter estimation accuracy. In addition, DNN-WPE may directly use linear prediction results as its outputs, resulting in partial or minimum reduction of reverberation.

To that end, it is another object of some embodiments to remove both the early reflections and late reverberation for the dereverberation. The early reflections and late reverberation may be removed using the convolutive prediction approach. The convolutive prediction approach leverages both magnitude and phase estimated by a DNN for the filter estimation. The convolutive prediction approach also provides closed-form solutions for the linear filter (just like DNN-WPE approach mentioned previously), which may be suitable for online real-time processing application and capable of being jointly trained with other DNN modules such as acoustic models.

In some embodiments, two DNNs are trained for the dereverberation of speech signals based on the convolutive prediction approach. Initially, a first DNN of the two DNNs outputs a first estimate of a direct-path signal of a target source (such as a person speaking referred to hereinafter as a speaker), from an input, i.e., a mixture of acoustic signals that includes utterances of the speaker. The direct-path signal of the target source is referred to hereinafter as target direct-path signal. The first estimate of the target direct-path signal is used to determine a filter using the convolutive prediction approach, wherein the filter is such that the application of the filter to the target direct-path estimate is as close as possible under some weighted distance function to the residual obtained by subtracting the target direct-path estimate from the mixture. Further, the filter is applied to the first estimate of the target direct-path signal in a time-frequency domain. When the filter is applied to the first estimate of the target direct-path signal, a result is obtained that identifies delayed and decayed copies of the estimated target direct-path signal from the mixture of acoustic signals. The delayed copies and decayed copies are herein derivative signals of the target direct-path signal that are reflected in multiple paths due to reverberation. For instance, the target direct-path signal is reflected in different directions by different objects in an environment, such as a room. Such identified delayed and decayed copies are removed from the mixture of acoustic signals for the dereverberation. The removal of the delayed and decayed copies generates a mixture with reduced reverberation.

The result obtained when the filter is applied to the first estimate of the target direct-path signal is by construction above closest to a residual between the mixture of acoustic signals and the first estimate of the target direct-path signal according to a distance function. The distance function is a weighted distance between the filtered target direct-path signal and the residual obtained by subtracting the target direct-path estimate from the mixture, with a weight at each time-frequency point in the time-frequency domain determined by one or combination of the mixture of acoustic signals and the first estimate of the target direct-path signal. In some embodiments, the distance function is based on a least-square distance. Further, the result of applying the filter to the first estimate of the target direct-path signal is removed from the mixture of acoustic signals to obtain a mixture with reduced reverberation of the target direct-path signal. In some embodiments, this mixture with reduced reverberation is inputted to a second DNN of the two DNNs. The second DNN outputs a second estimate of the target direct-path signal, which may be an improved estimate of the target direct-path signal compared to the first estimate of the target direct-path signal. The second DNN may also perform the steps similar to that of the first DNN. However, in some embodiments, the second DNN may take a different set of signals as input, such as one or a combination of the mixture of acoustic signals, the mixture with reduced reverberation, and the first estimate of the target direct-path signal.

In some embodiments, the first DNN may be trained with an objective of speaker separation. To that end, the first DNN produces multiple outputs corresponding to the first estimate of the target direct-path signal for a speaker from the multiple speakers. Further, the estimation of the filter and the obtaining of the mixture with reduced reverberation is repeated for each of the multiple speakers to produce corresponding filter and corresponding mixture with reduced reverberation for each of the multiple speakers. Then, the corresponding mixtures with reduced reverberation for each of the multiple speakers are combined and the combined mixtures with reduced reverberation for each of the multiple speakers are submitted to the second DNN. The second DNN then produces the second estimate of the target direct-path signal for each of the multiple speakers.

Additionally or alternatively, the mixture with reduced reverberation, i.e., the delayed and decayed copies may be utilized as additional features for the second DNN to determine the second estimate of the target direct-path signal, which improves the dereverberation. Additionally or alternatively, the features corresponding to the delayed and decayed copies may also be used for the speaker separation task. In some example embodiments, the delayed and decayed copies may be identified based on the linear regression problem. In some embodiments, one or a combination of the mixture of acoustic signals and the first estimate of the target direct-path signal may be given as input to the second DNN to produce the second estimate of the target direct-path signal. In some embodiments, the mixture of acoustic signals, the first estimate and the mixture with reduced reverberation are given as input to the second DNN to determine the second estimate of the target direct-path signal.

Some embodiments are also based on the understanding that an individual speaker or each speaker of the multiple speakers is convolved with different RIR. The WPE method estimates a single filter to reduce the reverberation of all sources. However, computing a single filter to de-reverberate the mixture may not be feasible when noise or competing speakers are louder than a target source. The filter calculated this way is biased towards suppressing the reverberation of higher-energy sources. To that end, a dereverberation filter for each source may need to be estimated, as each source is convolved with the different RIR. The method of DNN-WPE may compute a different filter for each source, but it can only do so by using an estimated PSD of each source as a weight in a distance function that DNN-WPE uses to estimate a linear prediction filter, which may limit the accuracy and variety of the different filters.

Some embodiments are based on the realization that in case of multiple speakers in a room, corresponding filter for each individual speaker is estimated for the dereverberation. In the multiple speaker case, the mixture of acoustic signals includes speech signals from the multiple speakers. In such a case, the first DNN generates corresponding first estimate of the target direct-path signal for each of the multiple speakers. To generate a mixture with reduced reverberation for each of the multiple speakers, steps for determining the first estimate for each speaker, the filter for each speaker and submitting one or combination of the first estimate for each speaker, and the mixture with reduced reverberation may be combined and submitted to the second DNN for generating the second estimate of the target direct-path signal for each of the multiple speakers.

In some cases, the mixture of acoustic signals may be received from a single channel, such as a single microphone, or from multiple channels, such as an array of microphones. Each different channel measures a different version of the mixture of acoustic signals. The DNNs may be trained to estimate the target direct-path signal at a reference channel or at each channel. The training may be based on the complex spectral mapping at one or more channel, wherein the DNNs are trained to output an estimate in a time-frequency domain of the target direct-path signal at the one or more channels such that a distance between the estimate and a reference in the time-frequency domain of the target direct-path signal at the one or more channels is minimized. In case of the array of microphones, a beamforming output may be obtained. The beamforming output may be obtained based on statistics computed from one or combination of the first estimate of the target direct-path signal at each microphone of the array of microphones and the mixture with reduced reverberation of the target direct-path signal. The beamforming output may be inputted to the second DNN to produce the second estimate of the target direct-path signal for each of the multiple speakers. Additionally or alternatively, the beamforming output and dereverberation results may be used as additional features for the second DNN to perform better separation and dereverberation tasks.

In some embodiments, the first DNN may be pretrained to obtain the first estimate of the target direct-path signal from an observed mixture of acoustic signals. The pretraining of the first DNN may be performed using a training dataset of mixtures of acoustic signals and corresponding reference target direct-path signal in the training dataset. In particular, the pretraining of the first DNN may be performed by minimizing a loss function. The loss function may comprise one or a combination of a distance function defined based on real and imaginary (RI) components of the first estimate of the target direct-path signal in a complex time-frequency domain and RI components of the corresponding reference target direct-path signal. The distance function may also be defined based on a magnitude obtained from the RI components of the first estimate of the target direct-path signal in the complex time-frequency domain and the corresponding magnitude of the reference target direct-path signal.

Additionally or alternatively, the distance function may be defined based on a reconstructed waveform obtained from the RI components of the first estimate of the target direct-path signal by reconstruction in the time domain and the corresponding waveform of the reference target direct-path signal.

In some alternative embodiments, the distance function may be defined based on RI components of the first estimate in a second complex time-frequency domain obtained by transforming the reconstructed waveform further in the second time-frequency domain and the corresponding RI components of the reference target direct-path signal in the second time-frequency domain.

In some alternative embodiments, the distance function may be defined based on a magnitude obtained from the RI components of the first estimate in the second complex time-frequency domain obtained by transforming the reconstructed waveform further in the second time-frequency domain and the corresponding magnitude of the reference target direct-path signal in the second time-frequency domain.

In some example embodiments, the first estimate of the target direct-path signal may be replaced with the second estimate of the target direct-path signal to obtain an updated first estimate of the target-direct signal. The steps of obtaining the first estimate, obtaining the filter and the submitting the first estimate and the mixture with reduced reverberations may be iterated for the updated first estimate of the target-direct signal to obtain an updated second estimate of the target-direct signal.

In some examples, the steps mentioned above are repeated for each of the multiple speakers in a multi-speaker scenario to produce corresponding filter for each of the multiple speakers. Further, a portion of the received mixture of acoustic signals may be extracted corresponding to a speaker of the multiple speakers by removing reverberant speech of other speakers of the multiple speakers from the mixture of acoustic signals. The estimate of a reverberant speech of another speaker of the multiple speakers is obtained by adding the first estimate of the target direct-path signal for the other speaker to the result of applying the corresponding filter for the other speaker to the first estimate of the target direct-path signal for the other speaker. After the extraction, the filter for estimating the mixture with reduced reverberation for each speaker of the multiple speakers may be estimated based on the portion of the received mixture.

Some embodiments provide evaluation results on speech dereverberation and speaker separation that show the effectiveness of the dereverberation of speech signals based on the convolutive prediction approach.

Accordingly, one embodiment of the present disclosure discloses a method executed by a computer for dereverberation of speech signals. The method includes receiving, via an input interface, a mixture of acoustic signals including a target direct-path signal and a plurality of reverberations of the target direct-path signal. The method includes submitting the received mixture of acoustic signals to a first DNN to produce a first estimate of the target direct-path signal. The method includes estimating a filter modeling a room impulse response (RIR) for the first estimate of the target direct-path signal, wherein the filter when applied to the first estimate of the target direct-path signal generates a result that is closest to a residual between the mixture of the acoustic signals and the first estimate of the target direct-path signal according to a distance function. The method includes obtaining a mixture with reduced reverberation of the target direct-path signal by removing the result of applying the filter to the first estimate of the target direct-pat signal from the mixture of acoustic signals. The method includes submitting the mixture with reduced reverberation to a second DNN to produce a second estimate of the target direct-path signal. The method further includes outputting the second estimate of the target direct-path signal via an output interface.

Accordingly, another embodiment of the present disclosure discloses a system for dereverberation of speech signals. The system includes an input interface configured to receive a mixture of acoustic signals including a target direct-path signal and a reverberation of the target direct-path signal. The system includes a memory storing a first Deep Neural Network (DNN) and a second DNN. The system includes a processor configured to: submit the received mixture to the first DNN to produce a first estimate of the target direct-path signal, estimate a filter modeling a room impulse response (RIR) for the first estimate of the target direct-path signal, wherein the filter when applied to the first estimate of the target direct-path signal generates a result closest to a residual between the mixture of the acoustic signals and the first estimate of the target direct-path signal according to a distance function, obtain a mixture with reduced reverberation of the target direct-path signal by removing the result of applying the filter to the first estimate of the target direct-path signal from the received mixture and submit the mixture with reduced reverberation to a second DNN to produce a second estimate of the target direct-path signal. The system further includes an output interface configured to output the second estimate of the target direct-path signal.

Further features and advantages will become more readily apparent from the following detailed description when taken in conjunction with the accompanying drawings.

BRIEF DESCRIPTION OF THE DRAWINGS

The present disclosure is further described in the detailed description which follows, in reference to the noted plurality of drawings by way of non-limiting examples of exemplary embodiments of the present disclosure, in which like reference numerals represent similar parts throughout the several views of the drawings. The drawings shown are not necessarily to scale, with emphasis instead generally being placed upon illustrating the principles of the presently disclosed embodiments.

FIG. 10 shows a tabular representation corresponding to a simulated test for dereverberation of speech signals, according to embodiments of the present disclosure.

FIG. 11 shows a tabular representation depicting evaluation results for the dereverberation of speech signals using a test dataset, according to embodiments of the present disclosure.

FIG. 12 shows a tabular representation depicting evaluation results for the dereverberation of speech signals using a test dataset, according to some other embodiments of the present disclosure.

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DETAILED DESCRIPTION

In the following description, for purposes of explanation, numerous specific details are set forth in order to provide a thorough understanding of the present disclosure. It will be apparent, however, to one skilled in the art that the present disclosure may be practiced without these specific details. In other instances, apparatuses and methods are shown in block diagram form only in order to avoid obscuring the present disclosure. Contemplated are various changes that may be made in the function and arrangement of elements without departing from the spirit and scope of the subject matter disclosed as set forth in the appended claims.

As used in this specification and claims, the terms "for example," "for instance," and "such as," and the verbs "comprising," "having," "including," and their other verb forms, when used in conjunction with a listing of one or more components or other items, are each to be construed as open ended, meaning that the listing is not to be considered as excluding other, additional components or items. The term "based on" means at least partially based on. Further, it is to be understood that the phraseology and terminology employed herein are for the purpose of the description and should not be regarded as limiting. Any heading utilized within this description is for convenience only and has no legal or limiting effect.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

While most of the descriptions are made using speech as a target sound source, the same methods can be applied to other types of audio signals.

System Overview

Figure 1A:
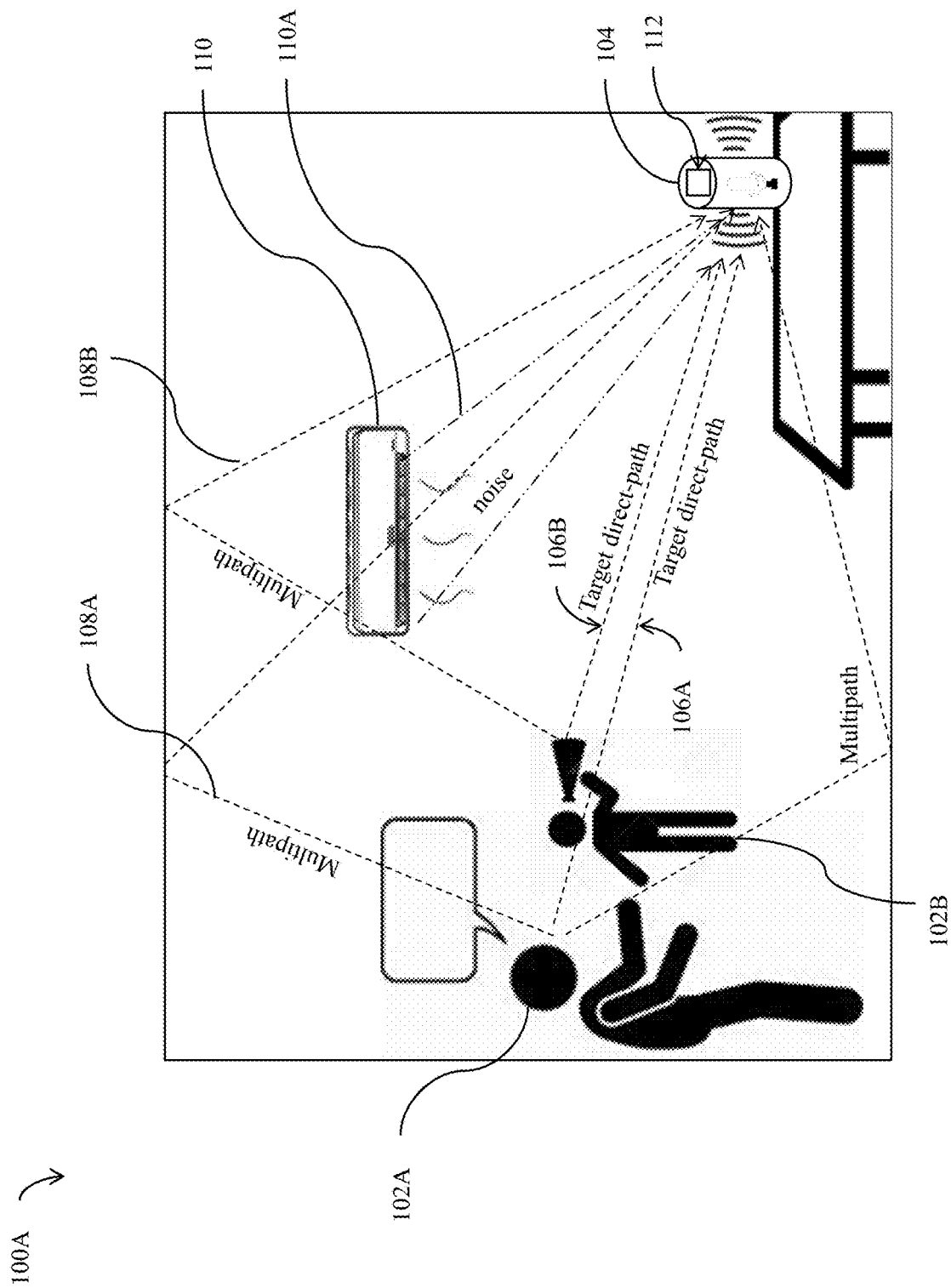
FIG. 1A illustrates an exemplary representation for dereverberation of speech signals, according to embodiments of the present disclosure.

FIG. 1A illustrates a representation of an environment 100A for dereverberation of speech signals, according to embodiments of the present disclosure. The environment 100A may correspond to an enclosed environment with a speaker 102. In FIG. 1A, there is also shown a device 104 that includes at least a microphone or an array of microphones. In some example embodiments, the device 104 may correspond to an automatic speech recognition (ASR) system, an audio signal processing system, or any speech processing system.

In an illustrative example scenario, when the speaker 102 outputs a speech, corresponding acoustic speech signals may travel towards the device 104 in different paths. The acoustic speech signals may be linearly distorted by object reflections, such as wall reflections, ceiling reflections or the like, as shown in FIG. 1A. In particular, the acoustic speech signals of the speaker 102 are distorted in multi-path directions before reaching to the device 104, resulting in reverberation of the acoustic speech signals.

Accordingly, the device 104 receives such acoustic speech signals of the speaker 102A as a mixture of acoustic signals. The mixture of acoustic signals includes an anechoic speech signal and reverberated speech signals. The anechoic speech signal is a target direct-path signal 106A. The reverberated speech signals collectively referred to hereinafter as reverberations 108A include non-direct path signals or multi-path signals. In some cases, there may be multiple speakers, such as presence of the speaker 102A along with another speaker 102B in the environment 100. In such cases, the mixture of acoustic signals includes a target direct-path signal 106B and reverberated speech signals, collectively referred to hereinafter as reverberations 108B corresponding to the speaker 102B. The mixture of acoustic signals may also include reverberant noise signals 110A of a non-target source, such as air-conditioning device 110 in the environment 100A.

Figure 1B:
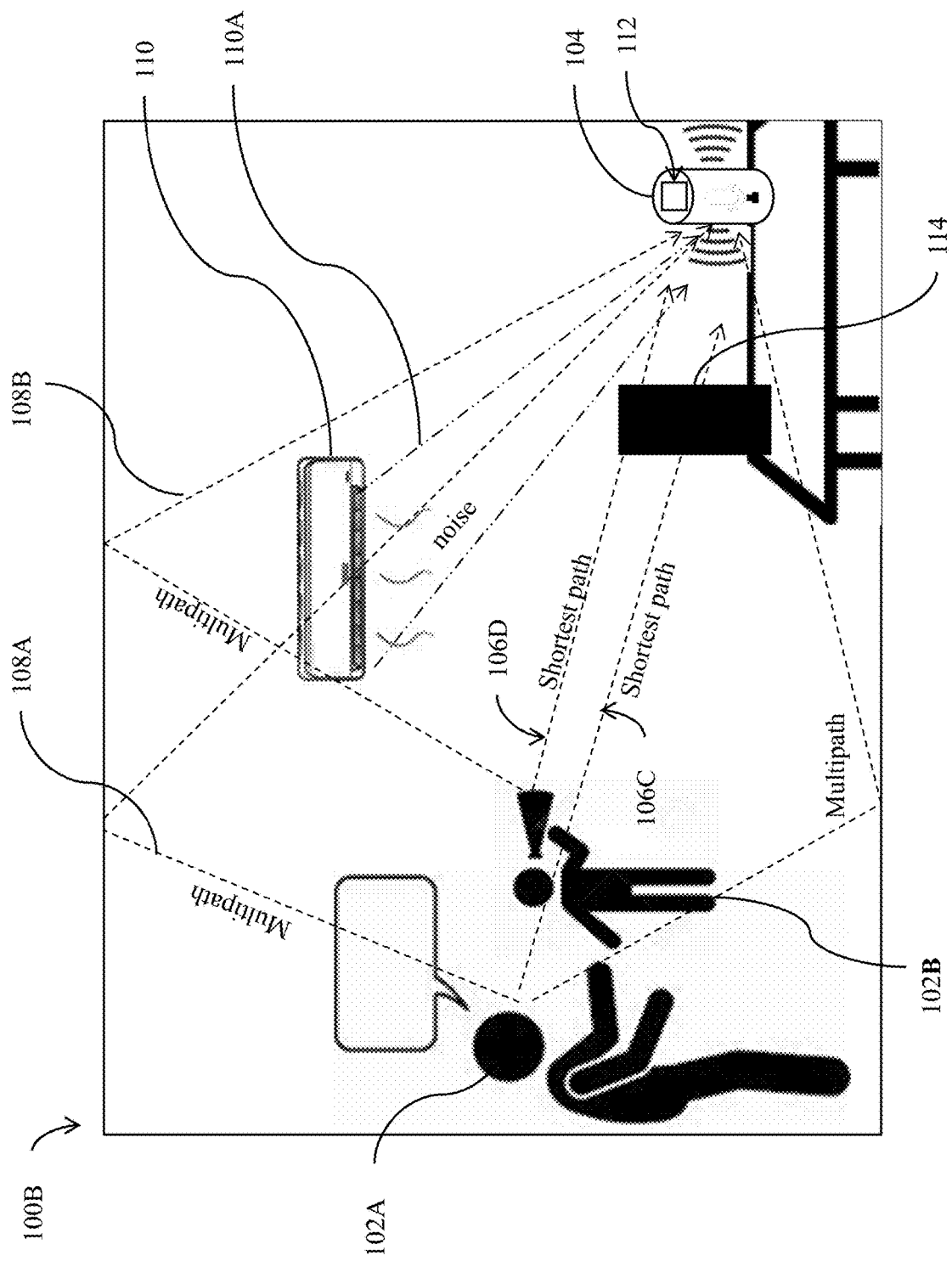
FIG. 1B illustrates an exemplary representation for dereverberation of speech signals, according to another embodiment of the present disclosure.

In some cases, the speech signals of the speaker 102A and/or the speaker 102B may be obstructed before reaching the device 104, which is shown in FIG. 1B.

FIG. 1B illustrates an exemplary representation for dereverberation of speech signals, according to another embodiment of the present disclosure. As shown in an environment 100B of FIG. 1B, the speech signals of the speaker 102A or the speaker 102B is obstructed by a block 114 before reaching the device 104. The block 114 may reverberate the speech signals of corresponding speaker (such as the speaker 102A or the speaker 102B) in different directions. Such reverberation may increase decayed and delayed copies (not shown in FIG. 1B) of the speech signals of the speaker 102A or the speaker 102B. When the device 104 is obstructed by the block 114, the speech signals of the speaker 102A or the speaker 102B may not have the corresponding target direct-path signal. Instead, the speech signals may include shortest path, such as shortest path 106C of a speech signal corresponding to the speaker 102A and/or a shortest path 106D of a speech signal corresponding to the speaker 102B. In such conditions, for the purposes of description in this application, we consider the shortest path signal as the target direct-path signal, and signals corresponding to longer paths than the shortest path are considered as the reverberations.

The device 104 may reduce such reverberations, e.g., the reverberations 108A and 108B using a system 112 that may be integrated or embedded in the device 104. The system 112 is further explained with reference to FIG. 2.

Figure 2:
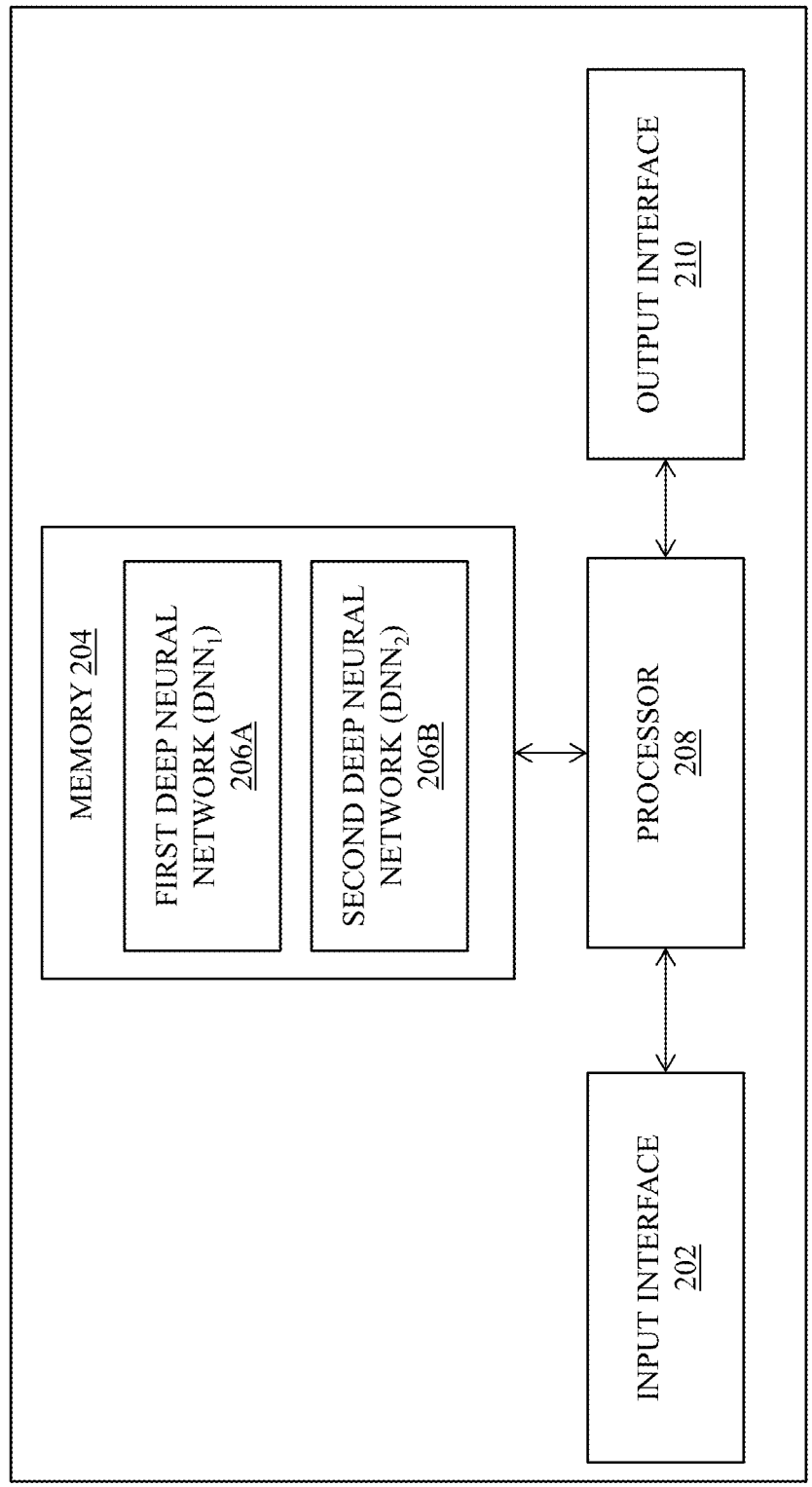
FIG. 2 shows a schematic block diagram of a system for dereverberation of speech signals, according to embodiments of the present disclosure.

FIG. 2 shows a schematic block diagram of a system 200 for dereverberation of speech signals, according to embodiments of the present disclosure. The system 200 corresponds to the system 112 of FIG. 1A and FIG. 1B.

In some example embodiments, the system 200 includes an input interface 202, a memory 204 storing a first deep neural network ($DNN_1$) (e.g., $DNN_1$ 206A), a second deep neural network ($DNN_2$) (e.g., $DNN_2$ 206B), a processor 208, and an output interface 210.

The input interface 202 is configured to receive a mixture of acoustic signals including a target direct-path signal (e.g., the target direct-path signal 106A or the target direct-path signal 106B) and reverberations of the target direct-path signal (e.g., the reverberations 108A and/or the reverberations 108B). In some example embodiments, the input interface 202 may be configured to connect with at least a microphone of the device 104, or an array of microphones of the device 104.

The processor 208 submits the mixture of acoustic signals including the target direct-path signal 106A and the reverberations 108A to the $DNN_1$ 206A. The $DNN_1$ 206A outputs a first estimate of the target direct-path signal 106A. In a multiple speaker scenario including the speaker 102A and the speaker 102B generating sound signals in the environment 100A or in the environment 100B, a target direct-path signal corresponding to each of the speaker 102A and 102B is estimated by the $DNN_1$ 206A. The $DNN_1$ 206A may determine the corresponding estimate of the target direct-path signal either one by one or simultaneously for each of the speakers 102A and 102B. For instance, the $DNN_1$ 206A simultaneously determines the first estimate of the target direct-path signal 106A of the speaker 102A and a first estimate of the target direct-path signal 106B of the speaker 102B.

The first estimate of the target direct-path signal 106A is used together with the received mixture of acoustic signals to estimate a filter modeling a room impulse response (RIR) for the first estimate of the target direct-path signal 106A. The RIR is an impulse response of a room, e.g., the environment 100A or the environment 100B, between a source of sound (e.g., the speaker 102A, and the speaker 102B) and a microphone in the device 104. The filter modeling the RIR may be outputted via the output interface 210.

In some embodiments, the filter modeling the RIR for the first estimate of the target direct-path signal is estimated such that, when it is applied to the first estimate of the target direct-path signal 106A, a corresponding result is closest to a residual between the mixture of acoustic signals and the first estimate of the target direct-path signal according to a distance function. In some embodiments, the distance function may correspond to a weighted distance with a weight at each time-frequency point in the time-frequency domain. The weight may be determined by one or a combination of the received mixture of acoustic signals and the first estimate of the target direct-path signal. In an example embodiment, the distance function may be based on a least-square distance.

When the result of the application of the filter to the first estimate of the target direct-path signal 106A is removed from the mixture of acoustic signals, a mixture with reduced reverberation of the target direct-path signal 106A is obtained. The mixture with reduced reverberation of the target direct-path signal 106A is given as an input to the DNN$_2$ 206B. The DNN$_2$ 206B generates a second estimate of the target direct-path signal 106A. The second estimate of the target direct-path signal 106A is outputted via the output interface 210.

Likewise for the speaker 102B, the second estimate of the target direct-path signal 106B is used together with the received mixture of acoustic signals to estimate a filter that models the RIR for the first estimate of the target direct-path signal 106B. The filter is applied to the first estimate of the target direct-path signal 106B to obtain a corresponding result. The result is removed from the mixture of acoustic signals to obtain a mixture with reduced reverberation of the target direct-path signal 106B. The mixture with reduced reverberation of the target direct-path signal 106B is inputted to the DNN$_2$ 206B that generates a second estimate of the target direct-path signal 106B.

The second estimate of the target direct-path signal (such as the second estimate of the target direct-path signal 106A or the second estimate of the target direct-path signal 106B) is obtained as dereverberated speech signals of corresponding speaker (such as the speaker 102A or the speaker 102B). The dereverberation of speech signals by the system 200 is further described in detail with reference to FIG. 3.

Figure 3A:
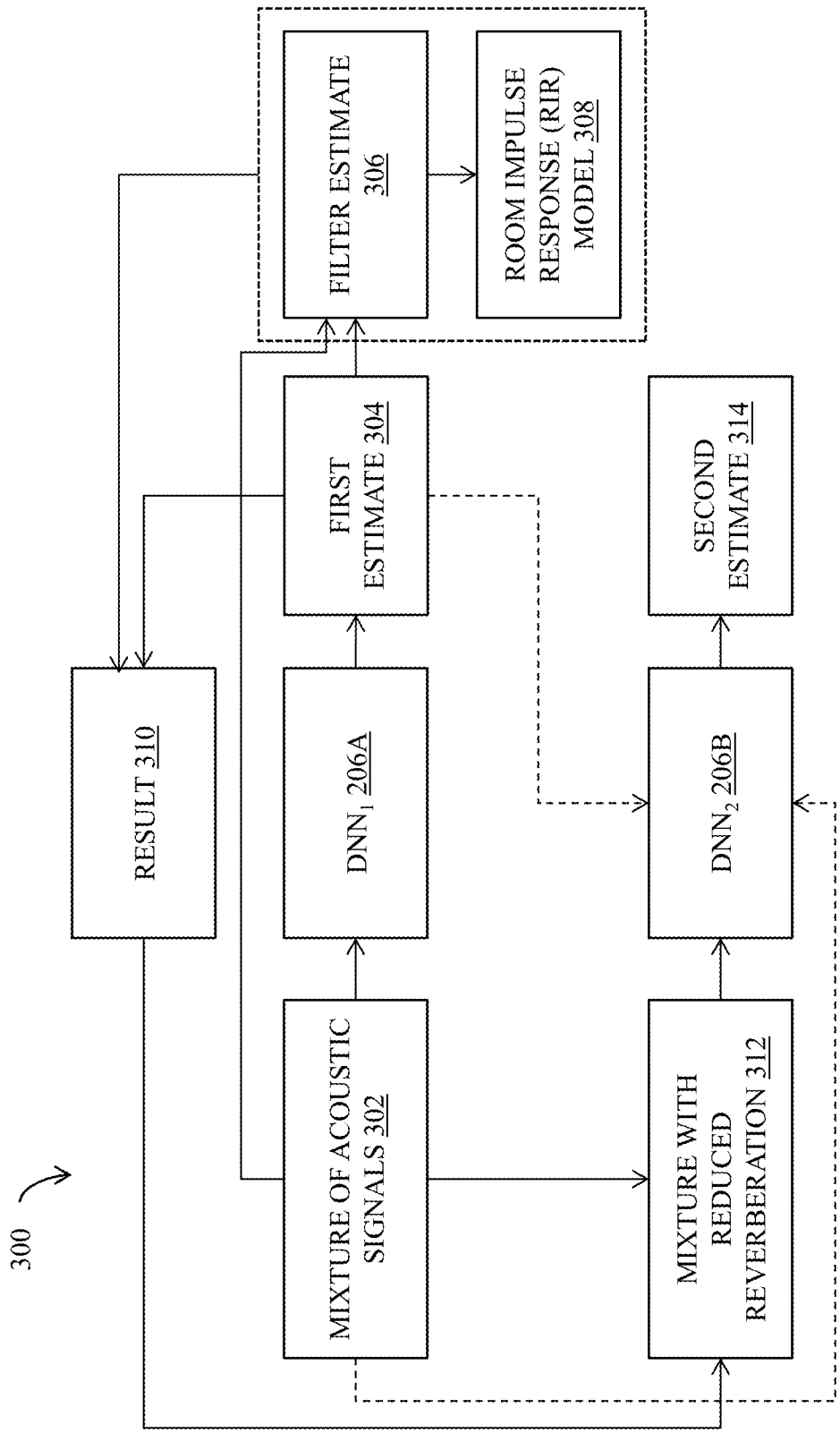
FIG. 3A shows a schematic block diagram of a process for dereverberation of speech signals, according to embodiments of the present disclosure.

FIG. 3A shows a schematic block diagram of a process 300 for dereverberation of speech signals, according to embodiments of the present disclosure. The process 300 is executed by the system 200. In an example embodiment, a mixture of acoustic signals 302 (Y) is received via the input interface 202 of the system 200. The mixture of acoustic signals includes a target direct-path signal, such as the target direct-path signal 106A of the speaker 102A, and reverberations, such as the reverberations 108A of the target direct-path signal 106A, or the target direct-path signal 106B of the speaker 102B and the reverberations 108B of the target direct-path signal 106B, along with reverberations of other sources, such as noise signals 110A of the device 110. The received mixture of acoustic signals 302 is submitted to the DNN$_1$ 206A.

The DNN$_1$ 206A determines a first estimate 304 of the target direct-path signal, such as the target direct-path signal 106A or the target direct-path signal 106B. Further, a filter estimate 306 (interchangeably referred to hereinafter as filter 306) is determined for modeling a room impulse response (RIR) 308 for the first estimate 304 of the target direct-path signal 106A. The RIR model 308 referred to hereinafter as RIR 308 may correspond to an impulse response of an environment, such as the environment 100A or the environment 100B, between a source, such as the speaker 102A and/or the speaker 102B and a receiver, such as the device 104. To that end, the absolute delay and decay due to the propagation from the source to the microphone is not modeled, but only the relative delay and decay using the direct-path signal as reference is modeled. The impulse response is not considered for the actual dry source signal at the source location, but relative to the direct-path signal received within the mixture as a reference. For ease of presentation, the filter estimate 306 is such that the application of the filter estimate 306 to the direct-path signal only includes early reflections and late reverberation of the direct-path signal, and not the direct path signal. An associated full filter estimate 307 is equivalently obtained by modifying the filter estimate 306 to further include the direct-path signal. The two filter estimates are equivalent, and one can be straightforwardly obtained from the other.

In some example embodiments, the mixture of acoustic signals 302 may correspond to a monaural signal recorded in a noisy-reverberant environment, such as the environment 100A or the environment 100B. Such monaural signal may be formulated into a physical model in a time-domain. The physical model describes relationships between the mixture of acoustic signals 302 (y), a reverberant target speech signal (x) (which includes both the target direct-path signal such as the target direct-path signal 106A and the reverberations such as the reverberations 108A), and non-target sources (v) (e.g., the device 110) including reverberant noise signals (e.g., the reverberant noise signals 110A) and reverberant competing speakers (e.g., the speaker 102B).

The formulated physical model of the mixture of acoustic signals 302, considering the target direct-path signal 106A as the unique target for simplicity of notations, in the time domain may be represented as:

$$y[n] = x[n] + v[n] = (a*r)[n] + v[n] = (a*r_d)[n] + (a*r_{e+l})[n] + v[n] = \quad (1)$$
$$(a*r_d)[n] + (a*r_e + a*r_l)[n] + v[n] = s[n] + h[n] + v[n],$$

where "n" indexes discrete time, "*" denotes a convolution operator, and "x" is a linear convolution between a dry source signal "a" (e.g., original source of signal from the speaker 102A) and an RIR "r" of the environment 100, i.e., the RIR model 308.

The terms "$r_d$", "$r_e$", and "$r_l$" respectively denote direct, early, and late parts of the RIR 308 of the environment 100. The term "s" denotes a target direct-path signal (such as the target direct-path signal 106A) and the target direct-path signal is defined as s=a*$r_d$. The term "h" denotes a non-direct-path signal (e.g., the reverberations 108A) and the non-direct path signal is defined as a summation of the early reflections a*$r_e$ and late reverberation a*$r_l$, i.e., h=a*$r_e$+a*$r_l$=a*$r_{e+l}$. The part $r_{d+e}$ of the RIR 308 corresponding to both direct-path and early reflections may be defined as the set of impulses up to 50 ins after the direct-path peak of r, and the early reflection component $r_e$ of the RIR may be defined as $r_e$=$r_{d+e}$−$r_d$. The filter modeling the RIR in this application is considered with reference to $r_d$, that is, the origin of time for the filter is implicitly considered as the time of the impulse of $r_d$, and the scaling of the elements of the filter are considered relative to the height of the impulse of $r_d$.

The above physical model of the mixture of acoustic signals 302 may be formulated in a short-time Fourier transform (STFT) for evaluating time series, i.e., Fourier transform of the mixture of acoustic signals 302 over a short time window. The physical model of the mixture of acoustic signals 302 in STFT domain is formulated as, $$Y(t,f)=X(t,f)+V(t,f)=S(t,f)+H(t,f)+V(t,f), \quad (2)$$

where Y(t, f), X(t, f), S(t, f), H(t, f), and V(t, f) respectively denote the STFT coefficients of the mixture of acoustic signals 302 captured by the device 104, reverberant target speech, target direct-path signal, early reflections plus late reverberation, and non-target sources (e.g., the air-conditioning device 110) at time t and frequency f. The corresponding spectrograms are denoted by Y, X, S, H, and V.

The target direct-path signal 106A denoted as S(t, f) in equation (2) is estimated from the STFT coefficients of the mixture of acoustic signals 302 (Y(t, f)) using a DNN. The recovered target direct-path signal 106A (S(t, f)) may be used as a first estimate 304 of the target direct-path signal 106A.

The filter 306 may be estimated by filtering the target direct-path signal ($\hat{S}_{DNN_b}$), i.e., the first estimate 304 of the target direct-path signal to approximate the residual between the mixture of acoustic signals 302 and the first estimate of the direct-path signal 304.

To that end, in some embodiments, the filter 306 is estimated based on a convolutive prediction. The convolutive prediction corresponds to a forward convolutive prediction (FCP) that forwardly filters the first estimate 304 of the target direct-path signal 106A obtained by the DNN$_1$ 206A. The forward filtering may estimate the filter 306 by solving the following minimization problem $$\operatorname*{argmin}_{g'(f)} \sum_t \frac{\left|Y(t,f) - \hat{S}_{DNN_b}(t,f) - g'(f)^H \tilde{S}_{DNN_b}(t,f)\right|^2}{\hat{\lambda}(t,f)}, \quad (3)$$

where $\tilde{S}_{DNN_b}(t, f)=[\hat{S}_{DNN_b}(t, f), \hat{S}_{DNN_b}(t-1, f), \ldots, \hat{S}_{DNN_b}(t-K+1, f)]^T$. The dereverberation result, which is a mixture with reduced reverberation of the target direct-path signal, is computed as Y(t, f)− $\tilde{g}'(f)^H \tilde{S}_{DNN_b}(t, f)$, where the subtracted term $\tilde{g}'(f)^H \tilde{S}_{DNN_b}(t, f)$ is considered as the reverberation estimated by forward filtering. $\hat{S}_{DNN_b}$ indicates an estimate of the target direct-path signal 106A obtained by a DNN DNN$_b$, such as DNN$_1$ 206A. The first estimate ($\hat{S}_{DNN_b}$) 304 of the target direct-path signal 106A is reverberated using a filter per frequency to find delayed and decayed copies of the target direct-path signal. Such copies are repetitive signals of the first estimate 304 that is considered as reverberation of the target direct-path signal 106A.

The filter 306 ( $\tilde{g}$ (f)) is then applied to the first estimate of the target direct-path signal and the result is subtracted from the mixture of acoustic signals 302. This results in removing both early reflections and late reverberation of the target direct-path signal 106A, while leveraging both magnitude and phase of the first estimate by the DNN$_1$ 206A in the filter estimation.

By absorbing the first estimate 304 ($\hat{S}_{DNN_b}(t, f)$) into ($\tilde{S}_{DNN_b}(t, f)$), a new formulation may be given as $$\operatorname*{argmin}_{g(f)} \sum_t \frac{\left|Y(t,f) - g(f)^H \tilde{S}_{DNN_b}(t,f)\right|^2}{\hat{\lambda}(t,f)}, \quad (4)$$

where $|\cdot|$ computes magnitude of the first estimate 304, and $\hat{\lambda}$(t, f) is a scalar used to weight the contribution of each time-frequency bin in the loss function.

Using Eq. (4) the first estimate 304 is filtered to approximate reverberant target speech X. The dereverberation result is obtained as, $$i.\hat{S}_{FCP}(t,f)=Y(t,f)-(\hat{g}(f)^H \tilde{S}_{DNN_b}(t,f)-\hat{S}_{DNN_b}(t,f)), \quad (5)$$

where $\hat{g}(f)^H \tilde{S}_{DNN_b}(t, f)$ is an estimate of reverberant target speech X(t, f), and $\hat{g}(f)^H \tilde{S}_{DNN_b}(t, f)-\hat{S}_{DNN_b}(t, f)$ is the estimated reverberation of the corresponding speaker 102A. Further, $$ii.\hat{S}_{FCP}(t,f)=\hat{S}_{DNN_b}(t,f)+(Y(t,f)-\hat{g}(f)^H \tilde{S}_{DNN_b}(t,f)). \quad (6)$$

Eq. (6) may be interpreted as adding to the first estimate $\hat{S}_{DNN_b}$ the residual component in Y that cannot be explained by linear filtering of $\hat{S}_{DNN_b}$. The filter estimation for the forward filtering is obtained by solving a quadratic minimization problem, and a closed-form solution may be used, which is convenient for online processing applications. Using Eq. (3) or Eq. (6), early reflections and late reverberation of the first estimate of the target direct-path signal 106A are removed by the forward filtering, while utilizing both magnitude and phase for estimation of the filter 306. The filter 306 is applied to the first estimate 304 and not to the mixture of acoustic signals 302. Note that the filter 306 corresponds to the filter $\tilde{g}$ obtained using Eq. (3), and the full filter 307 corresponds to the filter $\hat{g}$, which differs from $\tilde{g}$ in that $\tilde{g}'(f)^H \tilde{S}_{DNN_b}(t, f)=\hat{g}(f)^H \tilde{S}_{DNN_b}(t, f)-\hat{S}_{DNN_b}(t, f)$, that is, they differ in whether the target-direct path signal itself is included or not in the result of the filtering. In the case of the filter 306, it is not included, and only the reverberation is.

Also, solving Eq. (6) leads to good filter estimation even in the presence of interference for a corresponding target speaker, such as the speaker 102A or the speaker 102B. Eq. (6) may be reformulated in terms of reverberant target speech (X) of the speaker 102A. For instance, the mixture of acoustic signals (Y) 302 that includes the reverberant target speech and the interference, is defined as, Y=X+V, $$\operatorname*{argmin}_{g(f)} \sum_t \frac{\left|X(t,f) + V(t,f) - g(f)^H \tilde{S}_{DNN_b}(t,f)\right|^2}{\hat{\lambda}(t,f)} \Leftrightarrow \quad (7)$$

$$\operatorname*{argmin}_{g(f)} \sum_t \frac{\left|X(t,f) - g(f)^H \tilde{S}_{DNN_b}(t,f)\right|^2 + |V(t,f)|^2}{\hat{\lambda}(t,f)} \Leftrightarrow$$

$$\operatorname*{argmin}_{g(f)} \sum_t \frac{\left|X(t,f) - g(t)^H \tilde{S}_{DNN_b}(t,f)\right|^2}{\hat{\lambda}(t,f)},$$

where $\hat{S}_{DNN_b}$ and X may be uncorrelated with V, such that $$\sum_t \frac{V(t,f)^H \left(X(t,f) - g(t)^H \tilde{S}_{DNN_b}(t,f)\right)}{\hat{\lambda}(t,f)} \approx 0. \quad (8)$$

In Eq. (7), the forward filtering estimates the full filter 307 based on the first estimate ($\hat{S}_{DNN_b}$) 304 and the reverberant target speech (X). In between the first estimate ($\hat{S}_{DNN_b}$) 304 and the reverberant target speech, a linear-filter structure may occur, which produces a full filter estimate 307 for the target speaker 102A. Accordingly, a good full filter estimate 307 (and from it a good filter estimate 306) may be obtained for the target speaker, such as the speaker 102A, even if the mixture of acoustic signals 302 contains noises (e.g., noise signals 110A) or competing speakers, e.g., the speaker 102B.

The estimation of the filter 306 may be improved by computing the full filter estimate 307 using Eq. (7) if an estimate of the reverberant target speech X may be obtained. In some embodiments, estimates of the reverberant speech of each speaker is iteratively removed from the mixture of acoustic signals 302 to refine the reverberant target signal used in the estimation of the filter 306.

In the current embodiment, Eq. (4) of FCP may remove the reverberation related to the target speaker 102A. Being able to obtain the reverberation of the target speaker 102A may be particularly useful in multi-speaker separation task, as each target speaker is convolved with a different RIR. To that end, in some embodiments, a different filter may be computed to dereverberate each speaker (described in FIG. 6). The estimated filter, e.g., the filter 306 may focus on reducing the reverberation of the target speaker 102A rather than that of another speaker (e.g., the speaker 102B) and non-target sources (e.g., the air-conditioning device 110) combined. In order to dereverberate the speech signals even in presence of the non-target sources, output of the $DNN_1$ 206A, such as the first estimate 304 of the target direct-path signal 106A, and the mixture with reduced reverberation obtained using filter 306 may be leveraged for the dereverberation of speech signals. To that end, the first estimate 304 and the mixture with reduced reverberation obtained using filter 306, may be inputted to the $DNN_2$ 206B to output a second estimate 314 of the target direct-path signal 106A (or the target direct-path signal 106B). The output generated by the $DNN_2$ 206B, such as the second estimate 314 may be better than the output of the $DNN_1$ 206A as the inputs to the $DNN_2$ 206B (i.e., the first estimate 304 and the mixture with reduced reverberation obtained using filter 306) are more refined than input of the $DNN_1$ 206A. For instance, the first estimate 304 and the mixture with reduced reverberation obtained using filter 306 outputted by the $DNN_1$ 206A may have less interferences. When these first estimate 304 and the mixture with reduced reverberation obtained using filter 306 with the less interferences are processed by the $DNN_2$ 206B, the corresponding output (i.e., the second estimate 314) may be better than the output (i.e., the first estimate 304) of the $DNN_1$ 206A. The second estimate generated by the $DNN_2$ 206B may thus be used to perform another iteration of convolutive prediction to obtain a second filter and a second mixture with reduced reverberation, and the second mixture with reduced reverberation may be inputted together with the second estimate to the $DNN_2$ 206B to produce a refined output.

In some example embodiments, corresponding RIR of each speaker, such as the RIR 308 may be estimated by solving a linear regression problem per frequency in a time-frequency or time domain. The filter 306 modeling the RIR 308 may be used to identify delayed and decayed copies of the target direct-path signal of the speaker 102A and/or the speaker 102B. The delayed and decayed copies that are repetitive patterns due to reverberation may be removed from the received mixture of acoustic signals 302. To that end, the filter 306 is applied to the first estimate 304 to output a result 310. The result 310 may be closest to a residual between the mixture of the acoustic signals 302 and the first estimate 304 of the target direct-path signal based on a distance function, such as a weighted least-square distance function. When the result 310 is removed from the mixture of acoustic signals 302, a mixture with reduced reverberation 312 is obtained.

The mixture with reduced reverberation 312 is mathematically represented as $Y(t, f) - \hat{g}(f)^H \tilde{S}_{DNN_b}(t, f)$, where the subtracted term ($\hat{g}(f)^H \tilde{S}_{DNN_b}(t, f)$) is considered as the reverberation estimated by the filter 306.

The removal of the result 310 reduces the delayed and decayed copies from the mixture with reduced reverberation 312. The delayed and decayed copies may correspond to late reverberation and early reflections of the target direct-path signal. These early reflections and the late reverberation may be identified from the RIR 308 modeled by the filter estimate 306. The RIR 308 with the early reflections and late reverberation are shown in FIG. 3B.

Figure 3B:
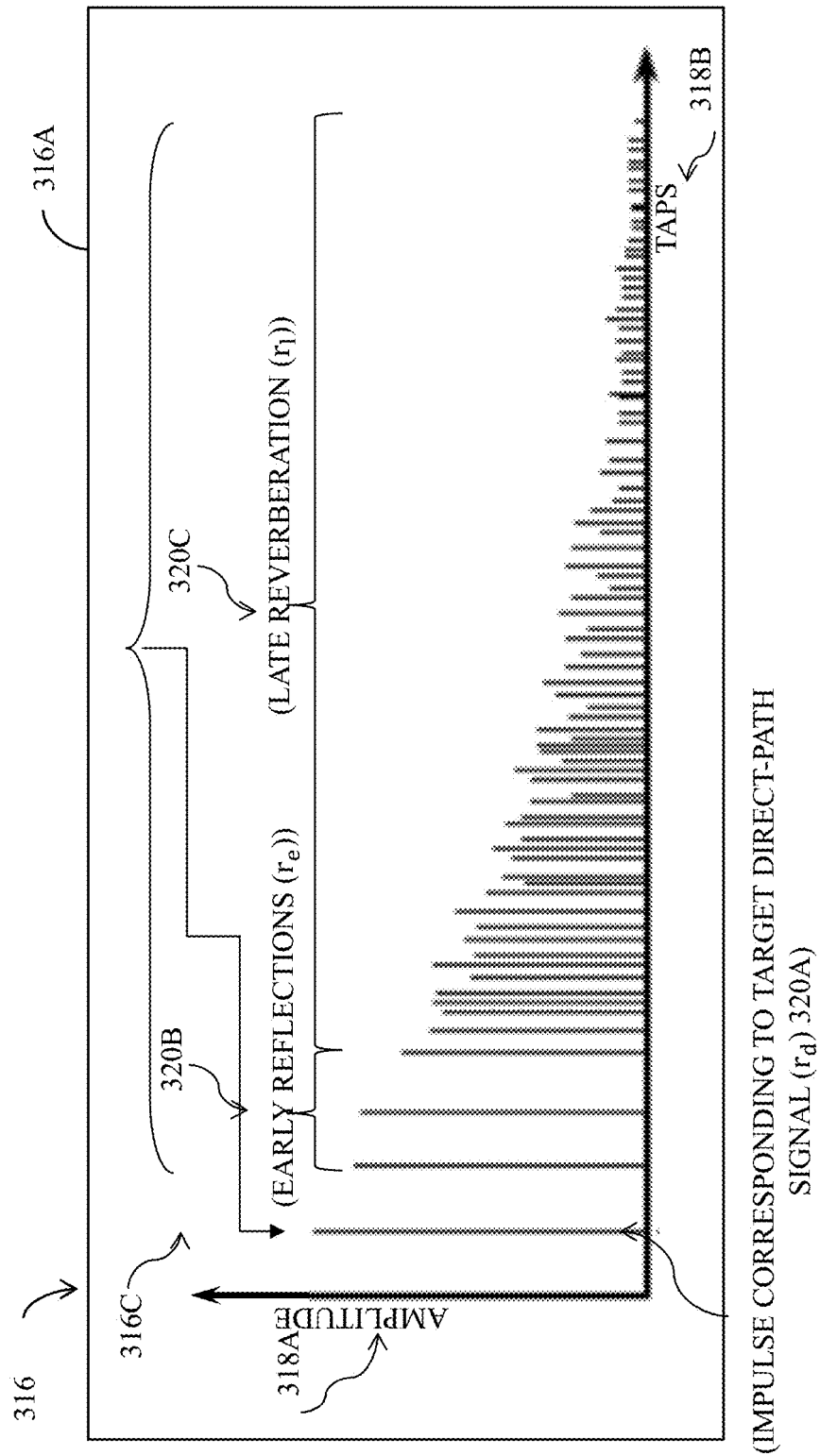
FIG. 3B shows a representation of a room impulse response (RIR) in the time domain, according to embodiments of the present disclosure.

FIG. 3B shows a representation 316 of a room impulse response (RIR) model 316A for an original source of signal from a speaker such as speaker 102A, showing the impulse corresponding to the target direct-path signal 320A, impulses corresponding to early reflection 320B, and impulses corresponding to late reverberation 320C. In this application, we consider the target direct-path signal as reference instead of the original source of signal from the speaker. In other words, application of the RIR to the target direct-path signal leads to the reverberant signal of the speaker which is the sum of the target direct-path signal with the early reflections and late reverberation of the target direct-path signal.

Figure 3C:
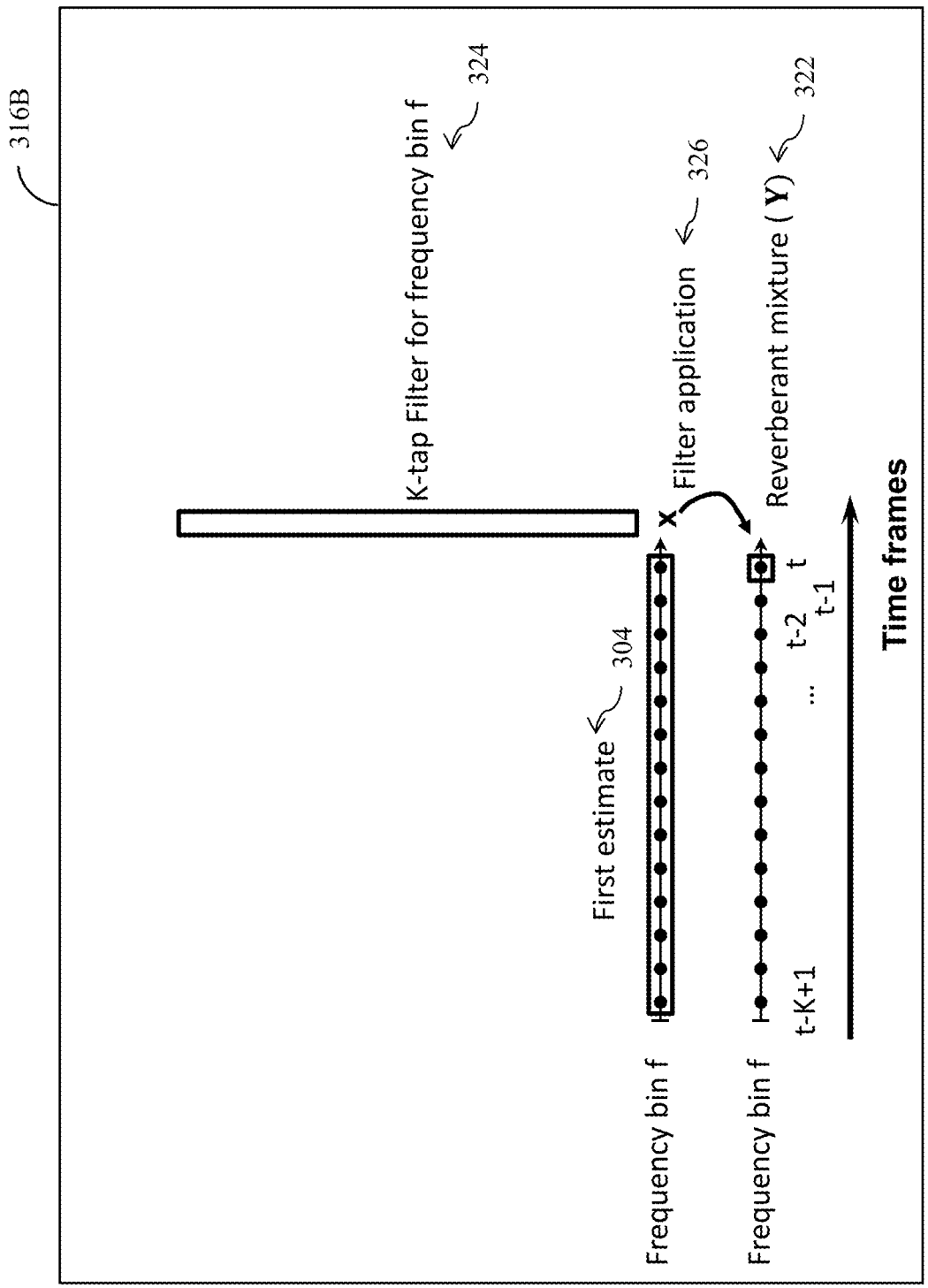
FIG. 3C shows a representation of an application of a filter modeling the RIR in a frequency bin, according to embodiments of the present disclosure.

FIG. 3C shows the application 326 of a filter 316B modeling the RIR 316A in a frequency bin f, according to embodiments of the present disclosure. The RIR model 316A corresponds to the RIR model 308 and the filter estimate 316B corresponds to the full filter estimate 307, which is related to the filter estimate 306.

The RIR model 316A has a structure that may be represented as a sequence of impulses in the time domain. For instance, the RIR model 316A is represented as a graphical plot with amplitude 318A and no. of taps representing time delays 318B axes. The structure of the RIR model 316A may include an impulse corresponding to a target direct-path signal 320A ($r_d$), a number of impulses corresponding to discrete early reflections 320B ($r_e$) of the target direct-path signal 320A ($r_d$) followed by late reverberation 320C ($r_l$) of the target direct-path signal 320A, due to reverberation in an environment, such as the environment 100. The target direct-path signal 320A may correspond to the target direct-path signal 106A or the target direct-path signal 106B.

In some example embodiments, the early reflections 320B and the late reverberation 320C are identified from the RIR model 316A. Assuming the filter is modeled using K coefficients in each frequency f, the coefficients of the filter estimate 307 at frequency f are obtained such that the application 326 of the filter to the first estimate 304 of the target direct-path signal by summing the results of multiplying the k-th coefficient with the time-frequency bin of the first estimate at the same frequency f and at time t−k+1 for all k=1, . . . , K, can best approximate the reverberant mixture 322 at the present time t and at the same frequency f.

As shown in a graphical plot 316B that represents approximating the mixture of acoustic signals 322 (Y) by the application 326 of a K-tap filter 324 to the first estimate 304 of the target direct-path signal. The filter 324 is estimated by optimizing a forward filtering of a first estimate 304 of the target direct-path signal 302A. The filter 324 is an example of the filter 307. For instance, the number of taps K of filter 324 may be set to 40 that may amount to a filter length of ((40−1)×8+32) ins in the time domain.

There may be different scenarios for the dereverberation of speech signals by the $DNN_1$ 206A and the $DNN_2$ 206B. For instance, the mixture of acoustic signals 302 may be received from a single speaker (e.g., the speaker 102A) or from multiple speakers (e.g., the speakers 102A and 102B) by a single microphone or by an array of microphones of the device 104. In case of multiple speakers, the first $DNN_1$ 206A estimates a different first estimate of the target direct-path signal for each of the multiple speakers. The dereverberation of speech signals for the different scenarios is explained further with reference to FIG. 4, FIG. 5, and FIG. 6.

Figure 4:
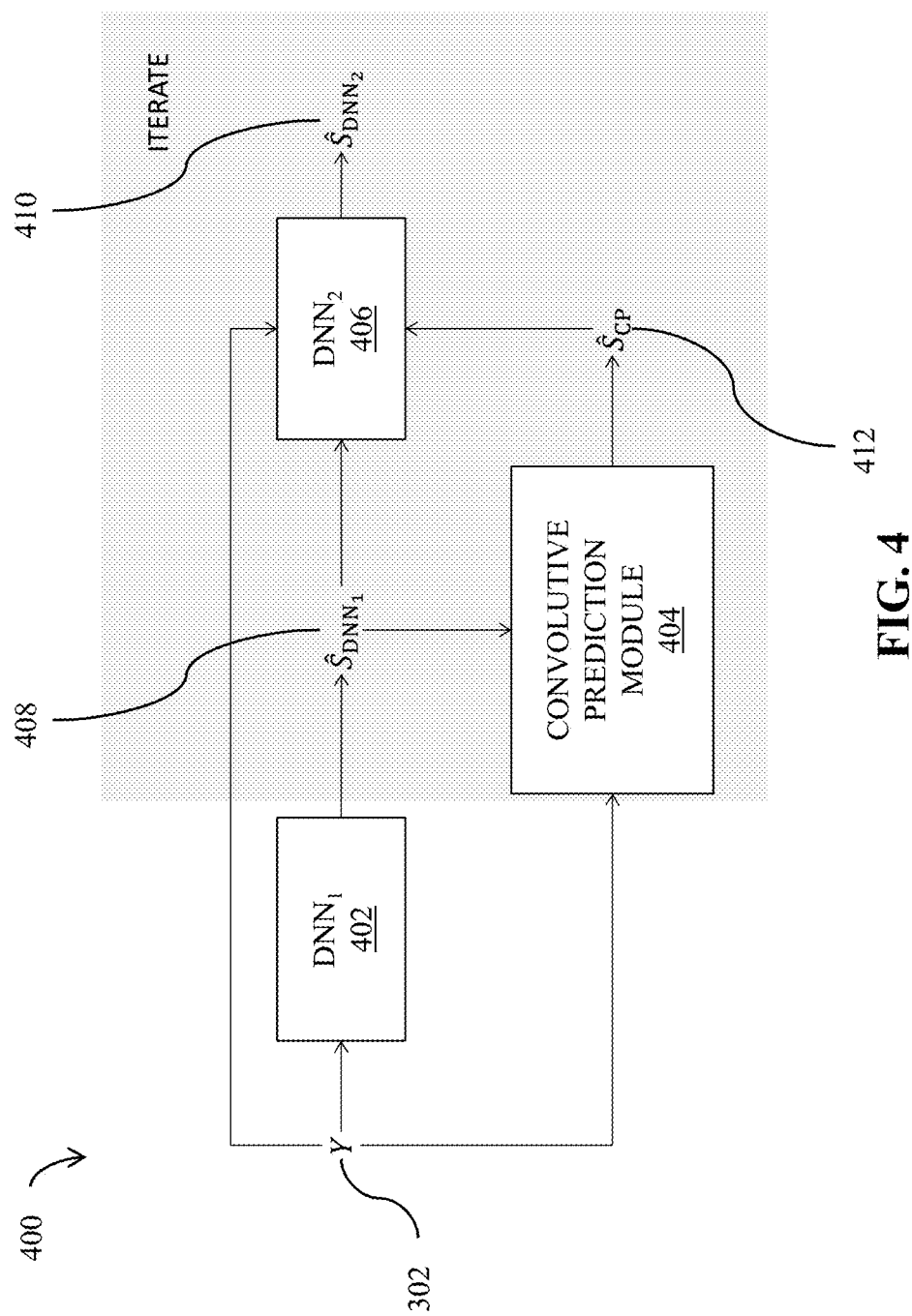
FIG. 4 is a schematic diagram depicting an architecture for dereverberation of speech signals, according to embodiments of the present disclosure.

FIG. 4 shows a schematic diagram of an architectural representation 400 for dereverberation of speech signals, according to embodiments of the present disclosure. As shown in FIG. 4, the architectural representation 400 includes a $DNN_1$ 402, a $DNN_2$ 406 and a convolutive prediction module 404 in between the $DNN_1$ 402 and the $DNN_1$ 406. The $DNN_1$ 402 corresponds to the $DNN_1$ 206A and the $DNN_2$ 406 corresponds to the $DNN_1$ 206B.

The $DNN_1$ 402 receives a mixture of acoustic signals, such as the mixture of acoustic signals 302 denoted as "Y". The mixture of acoustic signals includes the target direct-path signal 106A and the reverberations 108A. In some embodiments, the $DNN_1$ 402 is pretrained to generate a first estimate 408 of the target direct-path signal 106A of the speaker 102A at a microphone of the device 104. The first estimate 408 is an example of the first estimate 304. The first estimate 408 denoted as "$\hat{S}_{DNN_1}$" is used to estimate reverberation of the target direct-path signal 106A based on a convolutive prediction. To that end, the convolutive prediction module 404 estimates a linear filter (e.g., the filter 306) modeling the RIR for the first estimate 408 of the target direct-path signal 106A based on the convolutive prediction between the mixture of acoustic signals and the first estimate 408. The convolutive prediction exploits a linear-filter structure in reverberation of the first estimate 408.

The filter modeling the RIR is applied to the first estimate 408 to obtain a result (e.g., the result 310) that estimates delayed and decayed copies (e.g., the early reflections 320B and late reverberation 320C) of the first estimate 408 from the mixture of acoustic signals. The delayed and decayed copies correspond to a reverberation of the target direct-path signal 106A in the mixture of acoustic signals 302. In some example embodiments, the reverberation of the target direct-path signal 106A is estimated by minimizing a distance between the result and a residual between the mixture of acoustic signals 302 and the first estimate 408. The estimated reverberation of the target direct-path signal 106A is removed from the mixture of acoustic signals 302 to obtain another mixture, i.e., a mixture with reduced reverberation 412 ($\hat{S}_{CP}$) for the target direct-path signal 106A.

The mixture with reduced reverberation 412 is inputted to the $DNN_2$ 406. The $DNN_2$ 406 produces a second estimate 410 ($\hat{S}_{DNN_2}$) of the target direct-path signal 106A using the mixture with reduced reverberation 412. The second estimate 410 is an example of the second estimate 314.

Some embodiments are based on the realization that the second estimate 410 is better than the first estimate 408 as the $DNN_2$ 406 processes a refined mixture of acoustic signals, which is the mixture with reduced reverberation 412. The second estimate 410 may be further improved to perform better than the first estimate 408. To that end, the $DNN_2$ 406 may be inputted with one or a combination of the mixture of acoustic signals 302 and the first estimate 408 to generate the second estimate 410. In some cases, the mixture of acoustic signals 302, the first estimate 408 and the mixture with reduced reverberation 412 may be inputted to the $DNN_2$ 406 to generate the second estimate 410. In some other cases, the first estimate 408 and the mixture with reduced reverberation 412 may be inputted to the $DNN_2$ 406 to generate the second estimate 410. Further, the estimation of the filter, the obtaining of the mixture with reduced reverberation 412 and the submitting of the mixture with reduced reverberation 412 may be iterated to gradually refine the second estimate 410 of the target direct-path signal 106A and improve the dereverberation of speech signals for the speaker 102A. The iteration may be terminated when a termination condition is met. The termination condition may correspond to a user-defined condition. Thus, the second estimate 410 may be better than the first estimate 408 as the second estimate 410 is refined with mixture with reduced reverberation 412. In some embodiments, the $DNN_2$ 406 may be trained using the mixture of acoustic signals 302, the mixture with reduced reverberation 412, and the first estimate 408 to output the second estimate 410 that improves the dereverberation of speech signals.

In some cases of multiple speakers, the received mixture of acoustic signals 302 may include speech signals from the multiple speakers, such as the speaker 102A and the speaker 102B. In such cases, the $DNN_1$ 402 may generate multiple outputs, such as different first estimates of target direct-path signals, from which different filters modeling corresponding RIR for the multiple speakers may be obtained, which is further described with reference to FIG. 5.

Figure 5:
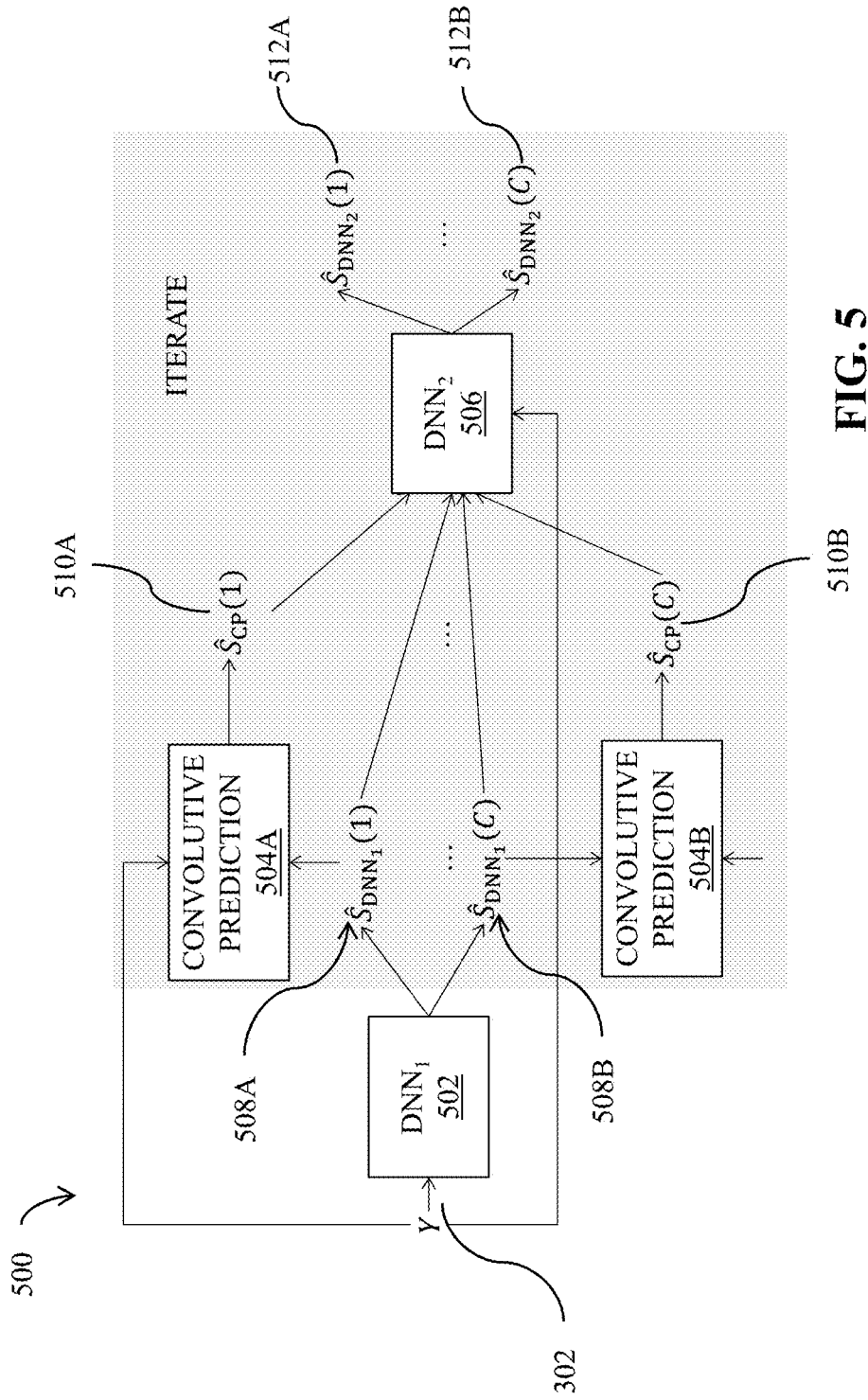
FIG. 5 is a schematic diagram depicting an architecture for dereverberation of speech signals for multiple speakers, according to some embodiments of the present disclosure.

FIG. 5 is a schematic diagram depicting an architectural representation 500 for dereverberation of speech signals for multiple speakers (e.g., the speakers 102A and 102B), according to some embodiments of the present disclosure. As shown in FIG. 5, the architectural representation 500 corresponds to a multiple-speaker scenario and includes a $DNN_1$ 502, a $DNN_2$ 506 and multiple instances of a convolutive prediction module, such as a convolutive prediction module 504A and a convolutive prediction module 504B in between the $DNN_1$ 502 and the $DNN_2$ 506. The $DNN_1$ 502 corresponds to the $DNN_1$ 206A and the $DNN_2$ 506 corresponds to the $DNN_2$ 206B.

In the scenario for multiple speakers, the received mixture of acoustic signals 302 includes speech signals from the multiple speakers, such as the speaker 102A and the speaker 102B. In such scenario, the $DNN_1$ 502 estimates a first estimate of corresponding target direct-path signals, such as the target direct-path signal 106A and the target direct-path signal 106B for the speakers 102A and 102B, simultaneously. For instance, the $DNN_1$ 502 estimates a first estimate 508A of the target direct-path signal 106A (denoted as $\hat{S}_{DNN_1}(1)$) for the speaker 102A and a first estimate 508B of the target direct-path signal 106B (denoted as $\hat{S}_{DNN_1}(C)$) for the speaker 102B. FIG. 5 describes the case of C speakers, but we here describe the case C=2 for simplicity and as an example.

The convolutive prediction module 504A estimates a filter (e.g., the filter 306) modeling an RIR (e.g., the RIR 308) for the speaker 102A using the first estimate 508A. The convolutive prediction module 504B estimates a filter for the speaker 102B using the first estimate 508B. Each filter of the corresponding speaker 102A and the speaker 102B is applied to the first estimate 508A and the first estimate 508B to obtain a corresponding mixture with reduced reverberation 510A (denoted as $\hat{S}_{CP}(1)$) for the speaker 102A and a mixture with reduced reverberation 510B (denoted as $\hat{S}_{CP}$ (C)) for the speaker 102B.

The mixture with reduced reverberation 510A and the mixture with reduced reverberation 510B are concatenated and given as input to the $DNN_2$ 506 to output a corresponding second estimate 512A and a second estimate 512B for the speakers 102A and the 102B. In some example embodiments, the $DNN_2$ 506 may be inputted with the first estimate 508A along with the mixture with reduced reverberation 510A and the first estimate 508B along with the mixture with reduced reverberation 510B and the mixture of acoustic signals 302 to output the second estimates 512A and 512B.

In some example embodiments, the estimation of the filters for the first estimates 508A and 508B and the mixture with reduced reverberation 510A and the mixture with reduced reverberation 510B may be iterated to produce the corresponding filter and corresponding mixture with reduced reverberation for each of the multiple speakers 102A and 102B, by replacing the first estimates 508A and 508B with the second estimates 512A and 512B. The iteration is terminated when a user-defined termination condition is met. The termination condition may include a user-defined termination condition, for example, terminate after 3 iterations.

In some example embodiments, the mixture with reduced reverberation 510A and the mixture with reduced reverberation 510B may be combined to a tensor. The tensor is a dimensional data structure representing all the mixtures with reduced reverberation of the multiple speakers 102A and 102B. The tensor is submitted to the $DNN_2$ 506 to output the corresponding second estimate 512A and the second estimate 512B for each of the multiple speakers 102A and 102B.

In some cases, corresponding second estimate of each of the multiple speakers 102A and 102B may be estimated one-by-one, which is described next in FIG. 6

Figure 6:
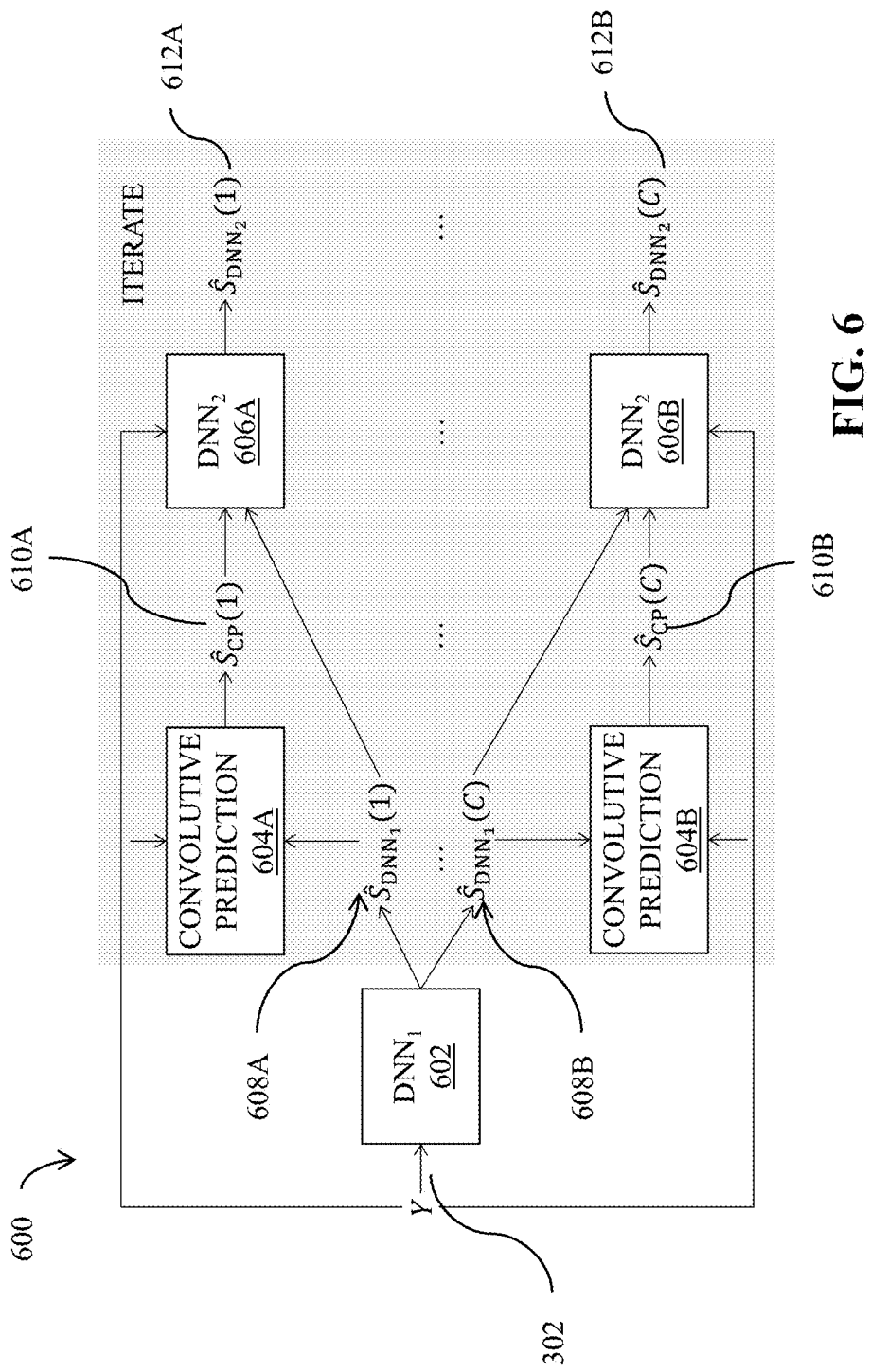
FIG. 6 is a schematic diagram depicting an architecture for dereverberation of speech signals for multiple speakers, according to some other embodiments of the present disclosure.

FIG. 6 is a schematic diagram depicting an architectural representation 600 for dereverberation of speech signals for the multiple speakers 102A and 102B, according to some other embodiments of the present disclosure. As shown in FIG. 6, the architectural representation 600 corresponds to a multi-speaker scenario and includes a $DNN_1$ 602, multiple instances of a second DNN, such as a $DNN_2$ 606A and a $DNN_2$ 606B, and multiple instances of a convolutive prediction module, such as a convolutive prediction module 604A and a convolutive prediction module 604B in between the $DNN_1$ 602 and the multiple instances of the second DNN $DNN_2$ 606A and the $DNN_2$ 606B. The $DNN_1$ 602 corresponds to the $DNN_1$ 206A and each of the $DNN_2$ 606A and the $DNN_2$ 606B correspond to the $DNN_2$ 206B.

The $DNN_1$ 602 receives the mixture of acoustic signals 302 and estimates corresponding target direct-path signal for each of the multiple speakers 102A and 102B. For instance, the $DNN_1$ 602 estimates a first estimate 608A for the target direct-path signal 106A of the speaker 102A. The $DNN_1$ 602 estimates a first estimate 608B for the target direct-path signal 106B of the speaker 102B. The first estimate 608A is inputted to the convolutive prediction module 604A and the first estimate 608B is inputted to the convolutive prediction module 604B.

The convolutive prediction module 604A estimates a filter modeling an RIR for the first estimate 608A. The filter is applied to the first estimate 608A to obtain a mixture with reduced reverberation 610A of the target direct-path signal 106A. In a similar manner, the convolutive prediction module 604B estimates a filter modeling an RIR for the first estimate 608B. The estimated filter outputted by the convolutive prediction module 604B is applied to the first estimate 608B to obtain a mixture with reduced reverberation 610B of the target direct-path signal 106B.

In some embodiments, each of the mixture with reduced reverberation 610A and the mixture with reduced reverberation 610B may be obtained by removing the sum of the results of applying each of the filters to each of the first estimate of the target direct-path signal for each of the multiple speakers 102A and 102B from the received mixture of acoustic signals, instead of just the result of applying the filter to the first estimate of the target direct-path signal for the corresponding speaker. For all speaker c, the mixture with reduced reverberation may thus be obtained as $\hat{S}_{CP}(C)=Y(t, f)-\Sigma_{c'} \tilde{g}(c', f)^H \hat{S}_{DNN_b}(c', t, f)$, the same for all c.

Further, each of the mixture with reduced reverberation is submitted to an instance of $DNN_2$. Each of the mixture with reduced reverberation 610A and the mixture with reduced reverberation 610B is submitted to the corresponding instance $DNN_2$ 606A and $DNN_2$ 606B respectively (which are essentially the same $DNN_2$ but applied to different inputs). The $DNN_2$ 606A outputs a second estimate 612A of the target direct-path signal 106A for the speaker 102B. The $DNN_2$ 606B outputs a second estimate 612B of the target direct-path signal 106B for the speaker 102B. The multiple instances of the second DNN, such as the $DNN_2$ 606A and the $DNN_2$ 606B outputting each of the second estimates 612A and 612B for the corresponding speakers 102A and 102B, may be used to obtain clear speech of an individual speaker from the multiple speakers.

In order to improve the second estimate 612A and the second estimate 612B, the $DNN_2$ 606A and the $DNN_2$ 606B may be inputted with one or a combination of the mixture of acoustic signals, the first estimate 608A and the first estimate 608B, and the mixture with reduced reverberation 610A and 610B.

In some example embodiments, the first estimate 608A may be replaced with the second estimate 612A to generate an updated first estimate 608A of the target direct-path signal 106A. Likewise, the first estimate 608B may be replaced with the second estimate 612B to generate an updated first estimate 608B of the target direct-path signal 106B. Further, the estimation of the filters by the $DNN_1$ 602, the estimation of the mixtures of reduced reverberation 610A and 610B and the submitting of the mixture with reduced reverberation 610A and 610B may be iterated to output an updated second estimate of the target direct-path signal for each of the multiple speakers 102A and 102B.

In some other example embodiments, a portion of the mixture of acoustic signals may be extracted corresponding to a speaker (e.g., the speaker 102A). The portion is extracted by removing reverberant speech of other speakers, e.g., the speaker 102B from the mixture of acoustic signals. The estimate of a reverberant speech of another speaker of the multiple speakers is obtained by adding the first estimate of the target direct-path signal for the other speaker to the result of applying the corresponding filter for the other speaker to the first estimate of the target direct-path signal for the other speaker. After the extraction of the portion of acoustic signals corresponding to the speaker 102A, a filter for a first estimate of the extracted portion is estimated. The filter is used for estimating a mixture with reduced reverberation for the speaker 102A based on the portion. The processing of the portion may improve the quality of the estimated filter for the speaker and the quality of the corresponding second estimate.

In some example embodiments, the mixture of acoustic signals of the single speaker 102A and/or the multiple speakers 102A and 102B may be received from the single microphone or the array of microphones. To that end, the DNNs, such as the $DNN_1$ 602 and the $DNN_2$ 606A and the $DNN_2$ 606B may be trained based on a spectral mapping corresponding to the single microphone and the array of microphones. The spectral mapping trains the $DNN_1$ 602 to predict real and imaginary (RI) components (i.e., frequency) of an estimate, e.g., the first estimate 608A of the target direct-path signal 106A from the RI components of the mixture of acoustic signals 704. The RI components of the mixture of acoustic signals 704 and the RI components of the first estimate 608A may be inputted to the $DNN_2$ 606A to predict a second estimate of the target direct-paths signal 106A. The $DNN_1$ 602 may be pretrained using a training dataset of mixtures of acoustic signals and corresponding reference target direct-path signal in the training dataset.

In some embodiments, the pretraining of the $DNN_1$ 602 may be performed by minimizing a loss function. The loss function may include one or a combination of a distance function that is defined based on the RI components of the target direct-path signal 106A in a first time-frequency domain and RI components of a reference target direct-path signal in the first time-frequency domain. The reference target direct-path signal may be obtained from a training dataset of utterances, and corresponding reverberant mixtures may be obtained by convolving the reference target direct-path signal with recorded RIRs or synthetic RIRs and summing with other interference signals. The distance function may be defined based on a magnitude obtained from the RI components of the estimated target direct-path signal in the first time-frequency domain and a corresponding magnitude of the reference target direct-path signal.

In an alternative embodiment, the distance function may be defined based on a reconstructed waveform obtained from the RI components of the estimated target direct-path signal in the first time-frequency domain by reconstruction in the time domain and a waveform of the reference target direct-path signal. The distance function may also be defined based on the RI components in the complex time-frequency domain obtained by transforming the reconstructed waveform further in a second time-frequency domain and the RI components of the reference target direct-path signal in the second time-frequency domain. The distance function may also be defined based on a magnitude obtained from the RI components in the second time-frequency domain obtained by transforming the reconstructed waveform in the second time-frequency domain and the corresponding magnitude of the reference target direct-path signal in the second time-frequency domain.

The loss function on the predicted RI components may be defined as, $$L_{Enh,RI}^{(b)} = \|\hat{R}^{(b)} - \text{Real}(S)\|_1 + \|\hat{I}^{(b)} - \|\text{Imag}(S)\|_1 \quad (9)$$

Where, $\hat{R}^{(b)}$ and $\hat{I}^{(b)}$ are the predicted RI components produced by using linear activations in an output layer, i.e., outputs (e.g., the first estimate 608A) of the DNN1 602. b∈{1,2} denotes which DNN produces the estimates (e.g., the first estimate 608A, and the second estimate 612A) as two DNNs, such as $DNN_1$ 602 and the $DNN_2$ 606A are used. Real (·) and Image (·) extract RI components, and $\|\cdot\|_1$ computes L1 norm, which is sum of magnitudes of the RI components. A loss is added to the computed magnitudes that gives, $$L_{Enh,RI+Mag}^{(b)} = L_{Enh,RI}^{(b)} + \left\|\sqrt{\hat{R}^{(b)^2} + \hat{I}^{(b)^2}} - S\right\|_1 \quad (10)$$

The enhancement result is obtained as $\hat{S}^{DNN_b} = \hat{R}^{(b)} + j\hat{I}^{(b)}$, where j denotes the imaginary unit. The trained DNN is supervised to learn non-linear inverse filters based on a large receptive field. To that end, inverse STFT is applied to Eq. (9) to obtain the estimated time-domain signal.

For the speaker separation, the loss based on the predicted RI components may be computed using an utterance-wise permutation-invariant training (PIT). A speaker index for the multiple speakers, such as the speaker 102A and 102B c∈ {1, . . . , C} is used to differentiate between the C speakers S(1), . . . , S(C). The loss function is defined as, $$L_{PIT}^{(1)} = \min_{\pi \in P} \sum_c \left( \left\|\hat{R}^{(1)}(\pi(c)) - \text{Real}(S(c))\right\|_1 + \left\|\hat{I}^{(1)}(\pi(c)) - \text{Imag}(S(c))\right\|_1 \right) \quad (11)$$

where P is the set of permutations on {1, . . . , C}. The separation result is obtained as $\hat{S}DNN_1(c) = \hat{R}^{(1)}(c) + j\hat{I}^{(1)}(c)$. Adding loss $L_{PIT}^{(1)}$ on the sum of the target speech estimates may improve performance of speaker separation task in noisy-reverberant conditions. The loss may be defined as, $$L_{sumPIT}^{(1)} = \left\|\sum_c \hat{R}^{(1)}(c) - \text{Real}\left(\sum_c S(c)\right)\right\|_1 + \left\|\sum_c \hat{I}^{(1)}(c) - \text{Imag}\left(\sum_c S(c)\right)\right\|_1 \quad (12)$$

In some embodiments, the $DNN_1$ 602 may be trained using either $L_{sumPIT+sum}^{(1)} = L_{PIT}^{(1)} + L_{sumPIT}^{(1)}$ or $L_{PIT}^{(1)}$.

In some example embodiments, the mixture of acoustic signals 302 may correspond to a multi-channel signal that may be received from an array of microphones. A beamforming is performed for such multi-channel signal, which is further described with reference to FIG. 7.

Figure 7:
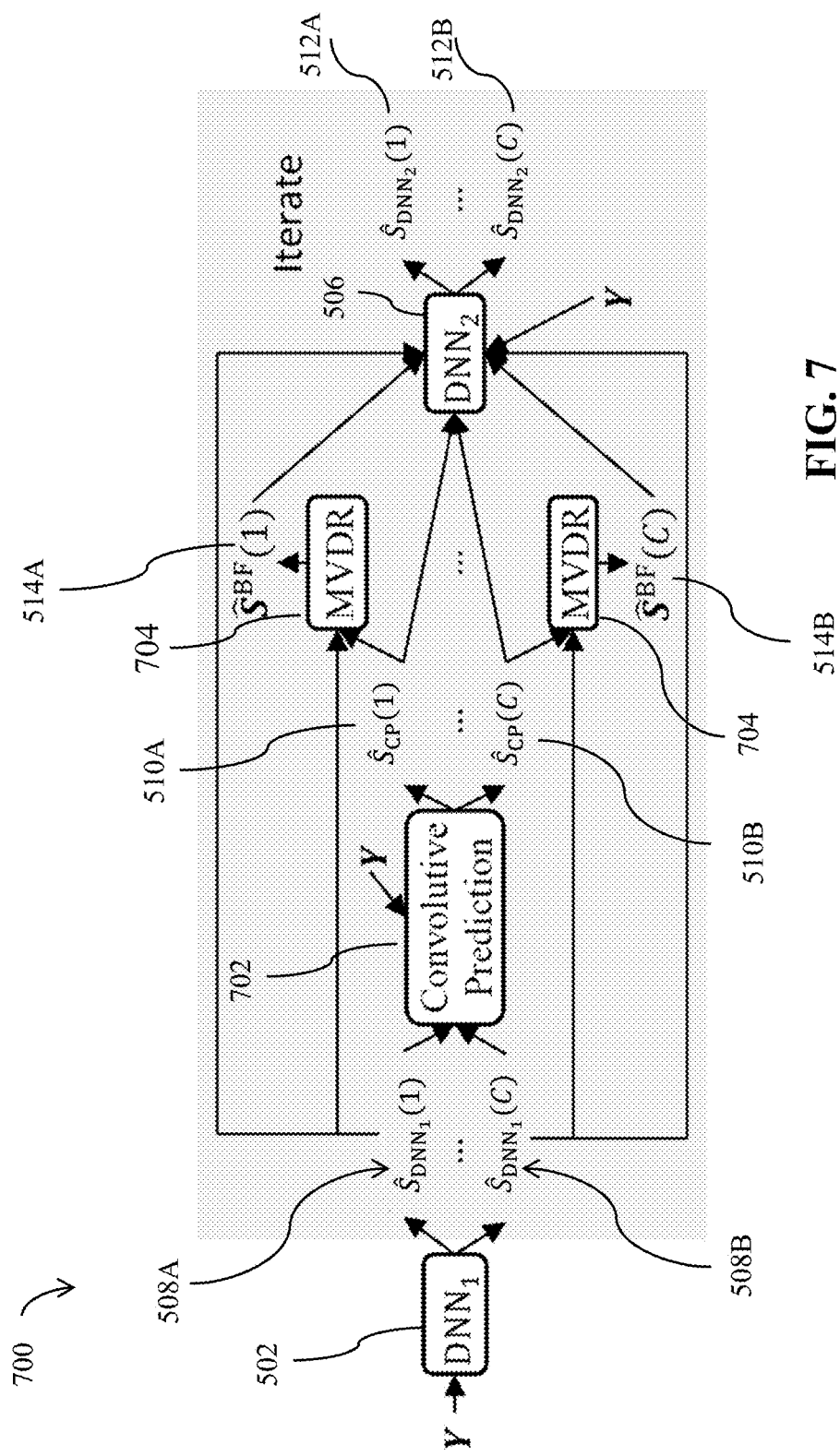
FIG. 7 is a schematic diagram depicting an architectural representation for enhancing dereverberation of speech signals, according to some embodiments of the present disclosure.
Figure 8A:
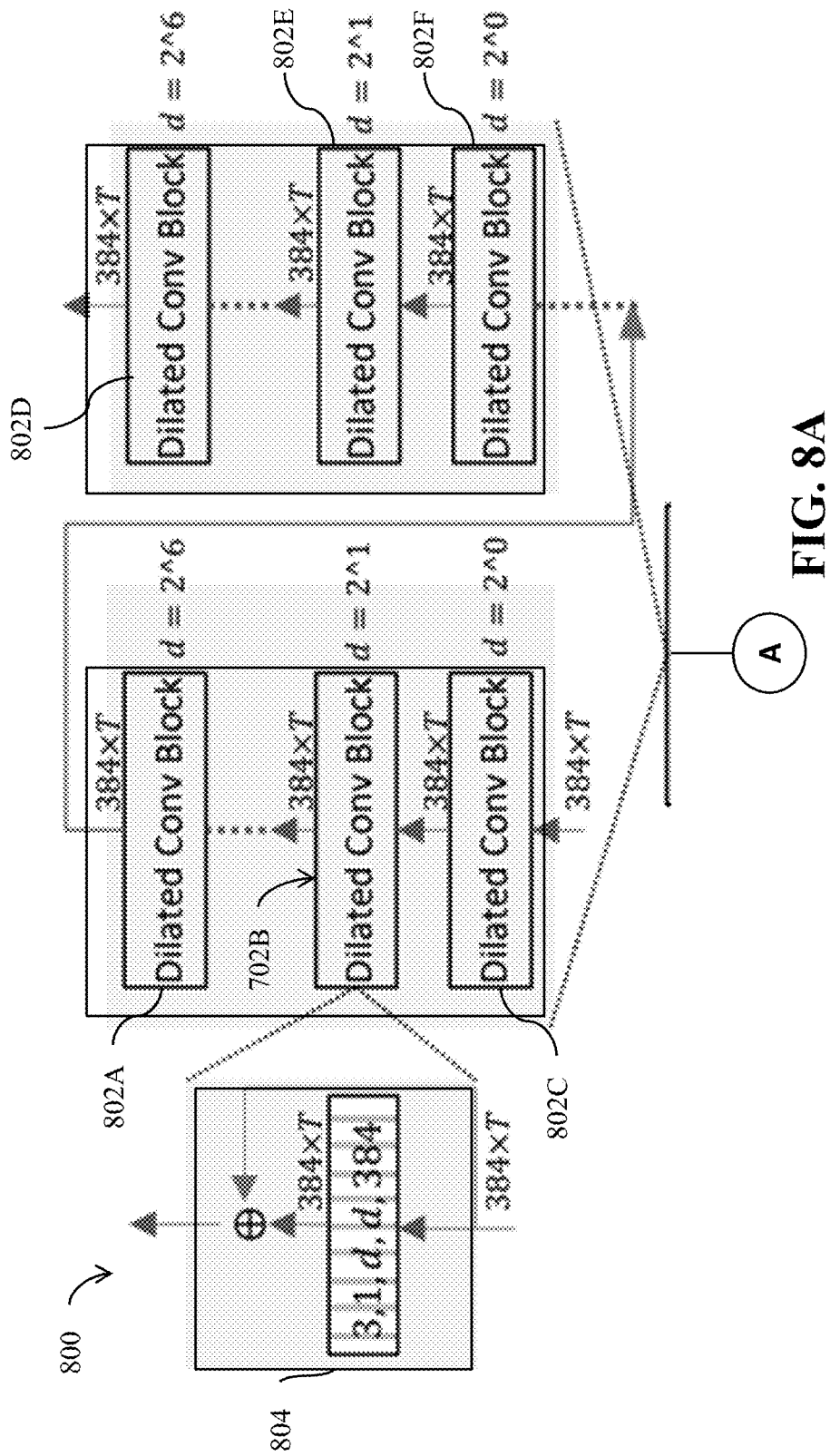
FIGS. 8A, 8B, 8C and 8D show a schematic diagram depicting a network architecture for dereverberation of speech signals, according to some other embodiments of the present disclosure.
Figure 8B:
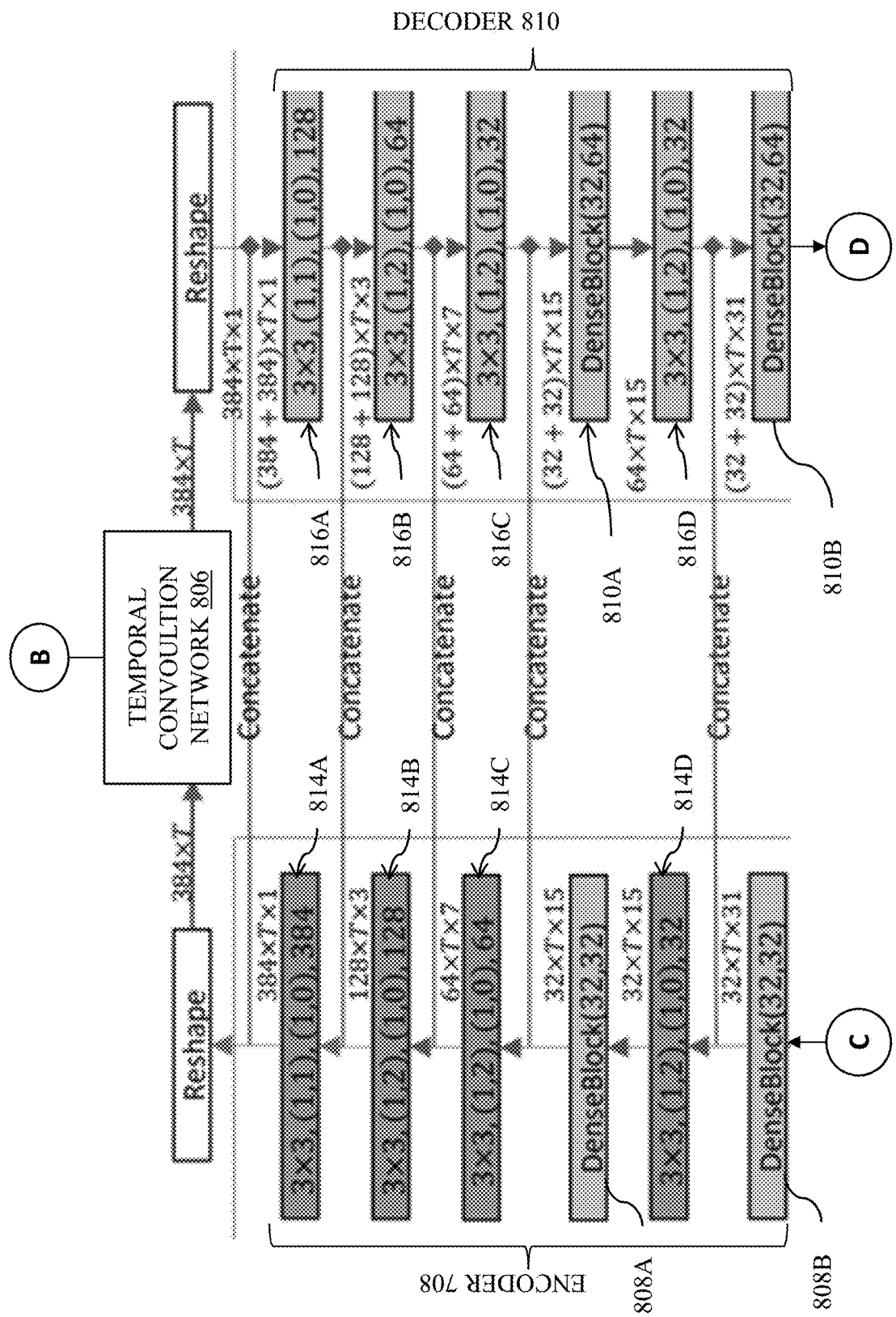
Figure 8C:
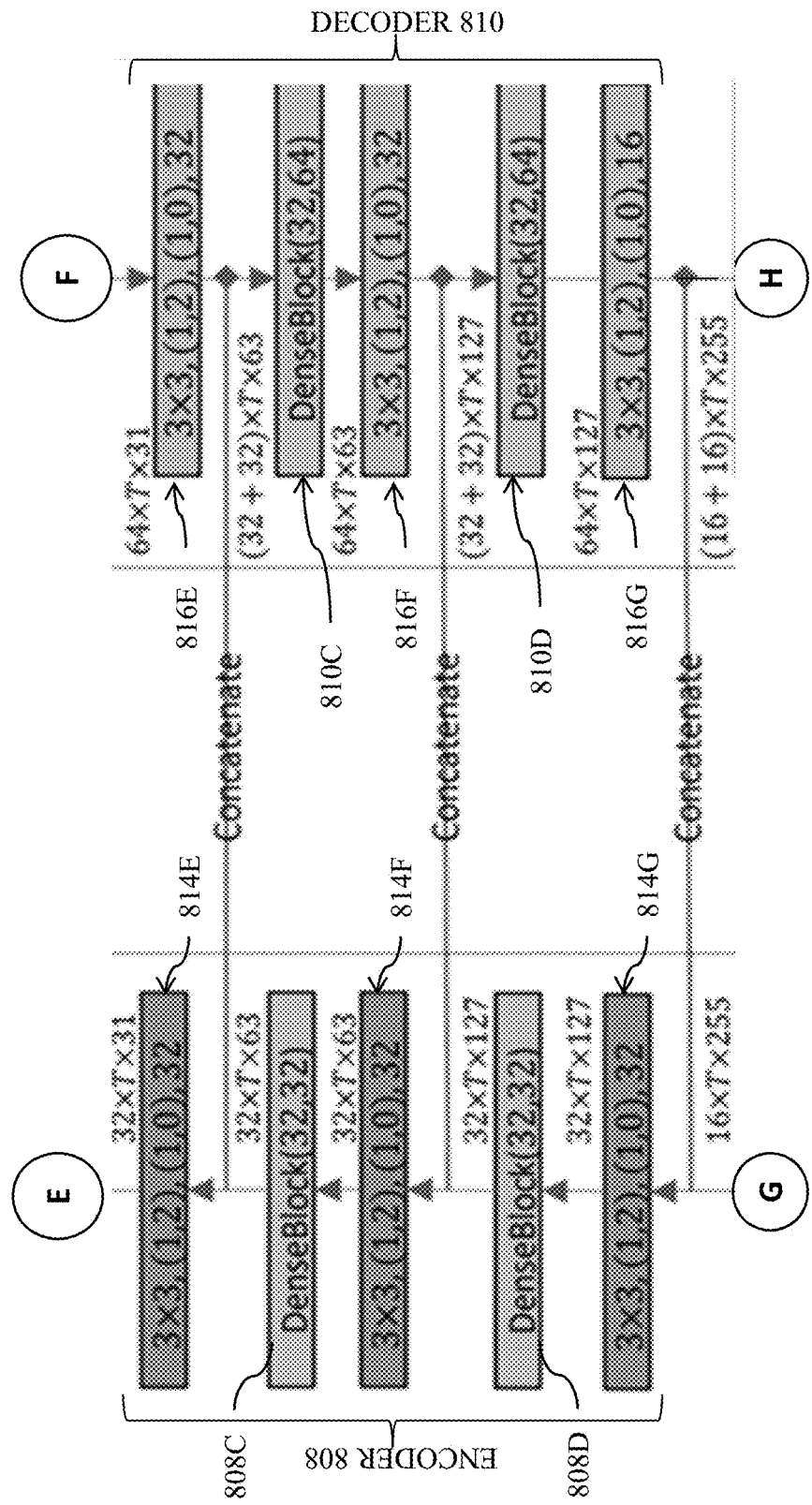
Figure 8D:
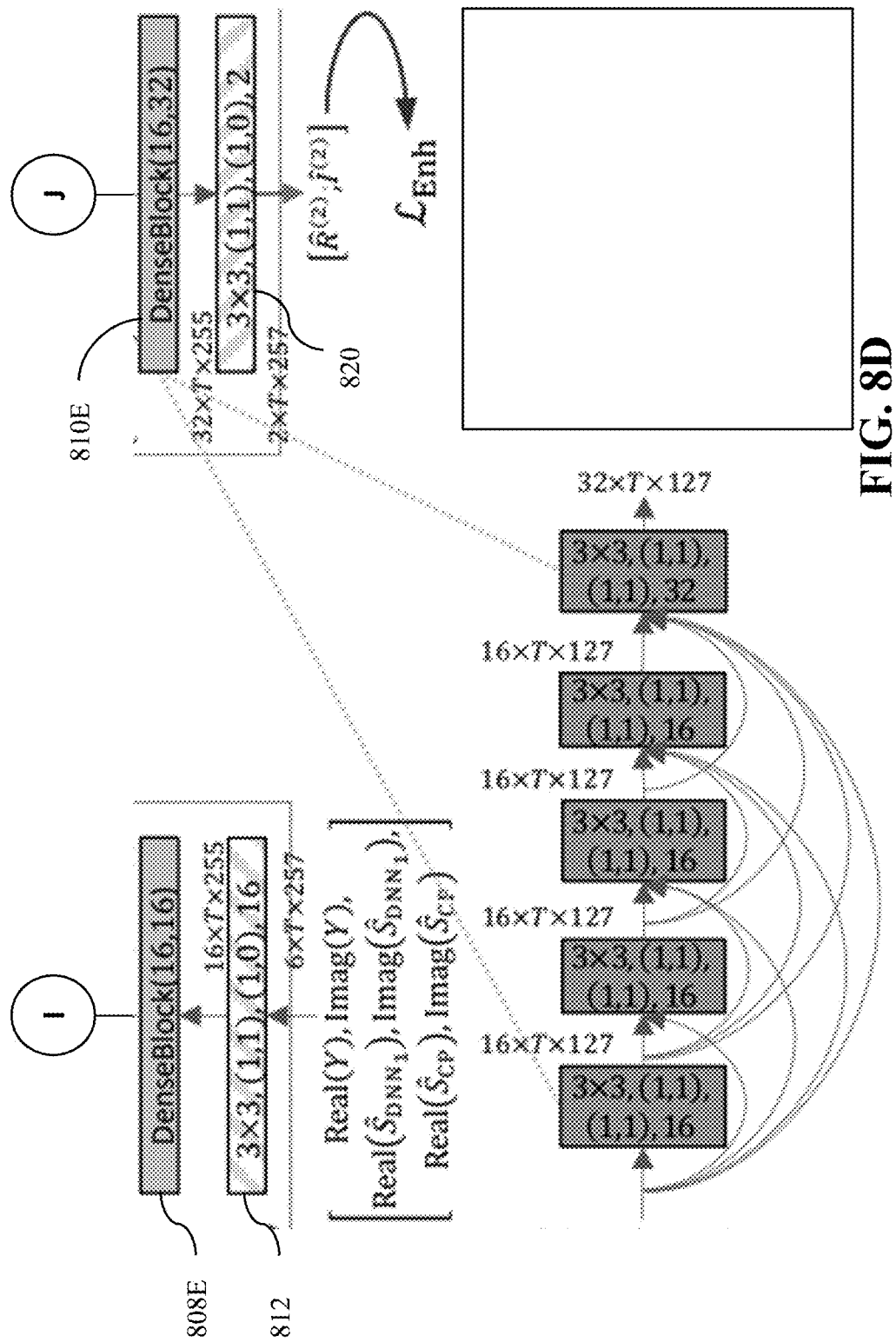

FIG. 7 is a schematic diagram depicting an architectural representation 700 for enhancing dereverberation of speech signals, according to some embodiments of the present disclosure. The architectural representation 700 is similar to the architectural representation of FIG. 5, but further includes several instances of a Minimum Variance Distortionless Response (MVDR) beamforming module 704. In some example embodiment, each instance of the MVDR module may output a beamforming output for a multi-channel signal. The beamforming filter may be obtained based on statistics computed from one or combination of a first estimate, such as the first estimate 508A (and/or the first estimate 508B) outputted by a first DNN, such as the $DNN_1$ 502, a mixture with reduced reverberation 510A (and/or the mixture with reduced reverberation 510B), and a second estimate, such as a second estimate 512A (and/or the second estimate 512B) outputted by a second DNN, such as $DNN_2$ 506, where the second estimate may have been obtained using the architectural representation of FIG. 5 that includes only convolutive prediction modules between the two DNNs, or a previous iteration of the architectural representation of FIG. 7 including MVDR beamforming. The beamforming output for a speaker may be obtained by applying the beamforming filter to the mixture with reduced reverberation 510A or to the mixture 502. The MVDR beamforming module may be used in between the two DNNs, such as the $DNN_1$ 502 and the $DNN_2$ 506. The output of the MVDR beamforming module, such as beamforming output 514A (and/or beamforming output 514B), may be used as input to the second DNN, such as $DNN_2$ 506. In some example embodiment, the output of the MVDR beamforming module, such as beamforming output 514A, may be combined with one or a combination of the first estimate, such as first estimate 508A, the mixture with reduced reverberation, such as mixture with reduced reverberation 510A, and the mixture 502. In some example embodiment, the beamforming outputs for all speakers are combined together with the mixture with reduced reverberation for all speakers, the first estimate for all speakers, and the mixture, and used as input to the $DNN_2$ 506. In some example embodiment, the MVDR beamforming module may output the beamforming using MVDR technique, such that the signals from multiple channels may be combined to lead to a better estimate of the target direct-path signal.

To that end, the MVDR beamforming may be applied to the mixture with reduced reverberation to further improve the dereverberation and separation tasks.

An MVDR beamformer for obtaining the beamforming of the multi-channel signal at a reference microphone q may be computed, in a frequency bin f which is here omitted, as $$\hat{w}(c;q) = \frac{\hat{\Phi}(\neg c)^{-1}\hat{d}(c)}{\hat{d}(c)^H \hat{\Phi}(\neg c)^{-1}\hat{d}(c)} \hat{d}_q^*(c) \quad (13)$$

where,
$\hat{\Phi}(c)$ is a target covariance matrix of an estimate target direct-path signal, e.g., the first estimate 608A and computed as, $\hat{\Phi}(c) = \Sigma_t \hat{S}DNN_b(c, t)\hat{S}_{DNN_b}(c, t)^H$,
$\hat{\Phi}(\neg c)$ is a non-target covariance matrix computed as,
$\hat{\Phi}(\neg c) = \Sigma_t \hat{U}_{DNN_b}(\neg c, t)\hat{U}_{DNN_b}(\neg c, t)^H$,
$\hat{U}_{DNN_b}(\neg c) = \hat{s}^{Dereverb}(c) - \hat{S}_{DNN_b}(c)$ is an estimate of non-target components, $\hat{s}^{Dereverb}(c) = \hat{S}_{CP}(c)$ denotes the mixture with reduced reverberation for speaker c,
and $(\cdot)^*$ computes complex conjugate, and beamforming results are computed as $$\hat{S}_q^{BF}(c,t) = \hat{w}(c;q)^H \hat{s}^{Dereverb}(c,t), \quad (14)$$

that is, all components are considered in their non-reverberant (or reduced reverberation) versions.

Alternatively, $\hat{U}_{DNN_b}(\neg c)$ may be computed using $\hat{U}_{DNN_b}(\neg c) = Y - \hat{S}_{DNN_b}(c)$, considering all reverberation as part of the non-target components, and beamforming results are obtained by applying the computed beamforming filter to the mixture Y:

$$\hat{S}_q^{BF}(c,t) = \hat{w}(c;q)^H Y(c,t).$$

Furthermore, the DNNs, for example, the $DNN_1$ 602 and the $DNN_2$ 606A may be readily replaced by magnitude or time-domain models and by more advanced DNN architectures. One of such models is explained further with reference to FIGS. 8A, 8B, 8C and 8D.

FIGS. 8A, 8B, 8C and 8D show a schematic diagram depicting a network architecture 800 for dereverberation of speech signals, according to some other embodiments of the present disclosure. The network architecture 800 corresponds to the DNNs, such as the $DNN_1$ 206A and the $DNN_2$ 206B.

The network architecture 800 is a temporal convolutional network (TCN) 806. The TCN 806 contains four layers, each of which has six dilated convolutional blocks, such as a dilated convolutional block 802A, a dilated convolutional block 802B, a dilated convolutional block 802C, a dilated convolutional block 802D, a dilated convolutional block 802E, and a dilated convolutional block 802F (referred to hereinafter as dilated convolutional blocks 802A-802F). In each of the dilated convolutional blocks 802A-802F, one one-dimensional (1D) depthwise separable convolution 804 is used to reduce number of parameters. For instance, each of the dilated convolutional blocks 802A-802F may contain around 6.9 million parameters for the dereverberation of speech signals. These large number of parameters may be reduced by the 1D depthwise separable convolution 804.

Further, the TCN 806 is sandwiched by a U-Net that includes an encoder 808 and a decoder 810. In each of the encoder 808 and the decoder 810, a DenseNet block is inserted at multiple frequency scales. The DenseNet block is an architecture that trains the DNNs, such as the $DNN_1$ 602 and the $DNN_2$ 606A using shorter connections between the layers of the DNNs. For instance, in the encoder 808 includes a DenseNet block 808A, a DenseNet block 808B, a DenseNet block 808C, a DenseNet block 808D and a DenseNet block 808E (simply referred to hereinafter as DenseNet blocks 808A-808E) at the multiple frequency scales. Likewise, the decoder 810 of the U-Net includes a DenseNet block 810A, a DenseNet block 810B, a DenseNet block 810C, a DenseNet block 810D and a DenseNet block 810E (simply referred to hereinafter as DenseNet blocks 810A-810E) at the multiple frequency scales. The U-Net may maintain local fine-grained structure via skip connections and model contextual information along frequency through down- and up-sampling. The TCN 806 leverages long-range information of the received mixture of acoustic signal by using dilated convolutions along time domain. The DenseNet blocks 808A-808E enable feature reuse and improve discriminability of speech signals of the multiple speakers 102A and 102B in the speaker separation task.

The encoder 808 includes one two-dimensional (2D) convolution 812, and seven convolutional blocks, such as a convolutional block 814A, a convolutional block 814B, a convolutional block 814C, a convolutional block 814D, a convolutional block 814E, a convolutional block 814F and a convolutional block 814G (referred to hereinafter as convolutional blocks 814A-814G). Each of the convolutional blocks 814A-814G includes 2D convolution, exponential linear units (ELU) non-linearity, and instance normalization (IN), for down-sampling, i.e., lowering sampling rate or sample size (bits per sample) of an input signal, e.g., the mixture of acoustic signals 704. The 2D convolution forms an essential component of feature extraction corresponding to estimate of the target direct-path signals. The ELU is an activation function for the DNNs (e.g., the $DNN_1$ 602 and the $DNN_2$ 606A) and the IN is a normalization layer for stabilizing hidden state dynamics in the $DNN_1$ 602 and the $DNN_2$ 606A.

The decoder 810 includes seven blocks of 2D deconvolution, such as a deconvolution 816A, a deconvolution 816B, a deconvolution 816C, a deconvolution 816D, a deconvolution 816E, a deconvolution 816F and a deconvolution 816G (referred to hereinafter as deconvolution 816A-816G) with ELU, and IN and one 2D deconvolution 820, for up-sampling by adding zero-valued samples between original samples to increase the sampling rate.

As mentioned earlier, the mixtures with reduced reverberation (such as the mixture with reduced reverberation 510A and the mixture with reduced reverberation 510B) of the multiple speakers 102A and 102B are represented into a tensor. The tensor is in format featureMapstimeStepsfrequencyChannels. Each one of convolutional blocks 814A-

814G (i.e., Conv2D+ELU+IN), and deconvolution 816A-816G (i.e., Deconv2D+ELU+IN) blocks is specified in the format: kernelSizeTimekernelSizeFreq, (stridesTime, stridesFreq), (paddingsTime, paddingsFreq), and feature-Maps.

Each of the DenseNet blocks 808A-808E, such as Dense-Block (g1, g2) contains five Conv2D+ELU+IN blocks with growth rate g1 for the first four layers and g2 for the last layer of the DenseNet blocks 808A-808E. The tensor shape after each TCN block 806 is in the format: featureMap-stimeSteps. Each IN+ELU+Conv1D block is specified in the format: kernelSizeTime, stridesTime, paddingsTime, dilationTime, featureMaps.

Figure 9:
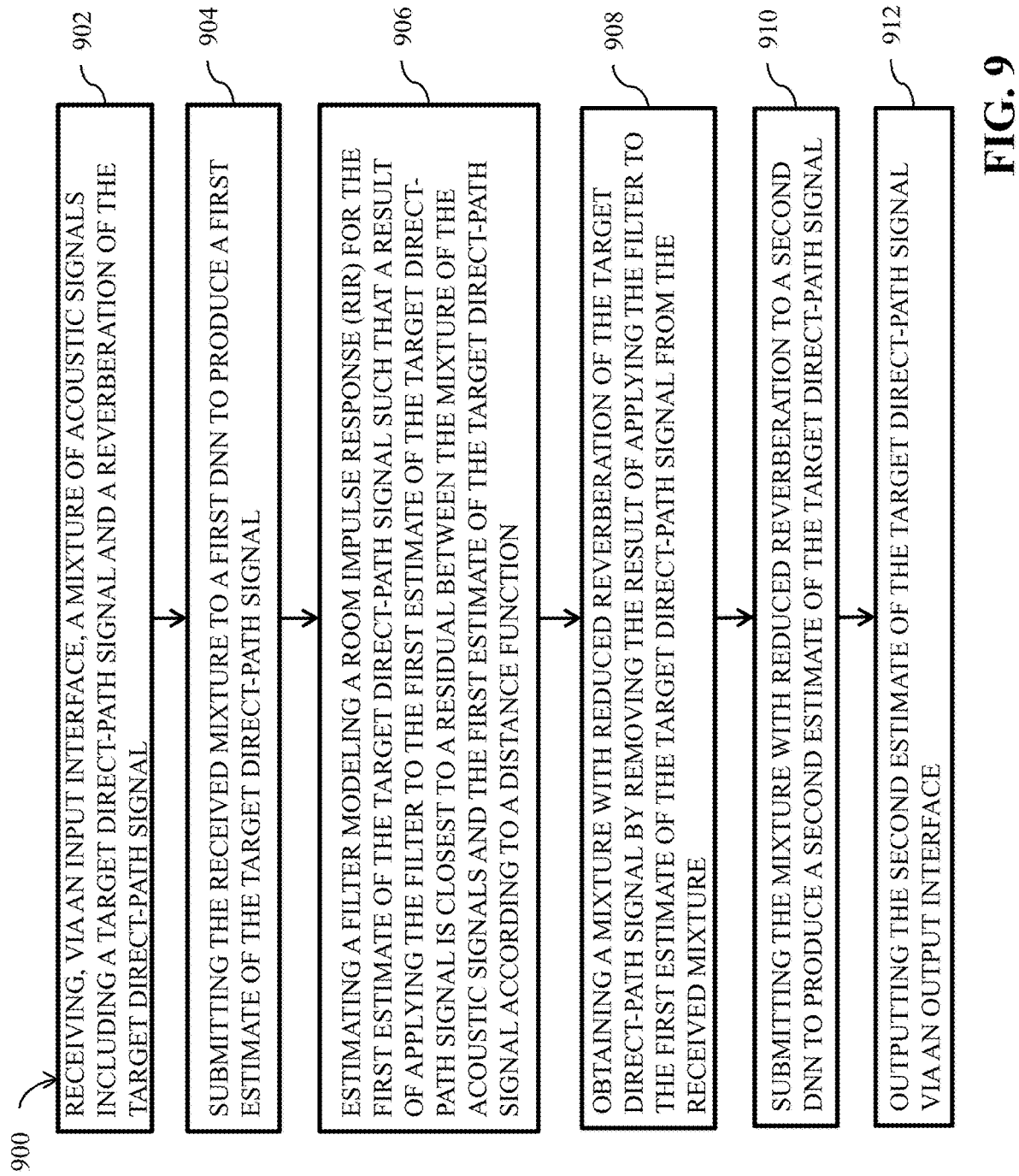
FIG. 9 shows a flow diagram of a method for dereverberation of speech signals, according to embodiments of the present disclosure.

FIG. 9 shows a flow diagram of a method 900 for dereverberation of speech signals, according to embodiments of the present disclosure. The method 900 is performed by the system 200. At operation 902, the method 900 includes receiving, via an input interface, a mixture of acoustic signals (e.g., the mixture of acoustic signals 302) including a target direct-path signal (e.g., the target direct-path signal 106A) and reverberations of the target direct-path signal. The mixture of acoustic signals may include at least one of a single-channel signal or a multi-channel signal that may be received from a single microphone or an array of microphone connected to the input interface.

At operation 904, the received mixture of acoustic signals is submitted to a first DNN, such as $DNN_1$ 206, to produce a first estimate (e.g., the first estimate 408) of the target direct-path signal 106A. In a multiple-speaker scenario, the first DNN determines a corresponding first estimate for each of the multiple speakers. The corresponding first estimate may be determined one by one for each of the multiple speakers or simultaneously for the multiple speakers. In some embodiments, the first DNN may be pretrained to produce the first estimate based on at least one of an observed mixture of acoustic signals or a training dataset of mixtures of acoustic signals and corresponding reference target direct-path signal in the training dataset. The pretraining of first DNN may be performed by minimizing a loss function.

At operation 906, a filter (e.g., the filter 306) modeling a room impulse response (RIR) (e.g., the RIR model 308) is estimated for the first estimate 408 of the target direct-path signal 106A such that a result of applying the filter to the first estimate of the target direct-path signal is closest to a residual between the mixture of the acoustic signals and the first estimate of the target direct-path signal according to a distance function (e.g., a least squared distance function). In some embodiments, the filter corresponds to a linear filter structure that is estimated based on a convolutive prediction. The first estimate is forwardly filtered per frequency in a time-frequency domain using the linear filter of the convolutive prediction (described in FIG. 3A, FIG. 3B, FIG. 4, FIG. 5, and FIG. 6). In some example embodiments, the received mixture of acoustic signals includes speech signals from multiple speakers. The first DNN produces multiple outputs, and each output includes the first estimate of the target direct-path signal for a speaker from the multiple speakers. In some embodiments, early reflections (e.g., the early reflections 320B) and late reverberation (e.g., the late reverberation 320C) of the first estimate may be identified based on the RIR modeled by the filter. The identified early reflections and late reverberation may be removed from the first estimate to estimate the mixture of acoustic signals.

At operation 908, a mixture with reduced reverberation of the target direct-path signal 106A is obtained by removing the result of applying the filter to the first estimate 408 of the target direct-path signal 106A from the received mixture. In some embodiments, the second DNN may be trained based on a training dataset created from augmented data obtained by using a set of estimated filters and a set of estimated target direct-path signals to create reverberant mixtures.

At operation 910, the mixture with reduced reverberation to a second DNN (e.g., the $DNN_2$ 206B) is submitted to produce a second estimate of the target direct-path signal. In some example embodiments, one or a combination of the received mixture of acoustic signals and the first estimate of the target direct-path signal are submitted to the second DNN to produce the second estimate of the target direct-path signal. In some other example embodiments, the received mixture of acoustic signals, the first estimate of the target direct-path signal and the mixture with reduced reverberation are submitted to the second DNN to produce the second estimate of the target direct-path signal. In yet some other example embodiments, the first estimate of the target direct-path signal and the mixture with reduced reverberation are submitted to the second DNN to produce the second estimate of the target direct-path signal. In some embodiments, the second DNN may be trained based on a training dataset created from augmented data obtained by using a set of estimated filters and a set of estimated target direct-path signals to create reverberant mixtures.

At operation 912, the second estimate of the target direct-path signal is outputted via an output interface, such as the output interface 210. The steps of the filter estimation, the obtaining of the mixture with reduced reverberation and the submitting the mixture with reduced reverberation steps may be repeated for each of the multiple outputs of the first DNN to further improve the dereverberation of speech signals. The output interface may also be configured to output the RIR modeled by the filter. The outputted RIR may be used for performing audio analysis for one or a combination of room acoustics parameter analysis, a room geometry reconstruction, a speech enhancement, and dereverberation of speech signals.

In some example embodiments, the dereverberation of speech signals using the estimates, i.e., the first estimate and the second estimate of the target direct-path signal and the filter for the target direct-path signal is evaluated for three tasks: 1) speech dereverberation with weak stationary noise, 2) two-speaker separation in reverberant conditions with white noise, and 3) two-speaker separation in reverberant conditions with challenging non-stationary noise. The evaluation results are shown in FIG. 10, FIG. 11, and FIG. 12.

FIG. 10 shows a tabular representation 1000 corresponding to a simulated test set for dereverberation of speech signals, according to embodiments of the present disclosure. The tabular representaion 1000 depicts dataset used for dereverberation, reverberant speaker separation and speech enhancement tasks, hyper-parameter settings, and baseline systems for the dereverberation of speech signals. The tabular representaion 1000 also depicts results on ASR task of REVERB corpus.

For the dereverberation of speech signals, the DNNs, e.g., the $DNN_1$ 206A and the $DNN_2$ 206B may be trained using a simulated reverberant dataset with weak air-conditioning noise. In addition to evaluating the trained DNNs on the simulated test set, the DNNs are applied directly to a Reverberant Voice Enhancement and Recognition Benchmark (REVERB) corpus to show their effectiveness for processing real-recorded noisy-reverberant utterances. The REVERB corpus is a benchmark for evaluation of automatic speech recognition techniques. The dataset also includes clean signals for simulation that are obtained from WSJCAM0 corpus. The WSJCAM0 corpus contains 7,861, 742, and 1,088 utterances in its training, validation, and test set, respectively. These utterances in the WSJCAM0 corpus are used to simulate 39,305 (7,861×5), 2,968 (742×4), and 3,264 (1,088×3) noisy-reverberant mixtures as training, validation, and test sets, respectively. The data spatialization process follows, where, for each utterance, a room is randomly sampled with random room characteristics and speaker and microphone locations, using the RIR estimated for the dereverberation of speech signals. A distance of a speaker-to-microphone is sampled from a range [0.75,2.5] in. The reverberation time (T60) is drawn from the range [0.2,1.3] s. For each utterance, a diffuse air-conditioning noise is sampled from the REVERB corpus and added to a reverberant speech of the speaker. The signal-to-noise ratio between an anechoic speech and a noise is sampled from the range [5,25] dB. The sampling rate is 16 kHz.

The trained models are applied to realistic reverberant recordings, without retraining, to ASR tasks of REVERB. The test mixtures are obtained from real recordings recorded in rooms (e.g., the environment 100) with reverb time T60 around 0.7 s and with speaker-to-microphone distance around 1 in in the near-field case and 2.5 in in a far-field case. The recorded noise is diffuse air-conditioning noise and is weak.

The official REVERB corpus is used in software, such as Kaldi to build a backend for ASR that is trained using the noisy-reverberant speech and clean source signals of REVERB. In an example embodiment, a plug-and-play approach is followed for ASR, where enhanced time-domain signals are directly inputted into the backend for decoding.

For the reverberant speaker separation task, six-channel Spatialized Multi-Speaker Wall Street Journal (SMS-WSJ) dataset is used. SMS-WSJ dataset includes simulated two-speaker mixtures in reverberant conditions. The clean speech is sampled from WSJ0 and WSJ1 datasets. The corpus contains 33,561, 982, and 1,332 two-speaker mixtures for training, validation, and testing, respectively. The speaker-to-array distance is sampled from the range [1.0, 2.0] in, and the T60 is drawn from the range [0.2,0.5] s. A weak white noise is added to simulate microphone noises. The energy level between the sum of the reverberant target speech signals and the noise is sampled from the range [20,30] dB. The sampling rate is 8 kHz. The first channel of the six-channel SMS-WSJ dataset is used for training and evaluation. Further, direct sound as the training target is used and both dereverberation and separation tasks are performed.

For ASR, default Kaldi-based backend acoustic model provided in SMS-WSJ dataset is used and trained using single-speaker noisy-reverberant speech as inputs and the state alignment of its corresponding direct-path signal as labels. The signals at the first, third, and fifth channels (i.e., more than microphones) are used for training the acoustic model. A task-standard trigram language model is used for decoding.

The noisy-reverberant speaker separation task is evaluated using noisy-reverberant WSJ0 Hipster Ambient Mixtures (WHAMR!) dataset. The WHAMR! pairs a two-speaker mixture in the wsj0-2mix dataset with a noise background scene that are used for noisy-reverberant binaural two-speaker separation. In this evaluation, clean two-speaker mixtures are reused in the WSJ0-2mix dataset, which reverberates each clean signal and adds non-stationary environmental noise recorded in WHAM!. The reverb time T60 is randomly sampled from the range [0.2,1.0] s. The signal-to-noise ratio between the louder speaker and noise is drawn from the range [−6,3] dB. The energy level between the two speakers in each mixture is sampled from the range [−5,5] dB. The speaker-to-array distance is sampled from the range [0.66,2.0] in. There are 20,000, 5,000, and 3,000 binaural mixtures in the training, validation, and test set, respectively. The corpus used is a min and 8 kHz version.

For STFT, the window length is 32 ins, hop size is 8 ins, and the analysis window is the square root of the Hann window. For 16 kHz sampling rate, a 512-point FFT is applied to extract 257-dimensional STFT features, while a 256-point FFT is used to extract 129-dimensional features for 8 kHz sampling rate. No sentence- or global-level mean-variance normalization is performed on input features. For each mixture, we normalize its sample variance to one before any processing. During training, the target signal needs to be scaled by the same factor used for scaling the mixture.

For WPE and DNN-WPE, the number of filter taps K is set to 37 and the filter delay $\Delta$ is set to 3. The iteration number in WPE is set to 3. No PSD context is used. Based on the validation set, K and $\Delta$ are tuned to 40 and 0, 39 and 1, 38 and 2, 37 and 3, and 36 and 4, and out of which setting the filter tap and the filter delay to 37 and 3 worked best across the datasets. For convolutive prediction, K is set to 40, leading to the same amount of context as in WPE. This amounts to 344 (=(40−1)×8+32) ins filter length in the time domain. The filter tap K is increased to up to 125, which corresponds to up to 1.0 s RIR length. This leads to an increase in the amount of computation spent in the linear regression step, with no significant differences in the evaluation scores. The RIRs have their energy mostly in the 0.35 s range after the peak impulse. The floor value E that is used to compute dereverberation result is set to either 1.0, indicating that no weight is used, or at 0.001. The PSD at each T-F unit may be at −30 dB lower than the T-F unit with the highest energy.

For all the tasks, major evaluation metric is a scale-invariant signal-to-distortion ratio (SI-SDR). SI-SDR measures the quality of time-domain sample-level predictions. An extended short-time objective intelligibility (eSTOI) and perceptual evaluation of speech quality (PESQ) scores are measured. For PESQ, narrow-band MOS-LQO scores are reported based on the ITU P.862.1 standard using the python-pesq toolkit. Reference for metric computation is used from the target direct-path signal, which is obtained by setting the reverb time T60 parameter to zero in the RIR. The word error rates (WER) for ASR are also shown in the tabular representation 1000.

In the tabular representation 1000, a target direct-path signal is denoted as "d", the target direct-path signal with early reflections is denoted as "d+e", and the target direct-path signal with early reflections and noise is denoted as "d+e+v".

As shown in the tabular representation 1000, the training target for $DNN_1$ shows better performance over the other two (i.e., "d+e" and "d+e+v"), if a first estimate of a first DNN ($DNN_1$) is considered as a final prediction. Comparing using different training targets for the $DNN_1$, there is no significant difference in $DNN_1$-WPE, which applies $DNN_1$ outputs to improve WPE. However, it is seen that using target direct-path signal to train $DNN_1$ shows improved performance in $DNN_1$+$DNN_2$, which stacks two DNNs by using the mixture of acoustic signals and output of the $DNN_1$, i.e., the first estimate of the target direct-path signal is used to train second $DNN_2$.

The tabular representation 1000 also includes comparison of using methods inverse convolutive prediction (ICP), forward convolutive prediction (FCP), or weighted prediction error (WPE) in between the two DNNs, i.e., $DNN_1$ and $DNN_2$. $DNN_1$+FCP+$DNN_2$ with the floor value E set to 0.001 shows better performance over $DNN_1$+WPE+$DNN_2$ and $DNN_1$+ICP+$DNN_2$. As shown in the tabular representation 1000, by performing linear or convolutive prediction and $DNN_2$ for one more iteration at run time, $DNN_1$+(WPE+$DNN_2$)×2 and $DNN_1$+(ICP+$DNN_2$)×2 show slight improvement in SI-SDR and PESQ and slight degradation in word error rates (WER), while $DNN_1$+(FCP+$DNN_2$)×2 shows improvements on all the metrics. These results indicate the effectiveness of the $DNN_1$+FCP+$DNN_2$ approaches over WPE and $DNN_1$+WPE+$DNN_2$.

In $DNN_1$+ICP+$DNN_2$, SI-SDR and PESQ scores improved by setting the floor value ε to 1.0. When the floor value is set to 0.001, SI-SDR and PESQ scores in $DNN_1$+FCP+$DNN_2$ is further improved. For instance, when the floor value is 1.0, SI-SDR score is 11.9 and PESQ score is 3.15. When the floor value is 0.001, SI-SDR score is 12.3 and PESQ score is 3.18. The floor values at 1.0 and 0.001 are also used for evaluating trained $DNN_1$ using ICP and FCP. As shown in the tabular representation 1000, for $DNN_1$+ICP at floor value 1.0, SI-SDR score is 3.2 and PESQ score is 1.78, for $DNN_1$+ICP at floor value 0.001, SI-SDR score is 0.7 and PESQ score is 1.77, for $DNN_1$+FCP at floor value 1.0, SI-SDR score is 3.6 and PESQ score is 1.82 and for $DNN_1$+FCP at floor value 0.001, SI-SDR score is 3.0 and PESQ score is 1.82. Thus, $DNN_1$+FCP+$DNN_2$ shows better scores than using the methods ICP and FCP for training the $DNN_1$.

Overall, for speech dereverberation, the mixture SI-SDR and PESQ is improved from −3.6 dB and 1.64 to 8.2 dB and 2.65 using one DNN (i.e., $DNN_1$), to 9.1 dB and 2.82 using two-DNNs (i.e., $DNN_1$+$DNN_2$), to 12.3 dB and 3.18 by adding an FCP module in between the two DNNs ($DNN_1$+FCP+$DNN_2$), and to 12.8 dB and 3.24 by using one extra iteration for FCP and $DNN_2$ ($DNN_1$+(FCP+$DNN_2$)×2).

Finally, a magnitude domain loss is added during the training of the second $DNN_2$. The improvements are obtained on word error rates (WER) and PESQ, while SI-SDR drops by around 0.5 dB.

FIG. 11 shows a tabular representation 1100 depicting evaluation results for the dereverberation of speech signals using a test dataset, according to embodiments of the present disclosure. The evaluation results show performance on SMS-WSJ dataset as well as oracle results obtained by using a target direct-path signal with or without early reflections, and oracle masks such as a spectral magnitude mask (|S|/|Y|) and phase-sensitive mask (|S|/|Y|cos(<S−<Y)). As shown in the tabular representation 1100, using oracle target direct-path signal for ASR obtains better WER overusing the target direct-path signal with early reflections (6.4% vs. 7.04%), which indicates the potential benefits of removing early reflections.

The tabular representation 1100 also shows comparison of the trained $DNN_1$ with loss functions $L_{PIT}^{(1)}$ and $L_{PIT+sumPIT}^{(1)}$. As shown in the tabular representation 1100, the $DNN_1$+$DNN_2$, shows consistent improvements over $DNN_1$.

For DNN-WPE, two variants for multi-speaker scenarios are used. The first one uses the PSD of each estimated target speaker produced by $DNN_1$ to compute a different WPE filter for each speaker. In the tabular representation 1100, DNN-WPE for the multi-speaker scenario is denoted as $DNN_1$+mfWPE+$DNN_2$, where "mf" indicates a multi-filter. The multi filter sums up all the estimated target speakers provided by $DNN_1$ and uses the PSD of the summated signal to compute a single WPE filter to dereverberate the mixture. The second variant is denoted as $DNN_1$+sfWPE+$DNN_2$, where "sf" indicates a single filter.

As shown in the tabular representation 1100, $DNN_1$+sfWPE+$DNN_2$ obtains slightly better performance than $DNN_1$+mfWPE+$DNN_2$, which suggests that computing a separate filter for each target speaker may not work with WPE.

The scenario that all speakers are providing speech signals is denoted as "allSpks" in the tabular representation 1100, where $DNN_2$ is trained to enhance all the target speakers simultaneously. As shown in the tabular representation 1100, compared with $DNN_1$+sfWPE+$DNN_2$ and $DNN_1$+ICP+$DNN_2$, $DNN_1$+FCP+$DNN_2$ shows better performance in all the metrics. This demonstrates the effectiveness of the forward filtering of convolution prediction (as described in FIGS. 5 and 6) over WPE at dereverberation when competing speakers are present.

If $DNN_2$ is trained to enhance target speakers one by one as described in FIG. 6 (denoted as "perSpk" in the tabular representation 1100), further improvement is achieved. This suggests that dereverberating each speaker individually may improve speech enhancement of the speakers. As shown in the tabular representation 1100, iterating convolutive prediction and $DNN_2$ for one more iteration may achieve consistent improvement. Also, the $DNN_2$ that is trained by including a magnitude-level loss improves PESQ, eSTOI, and WER, while SI-SDR decreases.

In the tabular representation 1100, it is further shown that $DNN_1$+(FCP+$DNN_2$)×2 trained with the magnitude-level loss functions obtains scores of SI-SDR, PESQ, eSTOI and WER as 12.2, 3.24, 89.0 and 12.77, respectively. The $DNN_1$+(FCP+$DNN_2$)×2 trained with the magnitude-level loss functions may perform better that $DNN_1$+(FCP+$DNN_2$)×2 trained with spectral mapping corresponding to a single microphone, such as single-input, single output microphone ($SISO_1$), another complex spectral mapping (12.5 vs. 5.1 dB SI-SDR). The $DNN_1$+(FCP+$DNN_2$)×2 trained with the magnitude-level loss functions may perform better that $DNN_1$+(FCP+$DNN_2$)×2 trained with DPRNN-TasNet (12.5 vs. 6.5 dB SI-SDR).

The tabular representation 1100 also shows performance of the $DNN_1$ and $DNN_2$ trained based on spectral mapping corresponding to an array of microphones, such as six-microphones, SISO with beamforming of the array of microphones ($SISO_1$–BF–$SISO_2$), which combines monaural complex spectral mapping with beamforming and post-filtering. These results suggest that combining end-to-end DNNs with convolutive prediction may be effective for reducing reverberation in a mixture of acoustic signals that include speech signals of speakers (e.g., the speakers 102A and 102B).

FIG. 12 shows a tabular representation 1200 depicting evaluation results for the dereverberation of speech signals using a test dataset, according to some other embodiments of the present disclosure. The tabular representation 1200 shows SI-SDR on WHAMR! dataset. As shown in the tabular representation 1200, $DNN_1$+FCP+$DNN_2$ produces better results over $DNN_1$+mfWPE+$DNN_2$ (7.4 vs. 6.8 dB SI-SDR). This indicates that DNN-FCP may be robust than DNN-WPE at dereverberation, when noises and competing speakers are present.

The tabular representation 1200 also shows comparison with an end-to-end speech separation system, such as Wavesplit. The $DNN_1$+(FCP+$DNN_2$)×2 obtains SI-SDR score of 7.5 dB, which is higher that SI-SDR score of the Wavesplit, i.e., 5.9 dB. Wavesplit may use speaker identities as a side information during training for target speaker extraction. The $DNN_1+(FCP+DNN_2)\times 2$ may not rely on availability of information of the speaker identities. In addition, dynamic mixing may be applied for data augmentation, leading to better SI-SDR (7.1 dB). The $DNN_1+(FCP+DNN_2)\times 2$ may be trained without the data augmentation, which performs better than Wavesplit with dynamic mixing.

Figure 13:
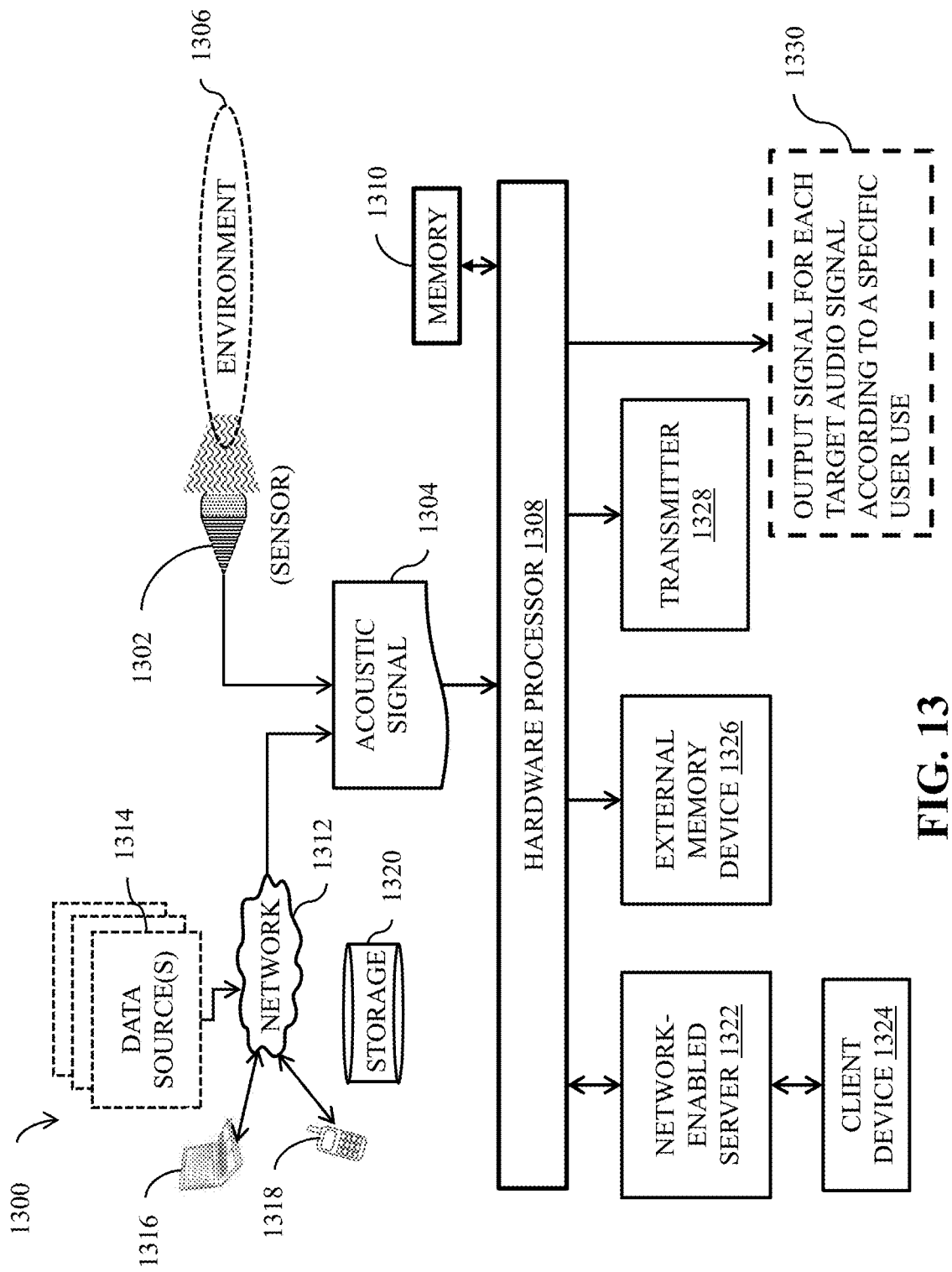
FIG. 13 is a block diagram of an audio processing system, according to embodiments of the present disclosure.

FIG. 13 is a block diagram of an audio signal processing system 1300, according to embodiments of the present disclosure. The audio signal processing system 1300 uses the system 200. In some example embodiments, the system 200 with the DNNs for the dereverberation of speech signals, e.g., the $DNN_1$ 206A and the $DNN_2$ 206B may be implemented on a remote server or in a cloud network. In some embodiments, the audio signal processing system 1300 (referred to hereinafter as system 1300) may receive an RIR model, such as the RIR model 316A to the audio signal processing system 1300. The system 1300 may process the RIR model to perform an audio analysis for at least one or a combination of a room geometry reconstruction, a speech enhancement, and dereverberation of speech signals.

In some example embodiments, the system 1300 includes a sensor 1302 or sensors, such as an acoustic sensor, which collects data including an acoustic signal(s) 1204 from an environment 1306. The environment 1306 corresponds to the environment 100.

The acoustic signal 1304 may include one or more target direct-path signals and their reverberations. For example, the acoustic signal 1304 may include multiple speakers with overlapping speech and their reverberation. Further, the sensor 1302 may convert an acoustic input into the acoustic signal 1304.

The audio signal processing system 1300 includes a hardware processor 1308 is in communication with a computer storage memory, such as a memory 1310. The memory 1310 includes stored data, including algorithms, instructions and other data that may be implemented by the hardware processor 1308. It is contemplated the hardware processor 1308 may include two or more hardware processors depending upon the requirements of the specific application. The two or more hardware processors may be either internal or external. The audio signal processing 1300 may be incorporated with other components including output interfaces and transceivers, among other devices.

In some alternative embodiments, the hardware processor 1308 may be connected to a network 1312, which is in communication with one or more data source(s) 1314, computer device 1316, a mobile phone device 1318 and a storage device 1320. The network 1312 may include, by non-limiting example, one or more local area networks (LANs) and/or wide area networks (WANs). The network 1312 may also include enterprise-wide computer networks, intranets, and the Internet. The audio signal processing system 1300 may include one or more number of client devices, storage components, and data sources. Each of the one or more number of client devices, storage components, and data sources may comprise a single device or multiple devices cooperating in a distributed environment of the network 1312.

In some other alternative embodiments, the hardware processor 1308 may be connected to a network-enabled server 1322 connected to a client device 1324. The hardware processor 1308 may be connected to an external memory device 1326, and a transmitter 1328. Further, an output for each target speaker may be outputted according to a specific user intended use 1330. For example, the specific user intended use 1330 may correspond to displaying speech in text (such as speech commands) on one or more display devices, such as a monitor or screen, or inputting the text for each target speaker into a computer related device for further analysis, or the like.

The data source(s) 1314 may comprise data resources for training DNNs, such as the $DNN_1$ 206A and the $DNN_2$ 206B for a speech separation task. For example, in an embodiment, the training data may include acoustic signals of multiple speakers, such as the speaker 102A and the speaker 102B talking simultaneously. The training data may also include acoustic signals of single speakers talking alone, acoustic signals of single or multiple speakers talking in a noisy environment, and acoustic signals of noisy environments (e.g., the environment 100 with reverberant noise signals 110A).

The data source(s) 1314 may also comprise data resources for training the $DNN_1$ 206A and the $DNN_2$ 206B for a speech recognition task. The data provided by data source(s) 1314 may include labeled and un-labeled data, such as transcribed and un-transcribed data. For example, in an embodiment, the data includes one or more sounds and may also include corresponding transcription information or labels that may be used for initializing a speech recognition task.

Further, un-labeled data in the data source(s) 1314 may be provided by one or more feedback loops. For example, usage data from spoken search queries performed on search engines can be provided as un-transcribed data. Other examples of data sources may include by way of example, and not limitation, various spoken-language audio or image sources including streaming sounds or video, web queries, mobile device camera or audio information, web cam feeds, smart-glasses and smart-watch feeds, customer care systems, security camera feeds, web documents, catalogs, user feeds, SMS logs, instant messaging logs, spoken-word transcripts, gaining system user interactions such as voice commands or captured images (e.g., depth camera images), tweets, chat or video-call records, or social-networking media. Specific data source(s) 1314 used may be determined based on the application including whether the data is a certain class of data (e.g., data only related to specific types of sounds, including machine systems, entertainment systems, for example) or general (non-class-specific) in nature.

The audio signal processing system 1300 may also include third party devices, which may comprise of any type of computing device, such as an automatic speech recognition (ASR) system on the computing device. For example, the third-party devices may include a computer device, or a mobile device 1318. The mobile device 1318 may include a personal data assistant (PDA), a smartphone, smart watch, smart glasses (or other wearable smart device), augmented reality headset, virtual reality headset, a laptop, a tablet, a remote control, an entertainment system, a vehicle computer system, an embedded system controller, an appliance, a home computer system, a security system, a consumer electronic device, or other similar electronics device. The mobile device 1318 may also include a microphone or line-in for receiving audio information, a camera for receiving video or image information, or a communication component (e.g., Wi-Fi functionality) for receiving such information from another source, such as the Internet or a data source 1314. In one example embodiment, the mobile device 1318 may be capable of receiving input data such as audio and image information. For instance, the input data may include a query of a speaker into a microphone of the mobile device 1318 while multiple speakers in a room are talking. The input data may be processed by the ASR in the mobile device 1318 using the system 200 to determine a content of the query. The system 200 may enhance the input data by reducing noise in environment of the speaker, separating the speaker from other speakers, or enhancing audio signals of the query and enable the ASR to output an accurate response to the query.

In some example embodiments, the storage 1320 may store information including data, computer instructions (e.g., software program instructions, routines, or services), and/or data related to the DNNs, such as the $DNN_1$ 206A and $DNN_2$ 206B of the system 200. For example, the storage 1220 may store data from one or more data source(s) 1314, one or more deep neural network models, information for generating and training deep neural network models, and the computer-usable information outputted by one or more deep neural network models.

Figure 14A:
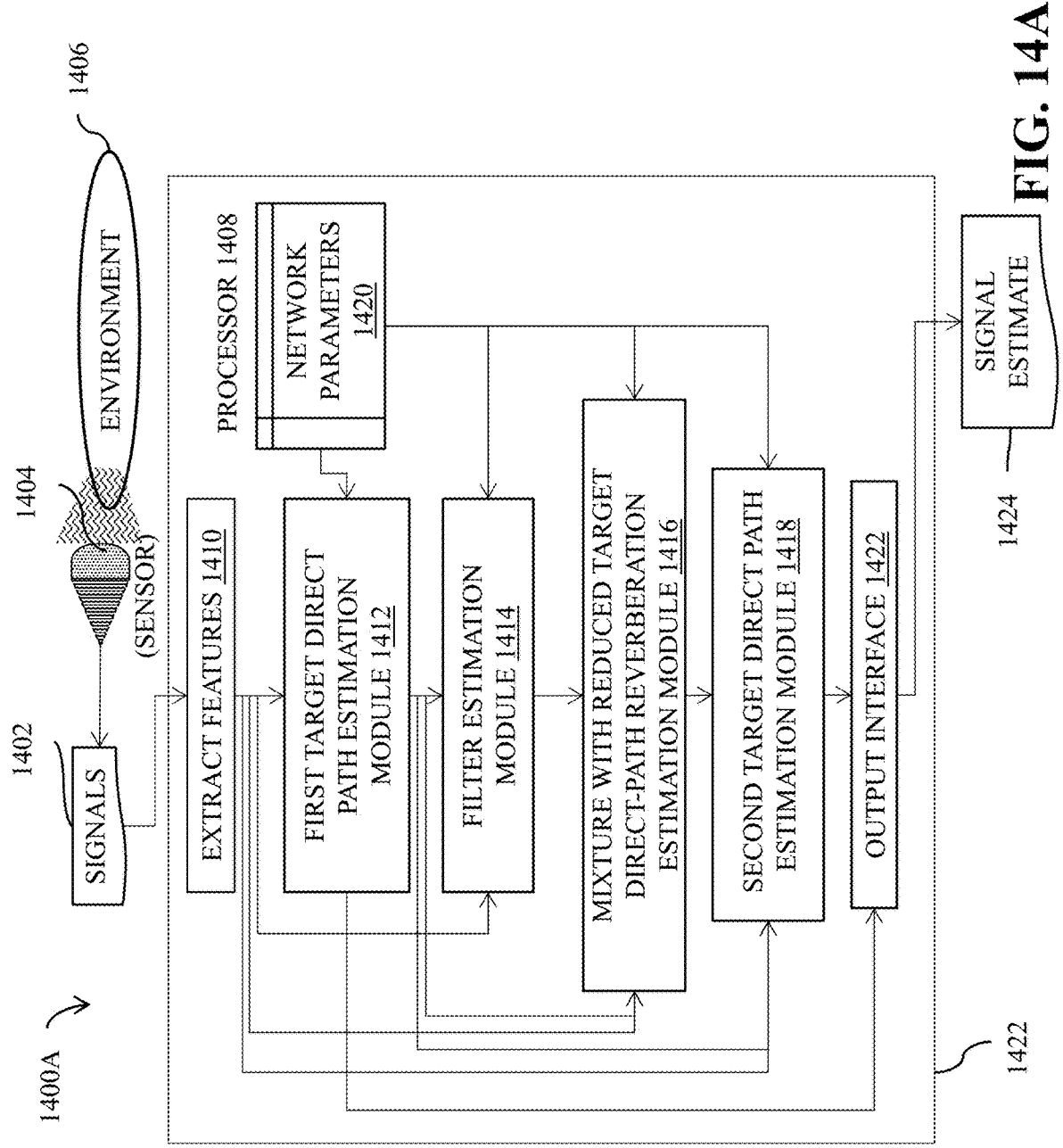
FIG. 14A illustrates a block diagram of a system for dereverberation of speech signals, according to some example embodiments of the present disclosure.

FIG. 14A is a block diagram of a system 1400A for dereverberation of speech signals, according to some example embodiments of the present disclosure. The system 1400 may be used for estimating target audio signals from an input audio signal 1402 obtained from a sensor 1404 monitoring an environment 1406.

The input audio signal 1402 includes a mixture of acoustic signals that includes a target direct-path signal (e.g., the target direct-path signal 106A) and corresponding reverberation (e.g., the reverberation 108A). The system 1400 processes the audio signal 1402 via processor 1408 by using a feature extraction module 1410. The feature extraction module 1410 computes an audio feature sequence from the input audio signal 1402. The first target direct-path signal estimation module 1412 processes the audio feature sequence to output a first estimate (e.g., the first estimate 408 of the target direct-path signal 106A). The first estimate of the target direct-path signal is processed by a filter estimation module 1414 to output a filter modeling a room impulse response that affects the target direct-path signal. For instance, the target direct-path signal may be affected to transform into a target reverberant signal. The filter is applied to the first estimate to output a mixture with reduced reverberation. The filter and the first estimate are further processed by a mixture with reduced target direct-path reverberation estimation module 1416 that estimates a mixture with reduced target direct-path reverberation. The mixture with reduced target direct-path reverberation, the first estimate, and the features are further processed by a second target direct-path estimation module 1418 to compute a signal estimate 1424 (e.g., the second estimate 410) for the target direct-path signal. The signal estimate 1424 is outputted via an output interface 1422. In some embodiments, a room impulse response modeled by the filter may be outputted via the output interface 1422. The outputted room impulse response may be used in audio analysis application for performing one or a combination of a room geometry reconstruction, a speech enhancement, and dereverberation of speech signals.

In some example embodiments, network parameters 1420 may be inputted into the first target direct-path signal estimation module 1412, the filter estimation module 1412, the mixture with reduced target direct-path reverberation estimation module 1414, and the second target direct-path estimation module 1418. The network parameters 1420 may include labeled and un-labeled data, such as transcribed and un-transcribed data for different sounds or utterances that may be used for initializing a speech recognition task.

Figure 14B:
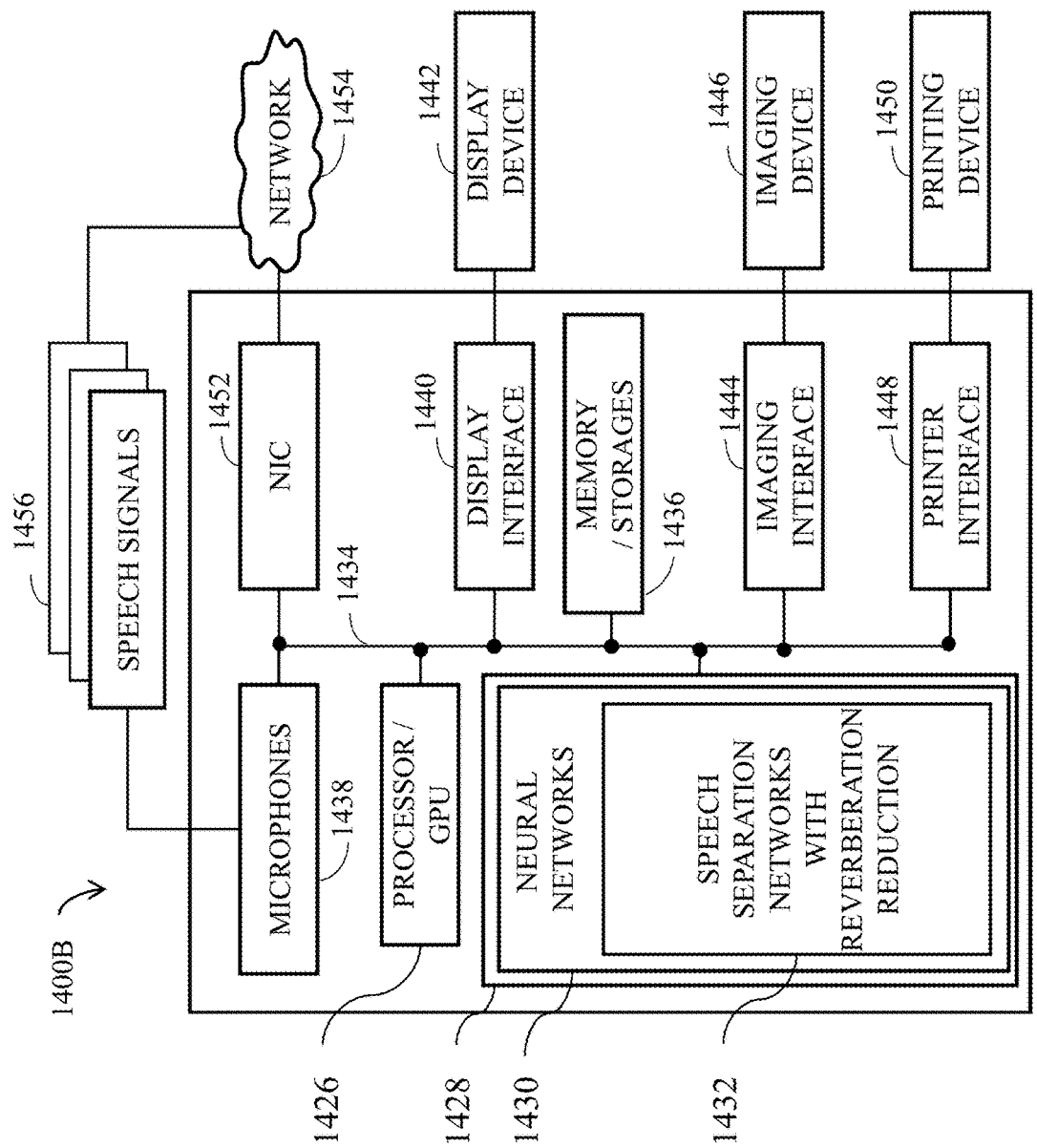
FIG. 14B illustrates a block diagram of a system for dereverberation of speech signals, according to some other example embodiments of the present disclosure.

FIG. 14B illustrates a block diagram of a system 1400B for dereverberation of speech signals, according to some other example embodiments of the present disclosure.

The system 1400B includes a processor 1426 configured to execute stored instructions, as well as a memory 1428 that stores instructions regarding a neural network 1430 including a speech separation network 1432 with reverberation reduction that allow to achieve speech separation and reverberation reduction. The processor 1426 may be a single core processor, a multi-core processor, a graphic processing unit (GPU), a computing cluster, or any number of other configurations. The memory/storage 1428 may include random access memory (RAM), read only memory (ROM), flash memory, or any other suitable memory systems. The memory 1328 can also include a hard drive, an optical drive, a thumbdrive, an array of drives, or any combinations thereof. The processor 1426 is connected through a bus 1434 to one or more input and output interfaces/devices. Further, the system 1400B may include one or more microphones 1438 connected via the bus 1434. The system 1400B is configured to receive/acquire speech signals 1456 via the one or more microphones 1438 or via a network interface 1452 and a network 1454 connected to the data sources of the speech signals 1456.

The memory 1428 stores the neural network 1430 trained to transform mixture of acoustic signals including mixtures of speech signals and corresponding reverberation into separated speech signals with reduced reverberation. The processor 1426 executing the stored instructions performs the speech separation using the neural network 1430 retrieved from the memory 1428. The neural network 1430 is trained to transform acoustic signals including mixtures of speech signals into separated speech signals. The neural network 1430 may include a speech separation network 1432, which is trained to estimate separated signals from acoustic features of the acoustic signals.

Figure 15:
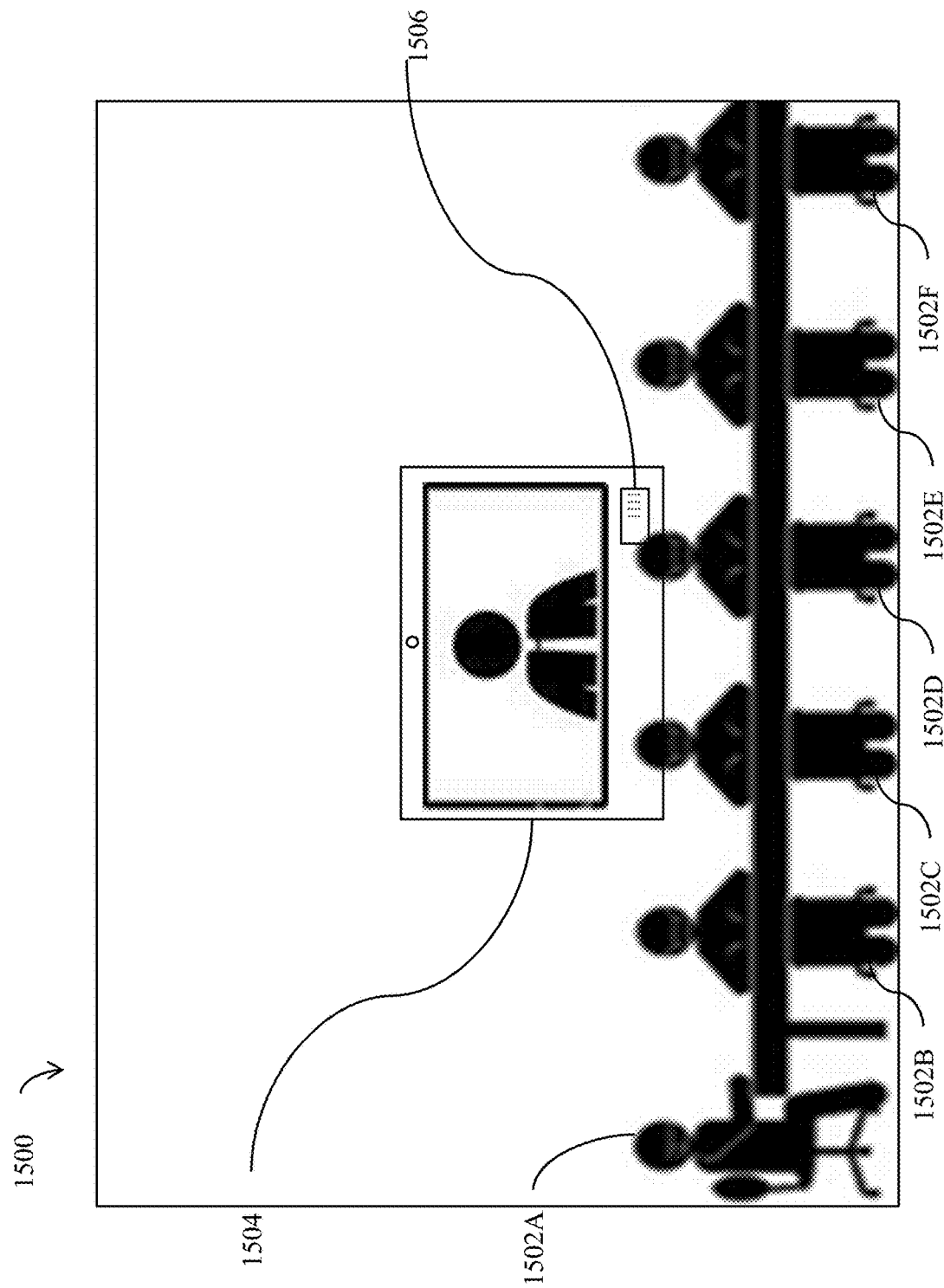
FIG. 15 illustrates a use case for dereverberation of speech signals, according to some example embodiments of the present disclosure.

FIG. 15 illustrates a use case 1500 for dereverberation of speech signals, according to some example embodiments of the present disclosure. The use case 1500 corresponds to a teleconferencing room that includes a group of speakers, such as a speaker 1502A, a speaker 1502B, a speaker 1502C, a speaker 1502D, a speaker 1502E and a speaker 1502F (group of speakers 1502A-1502F). The speech signals of one or more speakers of the group of speakers 1502A-1502F is received by an audio receiver 1506 of a device 1504. The audio receiver 1506 is equipped with the system 200 and receives acoustic speech signals of a speaker or one or more speakers from the group of speakers 1502A-1502F.

The audio receiver 1506 may include a single microphone and/or an array of microphones for receiving a mixture of acoustic signals from the group of speakers 1502A-1502F as well as noise signals in the teleconferencing room. These mixture of acoustic signals from the group of speakers 1502A-1502F may be processed by using the system 200. For instance, the system 200 may analyze an RIR model of the teleconferencing room. The RIR model may be used to generate a room geometry construction of the teleconferencing room. The room geometry construction may be used for localization of reflective boundaries in the teleconferencing room. For instance, the corresponding room geometry construction may be used to determine location for installing speakers, seating arrangement of the group of speakers 1502A-1502F and/or the like to counterbalance noise and other disturbances in the teleconferencing room. Further, the RIR model may be used to remove reflections and reverberation of the speech signals of the one or more speakers of the group of speakers 1502A-1502F.

In an illustrative example scenario, multiple speakers in the group of speakers 1502A-1502F may output speech signals at same time. In such scenario, the system 200 reduces reverberation in the teleconferencing room and separate speech signals of each of the speakers 1502A-1506. The system 200 may also perform a beamforming of the mixture of acoustic signals from array of microphones to enhance speech signals of corresponding speaker in the group of speakers 1502A-1502F. The enhanced speech signals may be used for transcription of utterances of the speaker. For instance, the device 1504 may include an ASR module. The ASR module may receive enhanced speech signals to output the transcription. The transcription may be displayed via a display screen of the device 1504.

Figure 16:
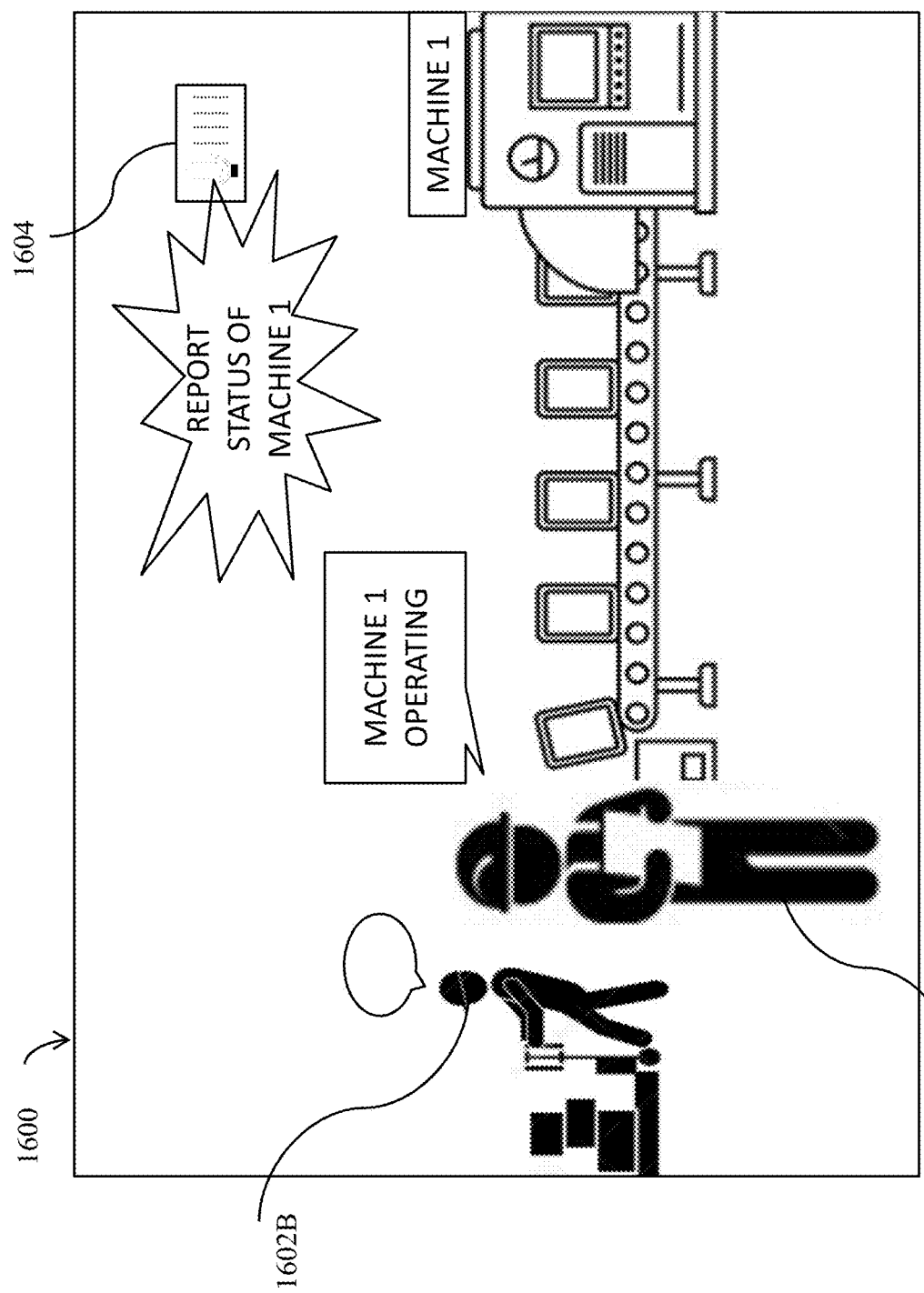
FIG. 16 illustrates a use case for dereverberation of speech signals, according to some other example embodiments of the present disclosure.

FIG. 16 illustrates a use case 1600 for dereverberation of speech signals, according to some other example embodiments of the present disclosure. The use case 1600 corresponds to a factory floor that includes one or more speakers, such as a speaker 1602A and a speaker 1602B. The factory floor may have high reverberant signals and noises due to operations of different industrial machineries. The factory floor may also be equipped with an audio device 1604 for facilitating communication between a control operator of the factory floor (not shown) with the one or more speakers 1602A and 1602B in the factory floor. The audio device 1604 may be equipped with the system 200.

In an illustrative example scenario, the audio device 1604 may be sending an audio command that may be addressed to the person 1602A managing the factory floor. The audio command may include "REPORT STATUS OF MACHINE 1". The speaker 1602A may utter "MACHINE 1 OPERATING". However, speech signals of the utterances of the speaker 1602A may be mixed with noises from the machine, noises from background and other utterances from the speaker 1602B in the background.

Such noises and reverberant signals may be mitigated by the system 200. The system 200 outputs a clean speech of the speaker 1602A. The clean speech is inputted to the audio device 1604. The audio device 1604 receives the clean speech and captures a response for the audio command from the clean speech corresponding to the utterance of the speaker 1602A. The system 200 enables the audio device in achieving an enhanced communication with intended speaker, such as the speaker 1602A.

Figure 17:
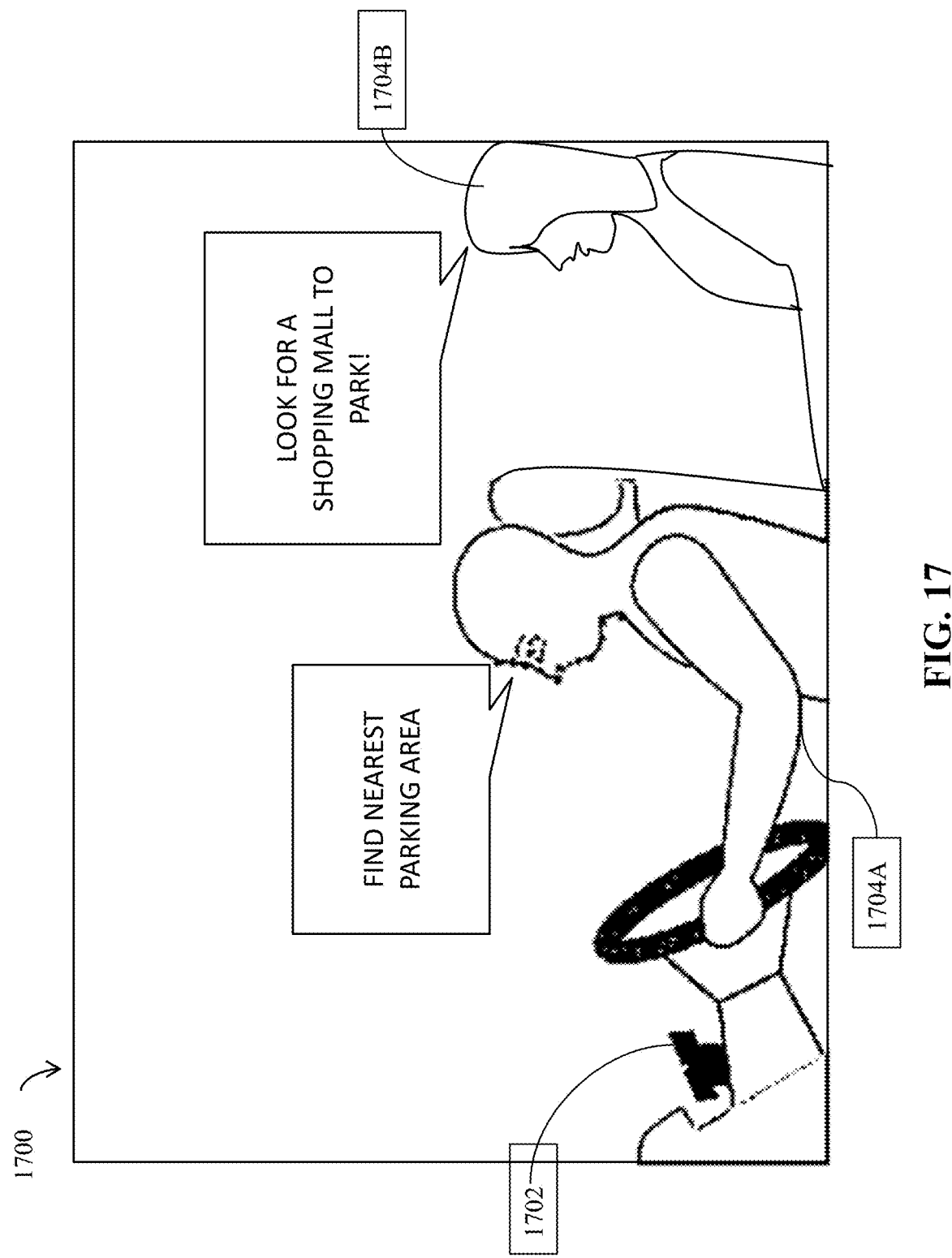
FIG. 17 illustrates a use case for dereverberation of speech signals, according to yet some other example embodiments of the present disclosure.

FIG. 17 illustrates a use case 1700 for dereverberation of speech signals, according to yet some other example embodiments of the present disclosure. The use case 1700 corresponds to a driver assistance system 1702. The driver assistance system 1702 is implemented in a vehicle, such as a manually operated vehicle, an automated vehicle, or a semi-automated vehicle. The vehicle is occupied by one or more persons, such as a person 1704A and a person 1704B. The driver assistance system 1702 is equipped with the system 200. For instance, the driver assistance system 1702 may be remotely connected to the system 1702 via a network, such as the network 1754. In some alternative example embodiments, the system 200 may be embedded within the driver assistance system 1702.

The driver assistance system 1702 may also include a microphone or multiple microphones to receive a mixture of acoustic signals. The mixture of acoustic signals may include speech signals from the persons 1704A and 1704B as well as external noise signals, such as honking sound of other vehicles, etc. In some cases, when the person 1704A is sending a speech command to the driver assistance system 1702, the other person 1704B may utter louder than the person 1704A. The utterance from the person 1704B may intervene the speech command of the person 1704A. For instance, the speech command of the person 1704A may be "FIND THE NEAREST PARKING AREA" and the utterance of the person 1704B may be "LOOK FOR A SHOPPING MALL TO PARK". In such instance, the system 200 processes the utterances of each of the person 1704A and the person 1704B, simultaneously or separately. The system 200 separates the utterances of the person 1704A and the person 1704B. The separated utterances are used the driver assistant system 1702. The driver assistant system 1702 may process and execute the speech command of the person 1704A and the utterance of the person 1704B and accordingly output response for each of the utterances.

Figure 18:
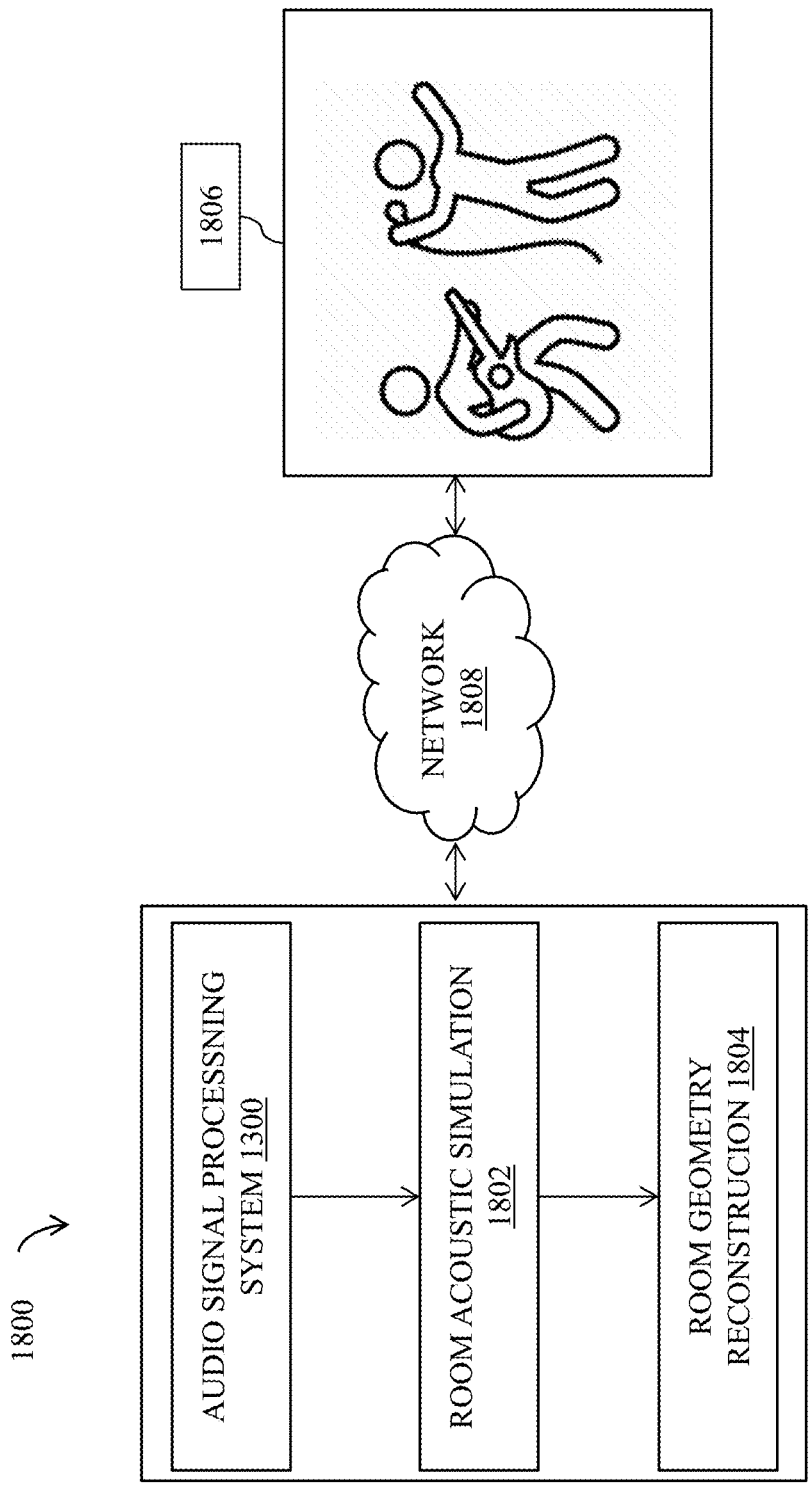
FIG. 18 illustrates a use case for dereverberation of speech signals, according to yet some other example embodiments of the present disclosure.

FIG. 18 illustrates a use case 1800 for dereverberation of speech signals, according to yet some other example embodiments of the present disclosure. In some example embodiments, the system 200 (shown in FIG. 2) may process a pre-recorded data or a live record of a sound to determine an estimate of a target direct-path signal. The pre-recorded data of the sound may be accessed from a database via a network 1808. The network 1808 is an example of the network 1312. Likewise, the live record of the source may be streamed from corresponding source at a remote location via the network 1808.

The estimate of the target direct-path signal may be filtered by the system 200 to determine an RIR model. The RIR model may be analyzed by an audio signal processing system, such as the audio signal processing system 1300 connected to the system 200. The audio signal processing system 1300 may process the RIR model for a room acoustic simulation 1802 of an environment, such as a music concert hall 1806. The RIR model may be convolved with a recorded soundtrack source to imprint acoustics of the music concert hall 1806 based on the room acoustic simulation 1802. Using the room acoustic simulation 1802, a simulated environment or a virtual reality environment of the actual of the music concert hall 1806 may be created. The simulated environment of the music concert hall 1806 may enable music performers to rehearse prior to actual performance at music concert hall 1806.

In some cases, the room acoustic simulation 1802 may be used for modeling a room acoustic behavior for a room geometry reconstruction 1804. The room geometry reconstruction 1804 may provide architectural aspects to design and construct for maximizing listening experience of audience in a music concert hall, such as the music concert hall 1806.

By incorporating operations 902 to 912 in such a manner above, the method 900 performed by using the processor 208 arranged in the system 200 may allow to estimate the filter that includes both magnitude and phases of the reverberation, which may improve the dereverberation for speech signals. The filter is estimated based on a convolutive prediction approach, which enables the filter to reduce early reflections of a target direct-path signal. Moreover, the filter models for the signal propagation in a room, i.e., RIR, which may improve accuracy for estimation of the reverberation. The use of two DNNs in the system 200 may also improve performance for the dereverberation of speech signals, as well as tasks such as speech enhancement and speaker separation. More specifically, the first DNN estimates a first estimate of a target direct-path signal from a mixture of acoustic signals that includes reverberations. The second DNN estimates a refined estimate of the target direct-path signal using the first estimate along with other data, such as the filter and a reduced reverberation estimated by the filter. In this manner, the two DNNs enable identifying and differentiating the target direct-path signal from high reverberation and noises, in an efficient and feasible manner.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

The above-described embodiments of the present disclosure may be implemented in any of numerous ways. For example, the embodiments may be implemented using hardware, software, or a combination thereof. When implemented in software, the software code may be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Also, the embodiments of the present disclosure may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments. Therefore, it is the object of the appended claims to cover all such variations and modifications as come within the true spirit and scope of the present disclosure.

Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

The invention claimed is:

1. A method executed by a computer for dereverberation of speech signals, the method comprising:
    receiving, via an input interface, a mixture of acoustic signals including a target direct-path signal and a reverberation of the target direct-path signal;
    submitting the received mixture of acoustic signals to a first deep neural network (DNN) to produce a first estimate of the target direct-path signal;
    estimating a filter modeling a room impulse response (RIR) for the first estimate of the target direct-path signal, wherein the filter when applied to the first estimate of the target direct-path signal generates a result that is closest to a residual between the mixture of the acoustic signals and the first estimate of the target direct-path signal according to a distance function;
    obtaining a mixture with reduced reverberation of the target direct-path signal by removing the result of applying the filter to the first estimate of the target direct-path signal from the received mixture of acoustic signals;
    submitting the mixture with reduced reverberation to a second DNN to produce a second estimate of the target direct-path signal; and
    outputting the second estimate of the target direct-path signal via an output interface.

2. The method of claim 1, wherein the estimating of the filter comprises estimating a linear filter based on a convolutive prediction.

3. The method of claim 1, further comprising:
    submitting one or a combination of the received mixture of acoustic signals and the first estimate of the target direct-path signal to the second DNN to produce the second estimate of the target direct-path signal.

4. The method of claim 1, wherein the received mixture of acoustic signals includes speech signals from multiple speakers, and wherein the first DNN produces multiple outputs, each output of the multiple outputs including the first estimate of the target direct-path signal for a speaker from the multiple speakers.

5. The method of claim 4, further comprising:
    repeating the estimating of the filter, the obtaining of the mixture with reduced reverberation and the submitting the mixture with reduced reverberation steps for each of the multiple outputs of the first DNN.

6. The method of claim 4, further comprising:
    repeating the estimating of the filter and the obtaining of the mixture with reduced reverberation, for each of the multiple speakers to produce corresponding filter and corresponding mixture with reduced reverberation for each of the multiple speakers;
    combining the corresponding mixtures with reduced reverberation for each of the multiple speakers; and
    submitting the combined mixtures with reduced reverberation for each of the multiple speakers to the second DNN to produce a second estimate of the target-direct signal for each of the multiple speakers.

7. The method of claim 4, further comprising:
    estimating a corresponding filter for each of the multiple speakers, wherein the mixture with reduced reverberation is obtained by removing a corresponding result of applying each of the filter to each of the first estimate of the target direct-path signal for each of the multiple speakers from the received mixture of acoustic signals; and submitting the mixture with reduced reverberation of the multiple speakers to the second DNN to produce the second estimate of the target direct-path signal for each of the multiple speakers.

8. The method of claim 1, further comprising:
replacing the first estimate of the target direct-path signal with the second estimate of the target direct-path signal to produce an updated first estimate of the target direct-path signal;
repeating the estimating of the filter, the obtaining of the mixture with reduced reverberation and the submitting of the mixture with reduced reverberation steps for the updated first estimate of the target direct-path signal until a termination condition is met; and
obtaining an updated second estimate of the target direct-path signal.

9. The method of claim 4, further comprising:
repeating the estimating of the filter for each of the multiple speakers to produce corresponding filter for each of the multiple speakers;
extracting a portion of the received mixture of acoustic signals corresponding to a speaker of the multiple speakers by removing corresponding estimate of a reverberant speech of other speakers of the multiple speakers from the received mixture of acoustic signals, wherein the estimate of a reverberant speech of another speaker of the multiple speakers is obtained by adding the first estimate of the target 9 direct-path signal for the other speaker to the result of applying the corresponding filter for the other speaker to the first estimate of the target direct-path signal for the other speaker; and
estimating the filter for estimating the mixture with reduced reverberation for each speaker of the multiple speakers based on the portion of the received mixture of acoustic signals.

10. The method of claim 1, wherein the receiving of the mixture of acoustic signals comprises at least one of:
receiving a single-channel signal from a single microphone connected to the input interface; and
receiving a multi-channel signal from an array of microphones connected to the input interface.

11. The method of claim 10, wherein the receiving of the multi-channel signal from the array of microphones, further comprises:
obtaining a beamforming output based on statistics computed from one or combination of the first estimate of the target direct-path signal at each microphone of the array of microphones and the mixture with reduced reverberation of the target direct-path signal; and
submitting the beamforming output to the second DNN to produce the second estimate of the target direct-path signal.

12. The method of claim 1, wherein the filter is applied to the first estimate of the target direct-path signal in a time-frequency domain and wherein the distance function is a weighted distance with a weight at each time-frequency point in the time-frequency domain determined by one or combination of the received mixture of acoustic signals and the first estimate of the target direct-path signal, and wherein the distance function is based on a least-square distance.

13. The method of claim 1, wherein the first DNN is pretrained to obtain the first estimate of the target direct-path signal from an observed mixture of acoustic signals.

14. The method of claim 13, wherein the pretraining of the first DNN is performed using a training dataset of mixtures of acoustic signals and corresponding reference target direct-path signal in the training dataset, by minimizing a loss function comprising one or a combination of:
a distance function defined based on real and imaginary (RI) components of the first estimate of the target direct-path signal in a first time-frequency domain and RI components of the corresponding reference target direct-path signal in the first time-frequency domain,
a distance function defined based on a magnitude obtained from the RI components of the first estimate of the target direct-path signal in the first time-frequency domain and corresponding magnitude of the reference target direct-path signal in the first time-frequency domain,
a distance function defined based on a reconstructed waveform obtained from the RI components of the first estimate of the target direct-path signal in the first time-frequency domain by reconstruction in a time domain and a waveform of the reference target direct-path signal,
a distance function defined based on the RI components of the first estimate in a second time-frequency domain obtained by transforming the reconstructed waveform further in the time-frequency domain and the RI components of the reference target direct-path signal in the second time-frequency domain, and
a distance function defined based on the magnitude obtained from the RI components of the first estimate of the target direct-path signal in the second time-frequency domain obtained by transforming the reconstructed waveform further in the time-frequency domain and the corresponding magnitude of the reference target direct-path signal in the second time-frequency domain.

15. A system for dereverberation of speech signals, the system comprising:
an input interface configured to receive a mixture of acoustic signals including a target direct-path signal and a reverberation of the target direct-path signal;
a memory storing a first Deep Neural Network (DNN) and a second DNN for the dereverberation of speech signals;
a processor configured to:
submit the received mixture of acoustic signals to the first DNN to produce a first estimate of the target direct-path signal,
estimate a filter modeling a room impulse response (RIR) for the first estimate of the target direct-path signal, wherein the filter when applied to the first estimate of the target direct-path signal generates a result that is closest to a residual between the mixture of the acoustic signals and the first estimate of the target direct-path signal according to a distance function,
obtain a mixture with reduced reverberation of the target direct-path signal by removing the result of applying the filter to the first estimate of the target direct-path signal from the received mixture of acoustic signals, and
submit the mixture with reduced reverberation to a second DNN to produce a second estimate of the target direct-path signal; and
an output interface configured to output the second estimate of the target direct-path signal.

16. The system of claim 15, wherein for the estimation of the filter, the processor is configured to estimate a linear filter.

17. The system of claim 15, wherein the processor is further configured to submit one or a combination of the received mixture of acoustic signals and the first estimate of the target direct-path signal to the second DNN to produce the second estimate of the target direct-path signal.

18. The system of claim 15, wherein the received mixture of acoustic signals includes speech signals from multiple speakers, and wherein the first DNN produces multiple outputs, each output of the multiple outputs including the first estimate of the target direct-path signal for a speaker from the multiple speakers.

19. The system of claim 18, wherein the processor is further configured to:
repeat the estimating of the filter, the obtaining of the mixture with reduced reverberation and the submitting of the mixture with reduced reverberation steps for each of the multiple outputs of the first DNN.

20. The system of claim 18, wherein the processor is further configured to:
repeat the estimating of the filter and the obtaining of the mixture with reduced reverberation, for each of the multiple speakers to produce corresponding filter and corresponding mixture with reduced reverberation for each of the multiple speakers;
combine the corresponding mixture with reduced reverberation for each of the multiple speakers into a tensor; and
submit the tensor to the second DNN to produce a second estimate of the target-direct signal for each of the multiple speakers.

\* \* \* \* \*